United States Patent [19]
Takewa et al.

[11] Patent Number: 5,408,426
[45] Date of Patent: Apr. 18, 1995

[54] ARITHMETIC UNIT CAPABLE OF PERFORMING CONCURRENT OPERATIONS FOR HIGH SPEED OPERATION

[75] Inventors: Hidehito Takewa; Hiromichi Yamada; Takashi Hotta; Kotaro Shimamura, all of Hitachi, Japan

[73] Assignee: Hitachi, Ltd., Tokyo, Japan

[21] Appl. No.: 37,654

[22] Filed: Mar. 17, 1993

[30] Foreign Application Priority Data

| | | |
|---|---|---|
| Mar. 17, 1992 [JP] | Japan | 4-060595 |
| Jul. 24, 1992 [JP] | Japan | 4-198739 |
| Jan. 29, 1993 [JP] | Japan | 5-014154 |

[51] Int. Cl.⁶ .............................................. G06F 7/38
[52] U.S. Cl. .............................................. 364/748
[58] Field of Search ................ 364/748, 745, 787, 788

[56] References Cited

U.S. PATENT DOCUMENTS

| | | | |
|---|---|---|---|
| 4,589,067 | 5/1986 | Porter et al. | 364/748 X |
| 4,922,446 | 5/1990 | Zurawski et al. | 364/748 |
| 4,941,120 | 7/1990 | Brown et al. | 364/748 |
| 5,150,320 | 9/1992 | Nakayama | 364/748 |
| 5,195,051 | 3/1993 | Palaniswami | 364/748 |
| 5,197,023 | 3/1993 | Nakayama | 364/748 |
| 5,247,471 | 9/1993 | Hilker et al. | 364/748 |
| 5,285,406 | 2/1994 | Lynch et al. | 364/788 |

FOREIGN PATENT DOCUMENTS

1-232422  9/1989  Japan.
1-290035  11/1989  Japan.

*Primary Examiner*—Tan V. Mai
*Attorney, Agent, or Firm*—Antonelli, Terry, Stout & Kraus

[57] ABSTRACT

An arithmetic unit which accepts two numerical values and executes an operation by the use of the two numerical values has an adder-subtracter for executing an addition or a subtraction on the basis of two numerical values obtained directly or indirectly from the accepted two numerical values; a normalizer for executing a normalizing process in which a mantissa part of an added or subtracted result is shifted so that a high-order digit having been developed anew in the result may come to a predetermined position, and in which an exponent part of the result is corrected in accordance with the number of shift places in the shift of the mantissa part; and a rounding device for executing a rounding process in which, on condition that the mantissa part of the added or subtracted result exceeds a predetermined number of digits, the number of digits of the mantissa part is reduced in conformity with a rounding mode designated beforehand. The rounding device executes at least part of the rounding process by the use of the numerical values not yet subjected to the normalizing process, in parallel with the execution of the adder-subtracter or the normalizer.

16 Claims, 60 Drawing Sheets

FIG.9

| MODE SIGNAL | | | | ROUNDING VALUE (818) | REMARKS |
|---|---|---|---|---|---|
| MODE 0 (812) | MODE 1 (813) | MODE 2 (810) | MODE 3 (811) | | |
| 1 | 0 | 0 | 0 | GS+LG | ROUND TO NEAREST |
| 0 | 1 | 0 | 0 | 0 | ROUND TOWARD ZERO |
| 0 | 0 | 1 | 0 | $\overline{Si}(G+S)$ | ROUND TOWARD PLUS INFINITY |
| 0 | 0 | 0 | 1 | $Si(G+S)$ | ROUND TOWARD MINUS INFINITY |

G(807):GUARD BIT    Si(809):SIGN BIT    S(808):STICKY BIT    L(810):LSB

FIG.10

| VALUE OF MSD OF RESULT OF ADDITION BETWEEN INTERMEDIATE PRODUCTS | NUMBER OF DIGITS FROM LSD | | | |
|---|---|---|---|---|
| | 54 | 53 | 52 | 1 FROM 51 |
| 0 | | LSB (ROUNDING POSITION) | GUARD BIT | STICKY BIT |
| 1 | LSB (ROUNDING POSITION) | GUARD BIT | STICKY BIT | |

F I G. 17
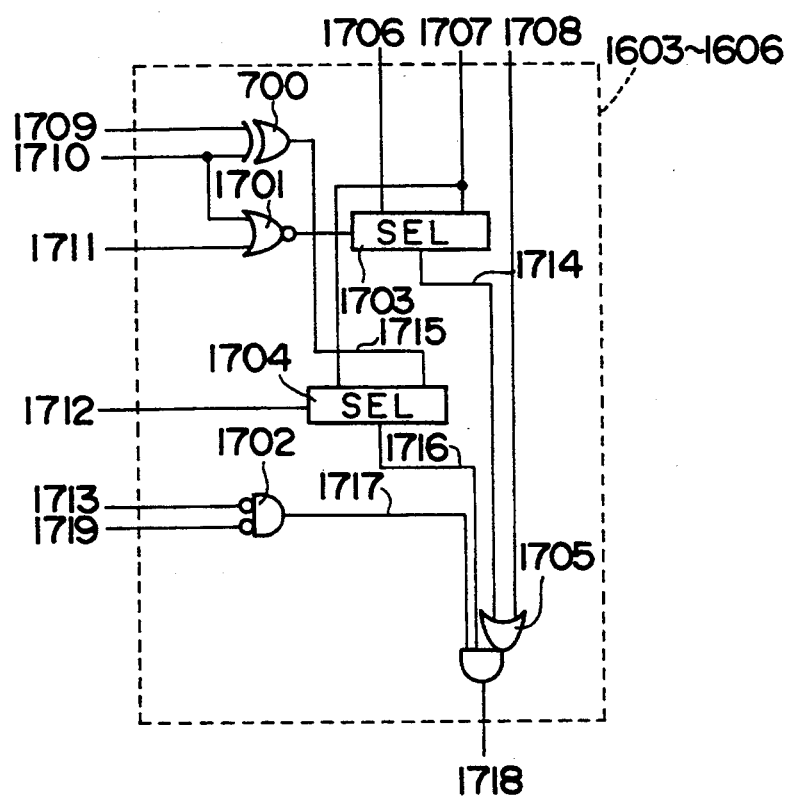

FIG.18

| MODE SIGNAL | | | | | ROUNDING VALUE (1718) | REMARKS |
|---|---|---|---|---|---|---|
| MODE 0 (1712) | MODE 1 (1713) | MODE 2 (1710) | MODE 3 (1711) | MODE 3 (1719) | | |
| 1 | 0 | 0 | 0 | 0 | GS+LG | ROUND TO NEAREST |
| 0 | 1 | 0 | 0 | 0 | 0 | ROUND TOWARD ZERO |
| 0 | 0 | 1 | 0 | 0 | $\overline{Si}$(G+S) | ROUND TOWARD PLUS INFINITY |
| 0 | 0 | 0 | 1 | 0 | Si(G+S) | ROUND TOWARD MINUS INFINITY |
| 0 | 0 | 0 | 0 | 1 | 0 | INTEGER |

G(1707):GUARD BIT   Si(1709):SIGN BIT   S(1708):STICKY BIT   L(1710):LSB

FIG.21

| FORMAT SIGNAL | | | | MSD | REMARKS |
|---|---|---|---|---|---|
| DOUBLE PRECISION (2007) | SINGLE PRECISION (2006) | INTEGER (2005) | CARRY (1935) | (1919) | |
| 1 | 0 | 0 | 1 | 2002 | DOUBLE PRECISION : WITH CARRY |
| 1 | 0 | 0 | 0 | 2001 | DOUBLE PRECISION : WITHOUT CARRY |
| 0 | 1 | 0 | 1 | 2004 | SINGLE PRECISION : WITH CARRY |
| 0 | 1 | 0 | 0 | 2003 | SINGLE PRECISION : WITHOUT CARRY |
| 0 | 0 | 1 | 1 | VSS | INTEGER |
| 0 | 0 | 1 | 0 | VSS | INTEGER |

F I G. 22
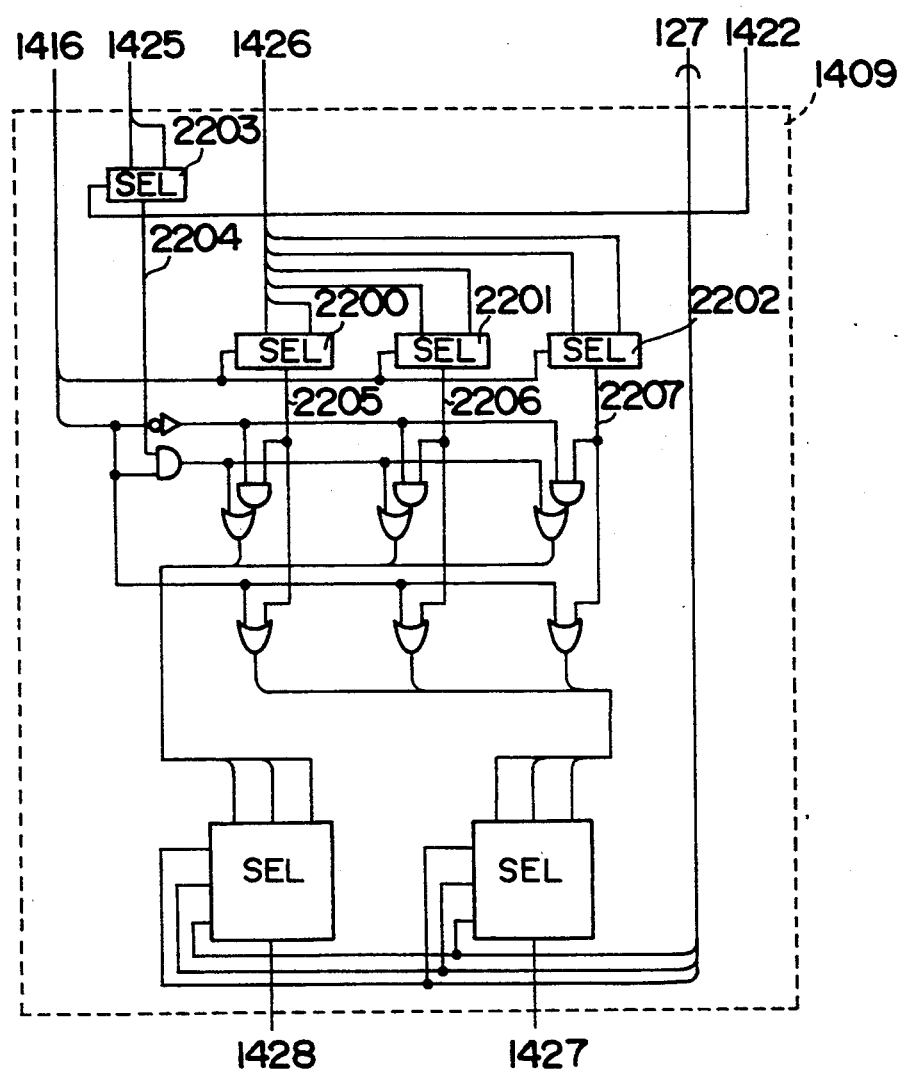

FIG.23(a)

FOR INTEGER PROCESS
(1416 = "0")

| CARRY (1425) | MSD | SELECT MANTISSA WITH ONE BIT SHIFTED (1427) | SELECT EXPONENT WITH "1" INCREMENTED (1428) |
|---|---|---|---|
| 0 | 0 | 1 | 0 |
| 0 | 1 | 1 | 0 |
| 1 | 0 | 1 | 1 |
| 1 | 1 | 1 | 1 |

FIG.23(b)

FOR FLOATING-POINT NUMBER PROCESS
(1416 = "1")

| CARRY (1425) | MSD | SELECT MANTISSA WITH ONE BIT SHIFTED (1427) | SELECT EXPONENT WITH "1" INCREMENTED (1428) |
|---|---|---|---|
| 0 | 0 | 0 | 0 |
| 0 | 1 | 1 | 1 |
| 1 | 0 | 0 | 0 |
| 1 | 1 | 1 | 1 |

FIG.25

| MULTIPLICAND \ MULTIPLIER FACTOR | PLUS INFINITY | PLUS ZERO | PLUS NORMALIZED NUMBER | MINUS NORMALIZED NUMBER | MINUS ZERO | MINUS INFINITY |
|---|---|---|---|---|---|---|
| PLUS INFINITY | PLUS INFINITY | DON'T CARE | PLUS INFINITY | MINUS INFINITY | DON'T CARE | MINUS INFINITY |
| PLUS ZERO | DON'T CARE | PLUS ZERO | PLUS ZERO | MINUS ZERO | MINUS ZERO | DON'T CARE |
| PLUS NORMALIZED NUMBER | PLUS INFINITY | PLUS ZERO | PLUS NORMALIZED NUMBER | MINUS NORMALIZED NUMBER | MINUS ZERO | MINUS INFINITY |
| MINUS NORMALIZED NUMBER | MINUS INFINITY | MINUS ZERO | MINUS NORMALIZED NUMBER | PLUS NORMALIZED NUMBER | PLUS ZERO | PLUS INFINITY |
| MINUS ZERO | DON'T CARE | MINUS ZERO | MINUS ZERO | PLUS ZERO | PLUS ZERO | DON'T CARE |
| MINUS INFINITY | MINUS INFINITY | DON'T CARE | MINUS INFINITY | PLUS INFINITY | DON'T CARE | PLUS INFINITY |

FIG.31

- SIGNAL TO BE SELECTED

| CONTROL<br>SEL NO. | 1 2 3 = 1<br>OR (124=1) | 1 2 3 = 0<br>OR (124=0) |
|---|---|---|
| 1 2 0 0 | 1 2 5 | 1 2 6 |
| 1 2 0 1 | 1 2 1 6 | 1 2 1 5 |
| 1 2 0 2 | 1 2 1 8 | 1 2 1 7 |
| 1 2 0 3 | 1 2 0 | 1 2 2 |
| 1 2 0 4 | 1 2 2 5 | 1 2 2 4 |
| 1 2 0 5 | 1 2 2 7 | 1 2 2 6 |

FIG.32

- BITS TO BE SELECTED

| SEL NO. | NUMBER OF BITS |
|---|---|
| 1 2 0 0 | 1 |
| 1 2 0 1 | 1 |
| 1 2 0 2 | 1 |
| 1 2 0 3 | 3 |
| 1 2 0 4 | 1 |
| 1 2 0 5 | 1 |

FIG.33

```
111 → 1 F F F F F F F F F F F F F    (53 HEXADECIMAL BITS)

112 → 1 0 0 0 0 0 0 0 0 0 0 0 0 1    (53 HEXADECIMAL BITS)

106TH BIT        55 54 53 52 51
           ↓              ↓  ↓  ↓  ↓  ↓
113 → 0 1 1 1···1 1 1 1 1 1 1 0 1 1 1···1 1 1    (106 BINARY BITS)

114 → 0 0 0 0···0 0 0 1 0 0 0···0 0 0    (106 BINARY BITS)

54TH BIT
                ↓
115 → 1 0 1 1 1 1···1 1 1    (54 BINARY BITS)

116 → 1 0 0 0 0 0···0 0 0    (54 BINARY BITS)

106TH BIT   55
           ↓         ↓
117 → 0 1 1 1···1 1 1    (52 BINARY BITS)

118 → 1 0 0 0···0 0 0    (52 BINARY BITS)

119 → 1 0 0 0···0 0 1    (52 BINARY BITS)

54 52
       ↓  ↓
120 → 0 1 0    (3 BINARY BITS)    (CARRY "1" FROM LOWER-ORDER POSITIONS)

122 → 0 0 1    (3 BINARY BITS)    (CARRY "0" FROM LOWER-ORDER POSITIONS)
```

| | L | G | S |
|---|---|---|---|
| 703 | 1 | 0 | 1 |
| 704 | 0 | 1 | 1 |
| 705 | 0 | 1 | 1 |
| 706 | 0 | 0 | 1 |

G·S+L·G

721 → 0 (ASSUMING SIGNAL 123="1", AND SIGNAL 125 OR 126 ="0")
723 → 1 (ASSUMING SIGNAL 123="1", AND SIGNAL 125 OR 126 ="1")
724 → 1 (ASSUMING SIGNAL 123="0", AND SIGNAL 125 OR 126 ="0")
725 → 0 (ASSUMING SIGNAL 123="0", AND SIGNAL 125 OR 126 ="1")

FIG.35

121 → 0 1 1 0  (4 BINARY BITS)

123 → 0  (1 BINARY BITS)

124 → 1  (1 BINARY BITS)

125 → 1  (1 BINARY BITS)

126 → 0  (1 BINARY BITS)

FIG.36

```
54   53   STICKY
↓    ↓    ↓
0    0    1
     ↑
     └─ ROUNDING POSITION
        (VALUE (1229)=0)
```

FIG.37(a) 127→0,1,0 (3 BAINARY BITS)
54 53RD BIT
128→0 0 (2 BINARY BITS)
VALUE OF SIGNAL 1228 (WHICH, HOWEVER, IS MEANINGLESS IN THIS EXAMPLE AND IS DISCARDED BY NORMALIZATION)

FIG.37(b) 129→1 0 0 0 ⋯ 0 0 0   (52 BINARY BITS)
106TH BIT  55

FIG.37(c) 130→1 0 0 0 ⋯ 0 0 0 0 0 0 0 0 (54 BINARY BITS)
106TH BIT  55 54 53

FIG.37(d) 131→0 0 0 ⋯ 0 0 0 0   (52 BINARY BITS)
105TH BIT  55 54

FIG.39
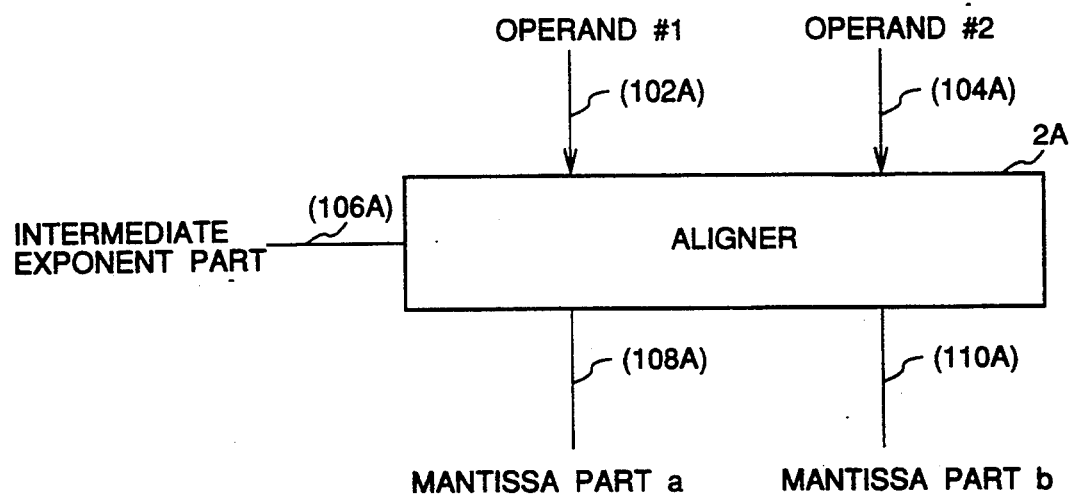
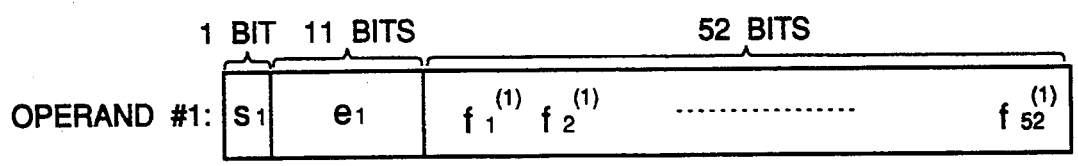
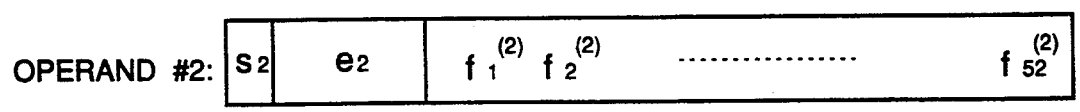

ARITHMETIC UNIT CAPABLE OF PERFORMING CONCURRENT OPERATIONS FOR HIGH SPEED OPERATION

BACKGROUND OF THE INVENTION

The present invention relates generally to integrated circuits, and more particularly to a high-speed circuit in an arithmetic unit which executes addition, multiplication or division between two numerical values.

A floating-point arithmetic unit in the prior art will be explained with reference to FIG. 64 of the accompanying drawings.

The floating-point arithmetic unit exchanges data with a memory by means of a register 6401 and a bus 6423. Data read out of the register 6401 are supplied to an adder 6402, a multiplier 6403 and a divider 6404 through source buses 6411~6414. The respective arithmetic elements execute the processes of addition/subtraction, multiplication and division by the use of two supplied numerical values, and they write the results of the processes into the register 6401 through result buses 6421 and 6422. This example has a construction in which the latter half of the multiplier 6403 is shared for both the execution of the multiplication and that of the division. Alternatively, however, the arithmetic unit can have a construction in which the latter half of a multiplier is doubled, whereby the multiplier and divider operate independently of each other. For rendering the floating-point arithmetic unit high in performance, it is necessary to heighten the operating speeds of the adder, multiplier and divider, respectively.

Next, the multiplier 6403 will be explained.

A prior-art method of multiplying floating-point numbers will be explained by taking as an example an IEEE double-precision standard format (stipulated by The Institute of Electrical and Electronic Engineers) illustrated in FIGS. 30(a)~30(c). As shown in FIG. 30(a), a floating-point number is composed of a sign, an exponent and a mantissa. In the IEEE double-precision standard format, 1 bit (64th bit) is allocated as a sign part, 11 bits (53rd~63rd bits) as an exponent part, and 52 bits (1st~52nd bits) as a mantissa part in a word length of 64 bits. Each of the bits is represented by a value "1" or "0", and the whole number is handled as a binary number. The mantissa lies within a range of at least 1 and less than 2, and the high-order digit or MSB (most significant bit) thereof is 1 at any time. Therefore, only a fraction part or decimal places with 1 of the MSB excluded are used for the representation of the mantissa part. The exponent of the exponent part has a bias value added to the actual value thereof beforehand so that it can be handled as a positive number.

As shown in FIG. 30(b), a multiplicand consists of a sign #1 (a1), an exponent #1 (a2) and a mantissa #1 (a3), while a multiplier factor consists of a sign #2 (b1), an exponent #2 (b2) and a mantissa #2 (b3).

The multiplication between the floating-point numbers includes the operations of the mantissa parts and the exponent parts. The operation of the mantissa parts will be explained first. As shown in FIG. 30(c), a partial product #1 (c1)~a partial product #53 (c53) are generated from the mantissas #1 (a3) and #2 (b3) in correspondence with the respective bits of these mantissas in a bit length of 53 bits containing the MSB value "1" which is not represented. The partial products #1 (c1)~#53 (c53) are added by a partial product adder being a carry save adder in which full adders are combined in an array. Thus, an intermediate product #1 (d1) and an intermediate product #2 (d2) are obtained.

The intermediate products #1 (d1) and #2 (d2) are subsequently added, thereby obtaining a product e which is 105 or 106 bits long and in which the position of a decimal point lies at the first or second place as reckoned from the MSB of this product. (In this regard, the position of the decimal point is determined depending upon the magnitudes of the multiplier factor and the multiplicand. Corresponding hardware, however, is constructed as 106 bits.)

Subsequently, the decimal position, integral part and bit length of the obtained product are conformed to the mantissa format of the IEEE double-precision standard format. More specifically, the position of the decimal point is shifted so that the integral part may have one digit and become the value "1" (normalization). Since a rounding position is determined by the normalization, a rounding process is executed. The 52nd decimal position is set as the LSB (least significant bit) in the rounding process because the mantissa of the format requires 52 bits below the decimal point. In a case where the integral part has become 2 digits on account of a carry generated by the addition of the rounding process, the normalizing process is executed again.

Next, the operation of the exponent parts will be explained. The exponent parts #1 (a2) and #2 (b2) are first added. Since each of the exponent parts has bias value, double the bias value is contained in the result of the first addition between the exponent parts. In order to obtain a correct exponent, a correction needs to be made by subtracting the additional bias magnitude from the result of the addition. Further, in order to handle the mantissa with its decimal point shifted one place, "1" is added to the corrected exponent in the operation of the exponent parts here.

Incidentally, the signs of the multiplicand and the multiplier factor are so processed that the sign part of the product is set at "0" when the sign parts #1 (a1) and #2 (b1) are equal, whereas it is set at "1" when they are not.

Now, the adder 6402 will be explained.

A form for representing a floating-point number in a computer is, for example, a standard format stipulated by IEEE-754 as shown in FIG. 44. The prior-art unit which adds/subtracts two floating-point numbers represented by such a format, is disclosed in the official gazette of Japanese Patent Application Laid-open No. 232723/1990.

The known unit is constructed as illustrated in FIG. 45. An aligner circuit 2A is supplied with the two floating-point numbers to be added/subtracted, namely, operands #1 and #2. It shifts the mantissa part of one of the operands toward a low-order position so as to equalize the exponent parts of both the operands. Output data 108A and 110A delivered from the aligner circuit 2A are input to an adder-subtracter circuit 24A. The adder-subtracter circuit 24A adds or subtracts the aligned mantissa parts in accordance with the distinction between an addition type instruction and a subtraction type instruction, the signs of the operands, the relation between the magnitudes of the operands, etc. An output 112A from the adder-subtracter circuit 24A is input to a normalizer circuit 26A.

The normalizer circuit 26A seeks the MSB of the mantissa part of the added/subtracted result, that is, the digit at which "1" appears first as viewed from the high-order digit of the format. Then, it shifts the mantissa part so that a decimal point may come just to the right side of the sought digit. Simultaneously, it corrects the exponent part 106A delivered from the aligner circuit 2A, in accordance with the number of shift places produced in the above shift operation. Outputs 134A and 138A from the normalizer circuit 26A are input to a rounding circuit 28A.

In a case where the number of bits of the mantissa part of data after the normalization exceeds a limit which can be represented in the predetermined format, the rounding circuit 28A shortens the bit length to a representable number of bits. Concretely, those lower-order bits of the mantissa part which cannot be represented are subjected to a round-up process (requiring the addition of $+1$) or a round-down process (not requiring the addition of $+1$) in accordance with the value of the bits and a predetermined rounding mode.

Now, a high radix division control method, which is one method of realizing the divider 6404, and a high radix divider will be explained. More concretely, they serve to quickly execute an iterative type high radix division in which a quotient as a binary number is calculated every n bits from higher-order digits on the basis of a dividend and a divisor represented in terms of binary numbers.

A high radix division algorithm will be first explained. Incidentally, a "high radix operation" signifies an operation which is executed in plural-bit units.

In a case where the dividend N, divisor D and radix r meet the condition of $N < r \cdot D$, the first calculation of the division proceeds as stated below.

The quotient digit q1 of the first calculation is evaluated from the following formulae of relations:

$$\left. \begin{array}{ll} q1 = 0 & \text{for } 0 \leq N < D \\ q1 = 1 & \text{for } D \leq N < 2D \\ \quad \cdot \\ \quad \cdot \\ \quad \cdot \\ q1 = r - 1 & \text{for } (r-1) \cdot D \leq N < r \cdot D \end{array} \right\} \quad \text{(Eqs. 1)}$$

The quotient Q1 and partial remainder P1 of the first calculation are respectively given by Eqs. 2:

$$\left. \begin{array}{l} Q1 = q1 \\ P1 = N - q1 \cdot D \end{array} \right\} \quad \text{(Eqs. 2)}$$

The second calculation, et seq. proceed as stated below.

The quotient digit qj+1 of the (j+1)th calculation is evaluated from the following formulae of relations:

$$\left. \begin{array}{ll} qj + 1 = 0 & \text{for } 0 \leq r \cdot Pj < D \\ qj + 1 = 1 & \text{for } D \leq r \cdot Pj < 2D \\ \quad \cdot \\ \quad \cdot \\ \quad \cdot \\ qj + 1 = r - 1 & \text{for } (r-1) \cdot D \leq r \cdot Pj < r \cdot D \end{array} \right\} \quad \text{(Eqs. 3)}$$

The quotient Qj+1 and partial remainder Pj+1 of the (j+1)th calculation are respectively given by Eqs. 4 (4A and 4B):

$$\left. \begin{array}{ll} Qj + 1 = Qj + qj + 1 \cdot r^{-j} & \text{[Eq. 4A]} \\ Pj + 1 = r \cdot Pj - qj + 1 \cdot D & \text{[Eq. 4B]} \end{array} \right\} \quad \text{(Eqs. 4)}$$

When the above calculations are iterated n times till the attainment of a required precision, the final quotient Q and remainder R are respectively obtained as indicated by Eqs. 5:

$$\left. \begin{array}{l} Q = Qn - 1 + qn \cdot r^{-(n-1)} \\ R = Pn \cdot r^{-(n-1)} \end{array} \right\} \quad \text{(Eqs. 5)}$$

As the betterment of the above algorithm for a higher operating speed, a high radix SRT division algorithm is known (SRT: Sweeney, Robertson and Tocher). This algorithm can shorten a calculating time period because it utilizes the redundancy of data, thereby calculating each quotient digit at a rough precision of every several higher-order bits without using the exact values of a partial remainder and a divisor. A calculating method which employs a quaternary SRT division algorithm, will be explained below.

It is assumed that a dividend N and a divisor D meet the condition of $N < (8/3) \cdot D$. The first calculation of the division proceeds as stated below.

The quotient digit q1 of the first calculation is evaluated from the following formulae of relations:

$$\left. \begin{array}{ll} q1 = 0 & \text{for } 0 \leq N < 0.5D \\ q1 = 1 & \text{for } 0.5D \leq N < 1.5D \\ q1 = 2 & \text{for } 1.5D \leq N \end{array} \right\} \quad \text{(Eqs. 6)}$$

The quotient Q1 and partial remainder P1 of the first calculation are respectively given by Eqs. 7.

$$\left. \begin{array}{l} Q1 = q1 \\ P1 = N - q1 \cdot D \end{array} \right\} \quad \text{(Eqs. 7)}$$

The second calculation, et seq. proceed as stated below.

The quotient digit qj+1 of the (j+1)th calculation is evaluated from the following formulae of relations:

$$\left. \begin{array}{ll} qj + 1 = -2 & \text{for } 4Pj < -1.5D \\ qj + 1 = -1 & \text{for } -1.5D \leq 4Pj < -0.5D \\ qj + 1 = 0 & \text{for } -0.5D \leq 4Pj < 0.5D \\ qj + 1 = +1 & \text{for } 0.5D \leq 4Pj < 1.5D \\ qj + 1 = +2 & \text{for } 1.5D \leq 4Pj \end{array} \right\} \quad \text{(Eqs. 8)}$$

The quotient Qj+1 and partial remainder Pj+1 of the (j+1)th calculation are respectively given by Eqs. 9 (9A and 9B):

$$Qj + 1 = Qj + qj + 1 \cdot 4^{-j} \quad \text{[Eq. 9A]}$$
$$Pj + 1 = 4Pj - qj + 1 \cdot D \quad \text{[Eq. 9B]}$$
(Eqs. 9)

When the above calculations are iterated n times till the attainment of a required precision, the final quotient Q and remainder R are respectively obtained as indicated by Eqs. 10:

$$Q = Qn - 1 + qn \cdot 4^{-(n-1)}$$
$$R = Pn \cdot 4^{-(n-1)}$$
(Eqs. 10)

Since the high radix SRT division algorithm can afford accurate results at a comparatively high speed, it is utilized in an LSI (large-scale integrated circuit) for floating-point calculations or in a microprocessor having a built-in floating-point arithmetic unit.

The division system of a floating-point coprocessor "R3010" manufactured by MIPS Computer Company is discussed in "IEEE MICRO", June 1988, page 57. In this system, the quaternary SRT algorithm is adopted. After the 9 higher-order bits of a partial remainder in a carry save form have been subjected to a carry propagation addition, the result is input to a quotient digit calculation circuit together with the 9 higher-order bits of a divisor, thereby obtaining the 2 bits of a quotient.

A similar operating system is adopted in a floating-point coprocessor which is discussed in "IEEE DIGEST OF TECHNICAL PAPERS", 1989, page 52.

SUMMARY OF THE INVENTION

In the prior-art example which concerns the use of a multiplier, the addition of intermediate products requiring a long carry propagation is first executed, and a rounding position is consequently determined, so it is inevitable that the rounding process is executed after the intermediate product addition. Since the intermediate product addition and the rounding process cannot be executed in parallel in this manner, a high-speed multiplication cannot be hoped for. It is therefore considered to perform this series of processes in a concurrent manner for a higher operating speed, thereby realizing a high-speed multiplication unit.

The first object of the present invention is to provide an arithmetic unit, such as a multiplier, in which a plurality of processes having hitherto been executed sequentially or serially are executed concurrently or in parallel, thereby rendering operations high in speed.

With the prior-art technique which concerns the use of an adder, a rounding process is executed using data which has been subjected to a normalizing process. Therefore, the overall processing time becomes long, which hampers the high-speed execution of the addition/subtraction between the floating-point numbers.

The second object of the present invention is to provide a floating-point arithmetic unit and method in which a normalizing process and a rounding process are executed in parallel, thereby heightening the speed of the addition/subtraction between floating-point numbers.

With the prior-art technique which concerns the divider, as illustrated in FIG. 63(a), one of the iterative calculations is executed by the sequential processing which consists of the calculations of the quotient digits (qj+1, qj+2) and those of the partial remainders (Pj, Pj+1, Pj+2). More specifically, evaluation of the quotient digit qj+1 from the partial remainder Pj in accordance with (Eqs. 3) or (Eqs. 8), and evaluation of the partial remainder Pj+1 from the partial remainder Pj and the quotient digit qj+1 having been already obtained, in accordance with (Eq. 4B) or (Eq. 9B), it is successively repeated. Conceptually speaking, the calculations shown in FIG. 63(a) are performed by repetitively operating a single quotient digit calculator and a single partial remainder calculator as illustrated in FIG. 63(b).

Of the quotient digit and the partial remainder, the latter can be calculated at high speed by a carry save addition. In contrast, the former makes it difficult to calculate at high-speed because of a process in which the partial remainder is subjected to the carry propagation addition and is thereafter processed by a quotient digit decision circuit together with the divisor. Consequently, it is also difficult to heighten the speed of the whole division process.

The third object of the present invention is to provide a high radix division control method which shortens a processing time period for each of iterative calculations and thus heightens the speed of a divisions process, and a high radix divider to which the control method is applied.

In order to accomplish the first object, the present invention proposes an arithmetic unit which accepts two numerical values and executes an operation by the use of the two numerical values; comprising addition/subtraction means for executing either of an addition and a subtraction on the basis of the two numerical values; normalization means for executing a normalizing process in which a mantissa part of a result obtained by the execution of the addition/subtraction means is shifted so that a high-order digit having developed anew in the result may come to a predetermined position, and in which an exponent part of the result is corrected in accordance with the number of shift places in the shift of the mantissa part; and rounding means for executing a rounding process in which, on condition that the mantissa part of the result exceeds a predetermined number of digits, the number of digits of the mantissa part is reduced in conformity with a rounding mode designated beforehand; the rounding means executing at least part of the rounding process by the use of the numerical values not yet subjected to the normalizing process, in parallel with the execution of either of the addition/subtraction means and the normalization means.

In a case where the arithmetic unit is, for example, a multiplier which obtains partial products between a multiplier factor and a multiplicand and then adds up the obtained partial products, thereby evaluating a final product, the multiplier comprises a partial product adder which evaluates two intermediate products from the partial products; an intermediate product adder which adds the two intermediate products as to higher-order digits thereof above a predetermined digit thereof, assuming a plurality of possible values of carries from lower-order digits thereof below the predetermined digit, thereby obtaining a plurality of added results in correspondence with the assumed values; a carry look-ahead circuit which generates carry information on the carries from the two intermediate products in parallel with the addition of the intermediate products; and a selector circuit which selects one of the added results of the intermediate product adder on the basis of an output of the carry look-ahead circuit.

Owing to the above expedient that the rounding process and the addition of the intermediate products are executed in parallel or concurrently, a multiplier of high operating speed can be provided.

By the way, in the case of a multiplier which executes only round-down as the rounding process, only the carries need to be considered, and substantially no process may be executed as the rounding process. The present invention is also applicable to such a circuit arrangement.

In order to accomplish the second object, the present invention proposes a floating-point arithmetic unit having an aligner which accepts two floating-point operands, and which aligns mantissa parts of both the operands; addition/subtraction means for executing either of an addition or a subtraction between the aligned mantissa parts of both the operands; normalization means for executing a normalizing process in which a mantissa part of a result obtained by the execution of the addition/subtraction means is shifted so that a high-order digit having developed anew in the result may come to a predetermined position, and in which an exponent part of the result is corrected in accordance with the number of shift places in the shift of the mantissa part; and rounding means for executing a rounding process in which, on condition that the mantissa part of the result exceeds a predetermined number of digits, the number of digits of the mantissa part is reduced in conformity with a rounding mode designated beforehand; comprising means for accepting from the addition/subtraction means the mantissa parts not yet subjected to the normalizing process, so as to execute part of the rounding process by the use of the accepted mantissa parts and to thereafter execute the normalizing process and remaining part of the rounding process in parallel.

Further, the present invention proposes a floating-point arithmetic unit having an aligner which accepts two floating-point operands, which finds an absolute value of a difference between exponent parts of both the operands, and which aligns mantissa parts of both the operands in such a way that the mantissa part of the operand having the smaller exponent part is shifted toward a low-order position thereof in correspondence with the found absolute value; addition/subtraction means for executing either of an addition or a subtraction between the aligned mantissa parts of both the operands; normalization means for executing a normalizing process in which a mantissa part of a result obtained by the execution of the addition/subtraction means is shifted so that a high-order digit having developed anew in the result may come to a predetermined position, and in which an exponent part of the result is corrected in accordance with the number of shift places in the shift of the mantissa part; and rounding means for executing a rounding process in which, on condition that the mantissa part of the result exceeds a predetermined number of digits, the number of digits of the mantissa part is reduced in conformity with a rounding mode designated beforehand; comprising rounding correction decision means for deciding with the mantissa parts not yet subjected to the normalizing process, if a correction for adding +1 to the mantissa part of the result is required in the rounding process, in each of three supposed cases where the mantissa part of the result is shifted one bit toward a low-order position thereof in the normalizing process, where it is shifted zero bit toward a high-order position thereof and where it is shifted one bit toward the high-order position thereof; rounding position decision means for deciding with the mantissa parts not yet subjected to the normalizing process, if the shift of the mantissa part in the normalizing process falls under any of the three cases; and selection means for selecting either of validating one of the three cases in the rounding correction decision means and invalidating all of the three cases, on the basis of a decided result of the rounding position decision means; thereby executing the normalizing process and the rounding process in parallel.

Also, the present invention proposes a floating-point operation method having the alignment step of accepting two floating-point operands, and aligning mantissa parts of both the operands; the addition/subtraction step of executing either of an addition or a subtraction between the aligned mantissa parts of both the operands; the normalization step of shifting a mantissa part of a result obtained by the execution of the addition/subtraction step, so that a high-order digit having developed anew in the result may come to a predetermined position, and correcting an exponent part of the result in accordance with the number of shift places in the shift of the mantissa part; and the rounding step of reducing the number of digits of the mantissa part in conformity with a rounding mode designated beforehand, on condition that the mantissa part of the result exceeds a predetermined number of digits; comprising the step of accepting the mantissa parts not yet subjected to the normalization step, so as to execute part of the rounding process by the use of the accepted mantissa parts and to thereafter execute the normalization step and remaining part of the rounding step in parallel.

Besides, the present invention proposes a floating-point operation method having the alignment step of accepting two floating-point operands, finding an absolute value of a difference between exponent parts of both the operands, and aligning mantissa parts of both the operands in such a way that the mantissa part of the operand having the smaller exponent part is shifted toward a low-order position thereof in correspondence with the found absolute value; the addition/subtraction step of executing either of an addition and a subtraction between the aligned mantissa parts of both the operands; the normalization step of shifting a mantissa part of a result obtained by the execution of the addition/subtraction step, so that a high-order digit having developed anew in the result may come to a predetermined position, and correcting an exponent part of the result in accordance with the number of shift places in the shift of the mantissa part; and the rounding step of reducing the number of digits of the mantissa part in conformity with a rounding mode designated beforehand, on condition that the mantissa part of the result exceeds a predetermined number of digits; comprising the rounding correction decision step of deciding with the mantissa parts not yet subjected to the normalization step, if a correction for adding +1 to the mantissa part of the result is required at the rounding step, in each of three supposed cases where the mantissa part of the result is shifted one bit toward a low-order position thereof at the normalization step, where it is shifted zero bit toward a high-order position thereof and where it is shifted one bit toward the high-order position thereof; the rounding position decision step of deciding with the mantissa parts not yet subjected to the normalization step, if the shift of the mantissa part at the normalization step falls under any of the three cases; and the selection step of selecting either of validating one of the three cases at the rounding correction decision step or invalidating all of the three cases, on the basis of a decided result of the rounding position decision step; thereby executing the normalization step and the rounding step in parallel.

With the expedient of the present invention concerning the adder, the rounding correction decision can be rendered using the mantissa parts not yet subjected to the normalizing process, by supposing the three cases as the number of shift places of the mantissa part of the result in the normalizing process, so that the normalizing process and the rounding process are permitted to proceed in parallel or concurrently. Besides, since only the several lower-order bits of the mantissa parts are used in the rounding correction decision process, this rounding correction decision process and the process of the higher-order bits in the addition/subtraction process can be executed in parallel or concurrently. Moreover, since a circuit for the rounding correction decision process can be originally constructed of a small number of gates, the number of gates augments very slightly due to the increase of the number of such circuits to three. Thus, the time period of all the processes can be shortened without complicated circuitry.

In order to accomplish the third object, the present invention proposes an iterative type high radix division control method wherein a quotient of a binary number is calculated every n bits from a high-order digit thereof on the basis of a dividend and a divisor which are represented by binary numbers, comprising the step of calculating a quotient digit of n bits; the step of previously calculating partial remainders as to all values which can be taken as the quotient digit, in parallel with the step of calculating the quotient digit; the step of previously calculating next quotient digits from the previously-calculated partial remainders and the divisor, in parallel with the step of calculating the quotient digit; the step of selecting a value corresponding to the first-mentioned quotient digit of the n bits from among the previously-calculated partial remainders, and also selecting a value corresponding to the first-mentioned quotient digit from among previously-calculated values of the next quotient digit, when the first-mentioned quotient digit has been calculated; and the step of saving the selected partial remainder and the selected next quotient digit, and proceeding to the subsequent previous calculation of partial remainders and the subsequent calculation of a quotient digit.

Also, the present invention proposes an iterative type high radix divider wherein a quotient of a binary number is calculated every n bits from a high-order digit thereof on the basis of a dividend and a divisor which are represented by binary numbers, comprising means for calculating a quotient digit of n bits; means for previously calculating partial remainders as to all values which can be taken as the quotient digit, in parallel with the calculation of the quotient digit; means for previously calculating next quotient digits from previously-calculated values of the partial remainders and the divisor, in parallel with the calculation of the quotient digit; means for selecting one of the previously-calculated values of the partial remainders corresponding to the first-mentioned quotient digit calculated; means for selecting one of previously-calculated values of the next quotient digit corresponding to the first-mentioned quotient digit calculated; means for saving the selected partial remainder and the selected next quotient digit; and means for transferring the selected partial remainder and the selected next quotient digit to the corresponding calculation means in order to process next n bits.

Further, the present invention proposes an iterative type high radix divider wherein a quotient of a binary number is calculated every n bits from a high-order digit thereof on the basis of a dividend and a divisor which are represented by binary numbers, comprising means for calculating a quotient digit of n bits; partial-remainder previous-calculation circuits which receive a partial remainder and the divisor, and which previously calculate partial remainders as to all values that can be taken as the quotient digit, in parallel with the calculation of the quotient digit;quotient previous-calculation circuits which previously calculate a next quotient digit from the previously-calculated partial remainders and the divisor, in parallel with the calculation of the quotient digit; a partial remainder selector which selects a value corresponding to the first-mentioned n-bit quotient digit calculated, from among the previously-calculated partial remainders, when the first-mentioned quotient digit has been calculated; a previously-calculated quotient value selector which selects a value corresponding to the first-mentioned n-bit quotient digit calculated, from among previously-calculated values of the next quotient digit, when the first-mentioned quotient digit has been calculated; an input data selector which selects one of the selected partial remainder and the dividend; and a quotient digit calculation circuit which calculates a subsequent quotient digit in accordance with the selected previously-calculated next quotient digit value.

In the iterative type high radix divider mentioned above, an output of the input data selector is connected to only that one of the partial-remainder previous-calculation circuits for which "0" is assumed as the quotient digit; an output of the partial remainder selector is connected to the other partial-remainder previous-calculation circuits for each of which a value different from "0" is assumed as the quotient digit; the input data selector selects the dividend before the calculation of the quotient digit; the partial remainder selector and the previously-calculated quotient value selector select the respective values calculated assuming "0" as the quotient digit, before the calculation of the quotient digit; the input data selector selects the partial remainder during the calculation of the quotient; and the partial remainder selector and the previously-calculated quotient value selector select the respective values calculated assuming the calculated first-mentioned quotient digit, during the calculation of the quotient; whereby the input data selection processing is removed from the calculations to be executed by the other partial-remainder previous-calculation circuits each of which requires a calculating time period longer than that of the partial-remainder previous-calculation circuit with "0" assumed as the quotient digit, so the calculating time period of the partial remainders can be shortened to realize a high-speed division.

Also in the iterative type high radix divider mentioned before, an output of the partial remainder selector is connected to all of the partial-remainder previous-calculation circuits; the input data selector selects one of the dividend and an output of that one of the partial-remainder previous-calculation circuits for which "0" is assumed as the quotient digit; an output of the input data selector is connected to the one quotient previous-calculation circuit for which "0" is assumed as the quotient digit; the partial remainder selector selects the correct value from among the selected output of the input data selector and outputs of the other partial-remainder previous-calculation circuits for each of which a value different from "0" is assumed as the quotient digit; the input data selector selects the dividend before the calculation of the quotient digit; the partial remainder selector and the previously-calculated quotient value selector select the respective values calculated assuming "0" as the quotient digit, before the calculation of the quotient digit; the input data selector selects the partial remainder during the calculation of the quotient; and the partial remainder selector and the previously-calculated quotient value selector select the respective values calculated assuming the calculated first-mentioned quotient digit, during the calculation of the quotient; whereby the input data selection processing is removed from the calculations to be executed by the other partial-remainder previous-calculation circuits each of which requires a calculating time period longer than that of the partial-remainder previous-calculation circuit with "0" assumed as the quotient digit, so the calculating time period of the partial remainders can be shortened to realize a high-speed division.

In the iterative type high radix divider mentioned before, the partial-remainder previous-calculation circuits adopt a high radix SRT division algorithm (SRT: Sweeney, Robertson and Tocher) which can calculate the quotient digit, using several higher-order bits of each of the partial remainder and the divisor; and a lower-order-partial-remainder calculation circuit is comprised which calculates a lower-order partial remainder after the quotient digit calculation in order to supply that lower-order data of the previously-calculated partial remainder value which disappears n bits each time the partial-remainder previous-calculation circuits calculate only the bits required for the quotient digit calculation; whereby the quotient calculation is executed at high speed with only a slight increase of the logic scale.

The iterative type high radix divider mentioned before can also adopt a system wherein the partial-remainder previous-calculation circuits are respectively constructed of carry save adders; the partial remainder selector is constructed of selectors for selecting sums, and selectors for selecting carry signals, the sums and the carry signals being delivered from the partial-remainder previous-calculation circuits; the input data selector is constructed of selectors for selecting the dividend and outputs of the sum selecting selectors of the partial remainder selector, and selectors for selecting zero and outputs of the carry signal selecting selectors of the partial remainder selector; and the quotient previous-calculation circuits are respectively constructed of circuits which execute the calculations on the basis of the divisor and the partial remainders in a carry save form; whereby the partial-remainder previous calculations are executed at high speed.

The iterative type high radix divider mentioned before can also adopt a system wherein the partial-remainder previous-calculation circuits are respectively constructed of carry save adders; the input data selector is constructed of a selector for selecting the dividend and a sum delivered from the partial-remainder previous-calculation circuit for which "0" is assumed as the quotient digit, and a selector for selecting zero and a carry signal delivered from the partial-remainder previous-calculation circuit for which "0" is assumed as the quotient digit; the partial remainder selector is constructed of selectors for selecting outputs of the input data selector, and sums and carry signals delivered from the partial-remainder previous-calculation circuits for each of which the value different from "0" is assumed as the quotient digit; and the quotient previous-calculation circuits are respectively constructed of circuits which execute the calculations on the basis of the divisor and the partial remainders in a carry save form; whereby the partial-remainder previous calculations are executed at high speed.

Besides, the iterative type high radix divider mentioned before can also adopt a system wherein the partial-remainder previous-calculation circuits and the lower-order-partial-remainder calculation circuit are respectively constructed of carry save adders; the partial remainder selector is constructed of selectors for selecting sums, and selectors for selecting carry signals, the sums and the carry signals being delivered from the partial-remainder previous-calculation circuits; the input data selector is constructed of selectors for selecting the dividend and outputs of the sum selecting selectors of the partial remainder selector, and selectors for selecting zero and outputs of the carry signal selecting selectors of the partial remainder selector; and the quotient previous-calculation circuits are respectively constructed of circuits which execute the calculations on the basis of the divisor and the partial remainders in a carry save form; whereby the partial-remainder previous calculations are executed at high speed.

Further, the iterative type high radix divider mentioned before can execute the previous quotient calculations at high speed in such a way that the partial-remainder previous-calculation circuits are constructed of circuits which deliver values obtained by half-adding the sums and the carry signals, and that the processing of the additions between the previously-calculated partial remainder values and the divisor in the quotient previous-calculation circuits are changed from full-additions to half-additions without increasing the calculating time periods of the partial-remainder previous-calculation circuits.

With the expedient of the present invention concerning the divider, the previous calculations of the partial remainders and the previous calculation of the next quotient digit are executed in parallel with or concurrently with the quotient digit calculation on which the longest time is expended in the high radix operation, so that the processing time period of one iterative calculation stage can be shortened to nearly half of the required time period in the prior art. That is, the partial remainder calculations and the quotient digit calculation are separated, and the calculation of the current quotient digit and the preprocessing for the calculation of the next quotient digit are executed in parallel or concurrently, whereby the time period of the quotient digit calculation can be approximately reduced to half.

Accordingly, when the present invention is applied to an LSI (large-scale integrated circuit) or a microprocessor for floating-point operations, a plurality of iterative calculation stages in one cycle become possible subject to the same clock frequency as in the prior art. On the other hand, iterative calculations at a clock frequency which is substantially double become possible subject to the same number of cycles as in the prior art. As a result, an arithmetic unit whose performance of divisions is sharply enhanced can be offered.

BRIEF DESCRIPTION OF THE DRAWINGS

FIG. 9 is a table for explaining the function of the rounding value calculation circuit;

FIG. 10 is also a table for explaining the function of the rounding value calculation circuit;

FIG. 17 is a block diagram for explaining the function of the rounding value calculation circuit;

FIG. 18 is a table for explaining the function of the rounding value calculation circuit;

FIG. 21 is a table for explaining the function of the condition determination circuit;

FIG. 22 is a block diagram for explaining the function of a control logic circuit which constitutes the multiplier having the integral multiplication function;

FIGS. 23a and 23b are tables for explaining the function of the control logic circuit;

FIG. 25 is a table for explaining the multiplier of the present invention having a special number processing function;

FIG. 31 is a table for explaining concrete examples of signals in the present invention;

FIG. 32 is also a table for explaining concrete examples of signals in the present invention;

FIG. 33 is a diagram for explaining concrete examples of signals in the present invention;

FIG. 34 is also a diagram for explaining concrete examples of signals in the present invention;

FIG. 35 is an explanatory diagram for concrete examples of signals in the present invention;

FIG. 36 is also an explanatory diagram for concrete examples of signals in the present invention.

Further.

FIG. 39 is a diagram showing the forms of the input and output data of an aligner circuit in the embodiment;

Still further.

DESCRIPTION OF THE PREFERRED EMBODIMENTS

Figure 1:
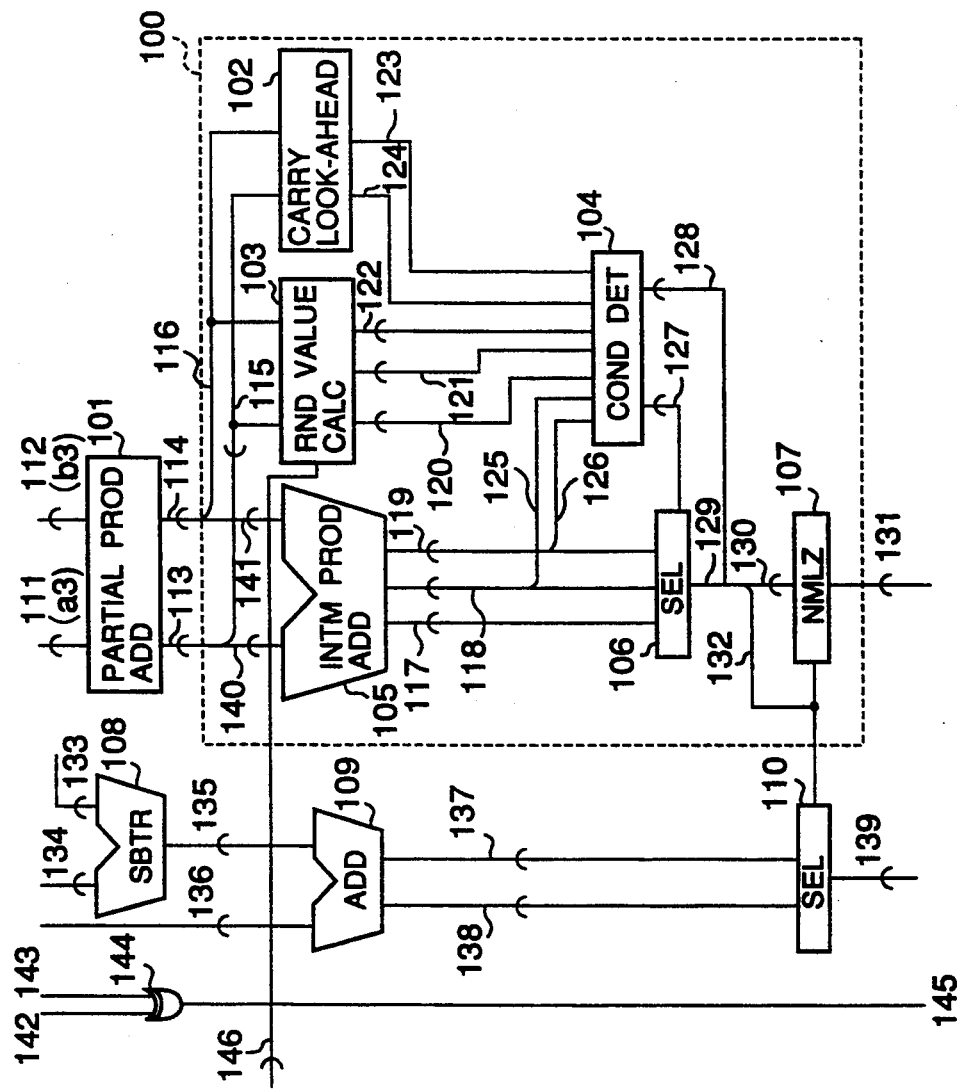
FIG. 1 is a block diagram illustrative of an embodiment of a multiplier according to the present invention.

FIG. 1 illustrates an embodiment of the present invention concerning a multiplier which is an arithmetic unit for a multiplication. In this embodiment, contrivances to be described below are made in order to execute the addition of intermediate products, the normalization of an added result and the rounding process of a normalized result in parallel or concurrently.

Two numbers of 106 bits are applied to an intermediate product adder 105. However, with note taken of the fact that bits down to a certain digit as reckoned from a high-order digit or the MSB (most significant bit) are used as mantissa parts, the intermediate product adder 105 shall accept the bits down to the certain digit (signals 140 and 141) of the intermediate products so as to calculate them. On that occasion, a carry originally arises from lower-order digits which have not been accepted in the calculation. A considerable time period, however, is expended until the calculation of the carry ends. Therefore, with note taken of the fact that the carry has a value of "1" or "0", the calculation of (signal 140+signal 141) and the calculation of (signal 140+signal 141+1) shall be executed at the same time, and either of the two calculated values shall be selected when information on the carry (as found by a carry look-ahead circuit 102) has settled.

Meanwhile, the rounding is usually executed in order to set the mantissa part of the final calculated result at 52 bits. For this purpose, "0" or "1" is added at a predetermined rounding position (the rounding position differs depending upon whether the sum e of the intermediate products #1 (d1) and #2 (d2) indicated in FIG. 30(c) has one digit or two digits as its integer part). Thus, when the value "0" or "1" based on the carry stated before is taken into consideration, any of the values "0", "1" and "2" is involved in the calculation of (signal 140+signal 141). In this embodiment, therefore, the calculation of (signal 140+signal 141) for a signal 119, the calculation of (signal 140+signal 141+1) for a signal 118, and the calculation of (signal 140+signal 141+2) for a signal 117 shall be executed at the same time. Further, the carry information (to be found by the carry look-ahead circuit 102) and necessary information on the rounding (to be found by a rounding value calculation circuit 103) shall be obtained at the same time.

When decimal position information dependent upon the carry, rounding and normalization (to be found from the results produced by the intermediate product adder 105) have settled, appropriate ones of them are selected (by a condition determination circuit 104 being a selector circuit, and a selector 106). In this way, the parallel or concurrent processing is realized.

In this embodiment, the intermediate product adder 105 evaluates the sum of the intermediate products #1 (d1) and #2 (d2) for the 55th digit to the 106th digit as reckoned from the low-order digit of these intermediate products.

The carry look-ahead circuit 102 calculates the carry of the 52nd digit on the basis of the first digit to the 51st digit as reckoned from the low-order digit of the intermediate products #1 (d1) and #2 (d2).

The rounding value calculation circuit 103 finds rounding values under the assumption of four patterns to be stated below, for the 52nd digit to the 54th digit as reckoned from the low-order digit of the intermediate products #1 (d1) and #2 (d2). First, the two cases of "1" and "0" are assumed as the values of the carry from the 51st digit. Also assumed are two cases where the rounding position is moved or shifted and where not, depending upon whether or not the normalization is done. These cases are combined into the four patterns.

The condition determination circuit 104 selects one of four candidates for the rounding value, in accordance with the carry information of the 52nd digit delivered from the carry look-ahead circuit 102 and the information on the high-order digit (rounding position information) delivered from the intermediate product adder 105. Further, the circuit 104 generates a signal 127 indicating which of the signals 117, 118 and 119 is to be selected, on the basis of the determined rounding value and the carry from the 54th digit to the 55th digit as delivered from the carry look-ahead circuit 102. Simultaneously, this circuit 104 generates numerals at the 54th digit and the 53rd digit. These functions will be explained in detail later.

A partial product adder 101 is supplied with a mantissa 111 (a3) and a mantissa 112 (b3) which are the mantissa parts of a multiplicand and a multiplier factor, respectively. The adder 101 delivers an intermediate product 113 and an intermediate product 114 through the carry save addition of partial products generated from the mantissas 111 (a3) and 112 (b3). The intermediate products 113 and 114 are supplied to a circuit 100 which normalizes and rounds the final product. The outputs of the partial product adder 101 are expressed by "0" or "1" at each bit position.

In the multiplication conforming to the IEEE double-precision standard format (stipulated by the Institute of Electrical and Electronic Engineers), each of the mantissa parts is of 53 bits (containing one implicit bit), and hence, each of the intermediate products 113 and 114 being the outputs of the partial product adder 101 of the multiplier becomes 106 bits. Signals 115 and 116 correspond to the low-order digit thru the 54th digit of the respective intermediate products 113 and 114, while the signals 140 and 141 correspond to the 55th digit (reckoned from the low-order digit) thru the high-order digit of the respective intermediate products 113 and 114. Both the signals 115 and 116 are supplied to the carry look-ahead circuit 102 and the rounding value calculation circuit 103.

The carry look-ahead circuit 102 supplied with the signals 115 and 116 delivers that carry 123 from the 51st digit (reckoned from the low-order digit) and that carry 124 from the 54th digit which are developed by the addition of the signals 115 and 116.

The rounding value calculation circuit 103 generates bits 120 and 122 required for the rounding, from the signals 115 and 116, and it calculates the rounding value 121 on the basis of a mode signal 146 indicating a rounding sort or mode. The outputs 123 and 124 of the carry look-ahead circuit 102, and the outputs 120, 121 and 122 of the rounding value calculation circuit 103 are supplied to the condition determination circuit 104. The intermediate product adder 105 produces the sum 119 of the input signals 140 and 141, the result 118 obtained by incrementing the sum 119 by "1", and the result 117 obtained by incrementing the sum 119 by "2". The outputs 117, 118 and 119 of the intermediate product adder 105 are delivered to the data lines of the selector 106.

Besides, the high-order digits 125 and 126 of the respective signals 118 and 119 are supplied to the condition determination circuit 104.

The condition determination circuit 104 obtains the rounding position information from the inputs 125 and 126, and it determines the rounding value from the obtained information and the carry information 123. Further, it calculates 2 new lower-order bits based on the addition of the rounding value. Also, it produces the signal 127 for selecting any of the outputs 117, 118 and 119 of the 3-output intermediate product adder 105 in accordance with the carry based on the rounding and the carry 124 from the lower-order digits. The signal 127 is delivered to the control line of the selector 106. On the other hand, the signal 128 constitutes a signal 130 together with the output 129 of the selector 106. The signal 130 is supplied to a normalizer 107.

A line for the output 132 of the selector 106 is connected to the normalizer 107 and to a selector 110 for an exponent part. The normalizer 107 delivers a normalized mantissa part 131 with one implicit bit discarded, on the basis of the normalization information 132. The above is the operation of arithmetically processing the mantissa parts 111 and 112.

Meanwhile, the operation of arithmetically processing exponent parts 134 and 136 proceeds as stated below. A subtracter 108 subtracts a bias 133 from the exponent part 134 of the multiplier factor, and produces an output 135. An adder 109 produces the sum 137 between the output 135 and the exponent part 136 of the multiplicand, and an output 138 with the sum 137 incremented by "1". The outputs 137 and 138 are the exponent parts to be obtained in consequence of the normalization, and either 139 of them is selected on the basis of the normalization information 132 by the selector 110.

The sign part of the final product is obtained as the output 145 of an exclusive-OR circuit 144 which is supplied with the sign parts 142 and 143 of the two numbers.

The final product is obtained as the outputs 145, 139 and 131.

Next, the individual circuits constituting the multiplier will be explained.

Figures 2, 3:
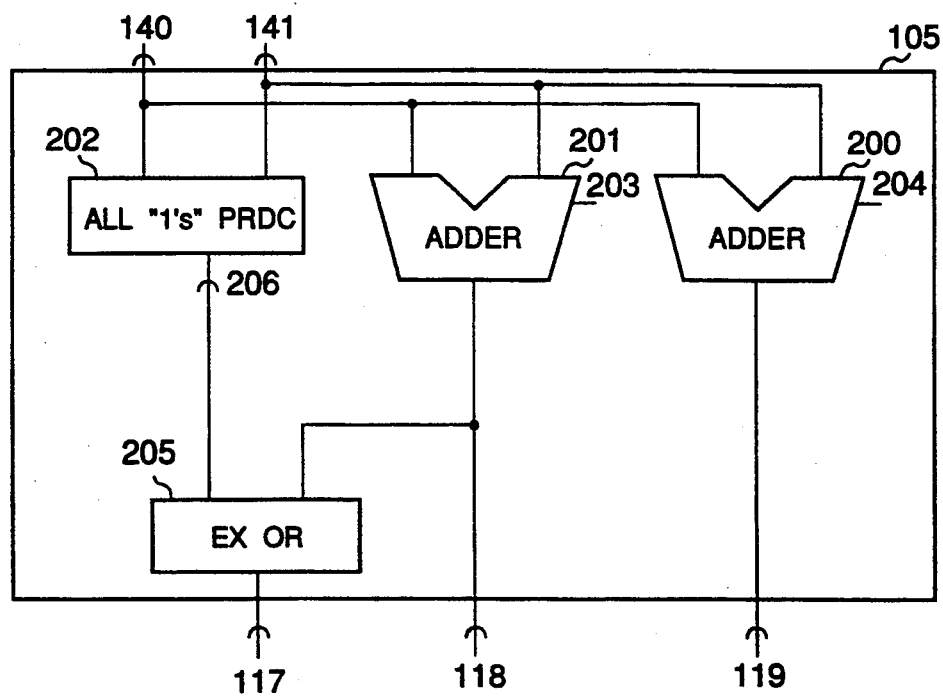
FIG. 2 is a block diagram of an intermediate product adder which constitutes the multiplier of the present invention.
FIG. 3 is a diagram for explaining the function of the intermediate product adder.

The intermediate product adder 105 is constructed as shown in FIG. 2. Adders 200 and 201 have their initial carries 204 and 203 fixed to "0" and "1", and they produce the sum 119 of the inputs 140 and 141 and the result 118 with the sum 119 incremented by "1", respectively. In parallel or concurrently with the additions of the adders 200 and 201, an "all 1's" predictor 202 produces the digit signals of a prediction signal 206 for the successions of "1's" from the lower-order digits of the added result 118, from the input signals 140 and 141 of these adders.

A method of generating the prediction signal 206 is as stated below. As shown in FIG. 3, a prediction signal for the "all 1's" succession of the added result of two numbers having n digits is expressed by the logical product (AND) between a prediction signal obtained up to (n−1) digits and a prediction signal at the nth digit. Using the prediction signals of the respective digits in combination, the "all 1's" predictor 202 generates all the prediction signals of the first thru 51st digits.

Figure 4:
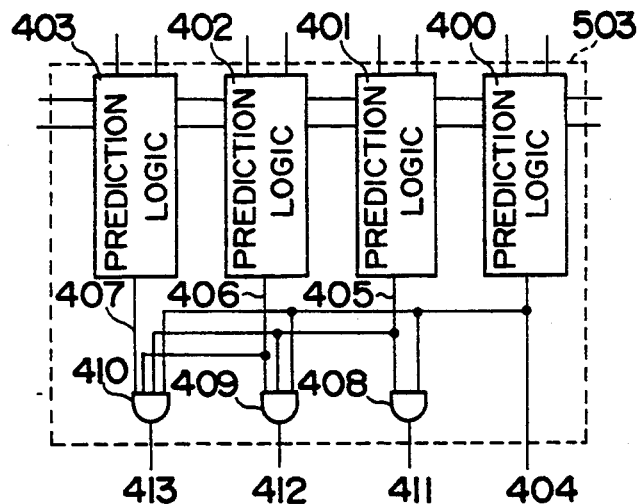
FIG. 4 is a block diagram for explaining the function of the intermediate product adder.

The method will be explained in detail. As shown in FIG. 4, four digits are put together as one block, and prediction signals 404~407 are respectively produced by prediction logic circuits 400~403 at the corresponding digits. The logical products of these prediction signals are taken by logic gates 408~410. Thus, the prediction signals 404, 411, 412 and 413 of the first thru fourth digits within the block are produced. Using these prediction signals, prediction signals extending over a plurality of blocks are produced as stated below.

Figure 5:
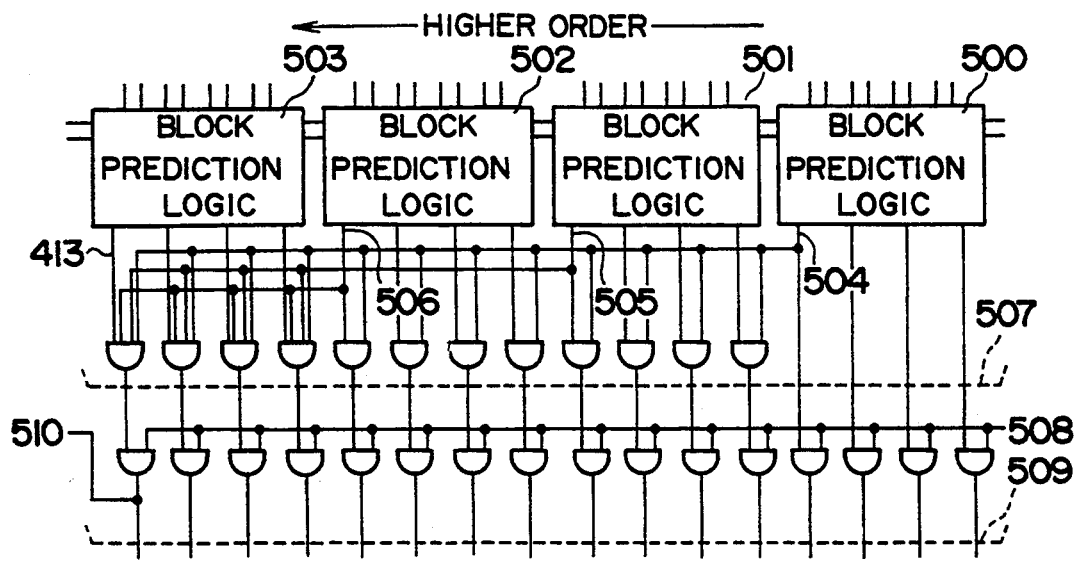
FIG. 5 is also a block diagram for explaining the function of the intermediate product adder.

Referring to FIG. 5, logical products are taken between prediction signals 504, 505 and 506 at the first thru fourth digits of lower-order blocks (blocks 500 and 501 with respect to a block 502) among the four blocks 500~503 and prediction signals at the first thru fourth digits of the high-order block. Then, there is obtained a prediction signal 507 for the "all 1's" succession as considered from the first digit of the low-order block 500 within the group of the blocks 500~503.

Further, a prediction signal 509 as considered from the first digit is obtained from the logical products between the digit signals of the prediction signal 507 and those of a prediction signal 508 produced by a group of lower-order blocks. In a group of still-higher-order blocks, a prediction signal as considered from the first digit is obtained from the logical products between the digit signals of an "all 1's" prediction signal 510 produced by the pertinent block group and those of a prediction signal produced within still-higher-order block group.

Owing to the above method, the digit signals of the prediction signal 206 up to the first digit ~ up to the 51st digit are obtained. An exclusive-OR circuit 205 delivers the exclusive-OR's 117 between the respective digits of the prediction signal 206 and the added result 118. The digit signals of the prediction signal 206 correspond to the signals of those carries from the lower-order digits which arise when the added result 118 has been incremented by "1". Therefore, the exclusive-OR's 117 of the signals 118 and 206 become the digit signals of the added result 118 as incremented by "1".

Figure 6:
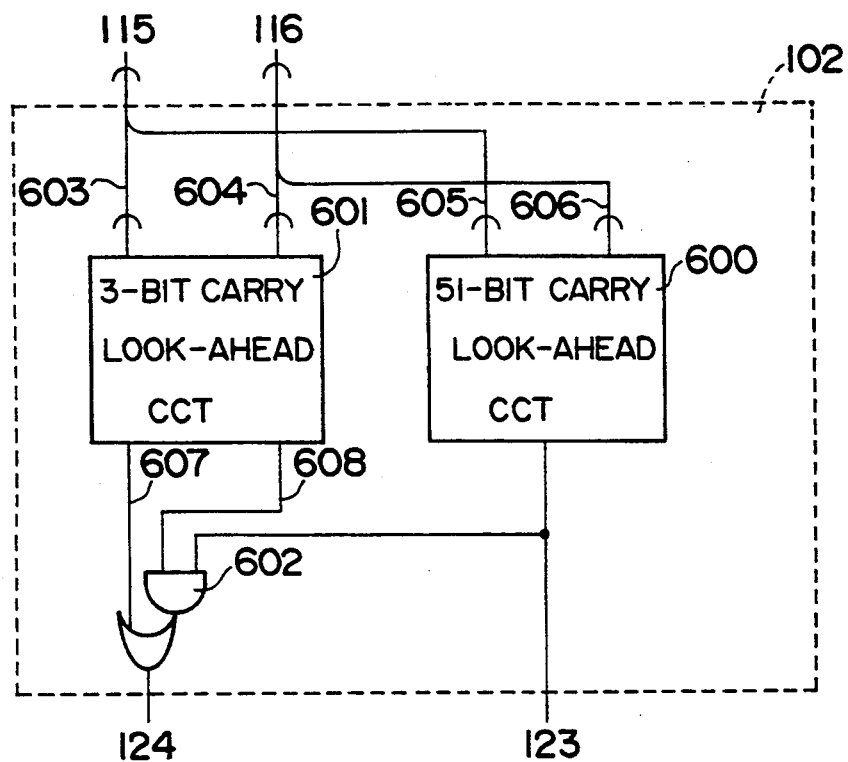
FIG. 6 is a block diagram of a carry look-ahead circuit which constitutes the multiplier of the present invention.

As shown in FIG. 6, the carry look-ahead circuit 102 includes a carry look-ahead circuit 600 of 51 bits and a carry look-ahead circuit 601 of 3 bits. The 51-bit carry look-ahead circuit 600 forms a carry signal 123 developing at the 52nd digit in the case of adding those digit signals 605 and 606 of the respective output intermediate products 113 and 114 of the partial product adder 101 which correspond to the low-order digit or LSD (least significant digit) ~ the 51st digit of these intermediate products. On the other hand, the 3-bit carry look-ahead circuit 601 receives those digit signals 603 and 604 of the respective intermediate products 113 and 114 which correspond to the 52nd digit~the 54th digit of these intermediate products, and it forms a carry propagation function 608 and a carry generation function 607. A composite gate 602 for a logical product (AND) and a logical sum (OR) receives the signals 607, 608 and 123, and delivers a signal 124.

The signal 608 is a carry signal to the 55th digit in the presence of a carry at the 52nd digit, while the signal 607 is a carry signal to the 55th digit from the 52nd digit~the 54th digit. Accordingly, the signal 124 becomes a carry signal developing at the 55th digit in the case of adding those digit signals 115 and 116 of the respective intermediate products 113 and 114 which correspond to the first digit~the 54th digit of these intermediate products.

The signal 123 is used for the settlement of bit information generated in the rounding process. On the other hand, the signal 124 is used for the generation of selection logic for the outputs of the intermediate product adder 105.

Figure 7:
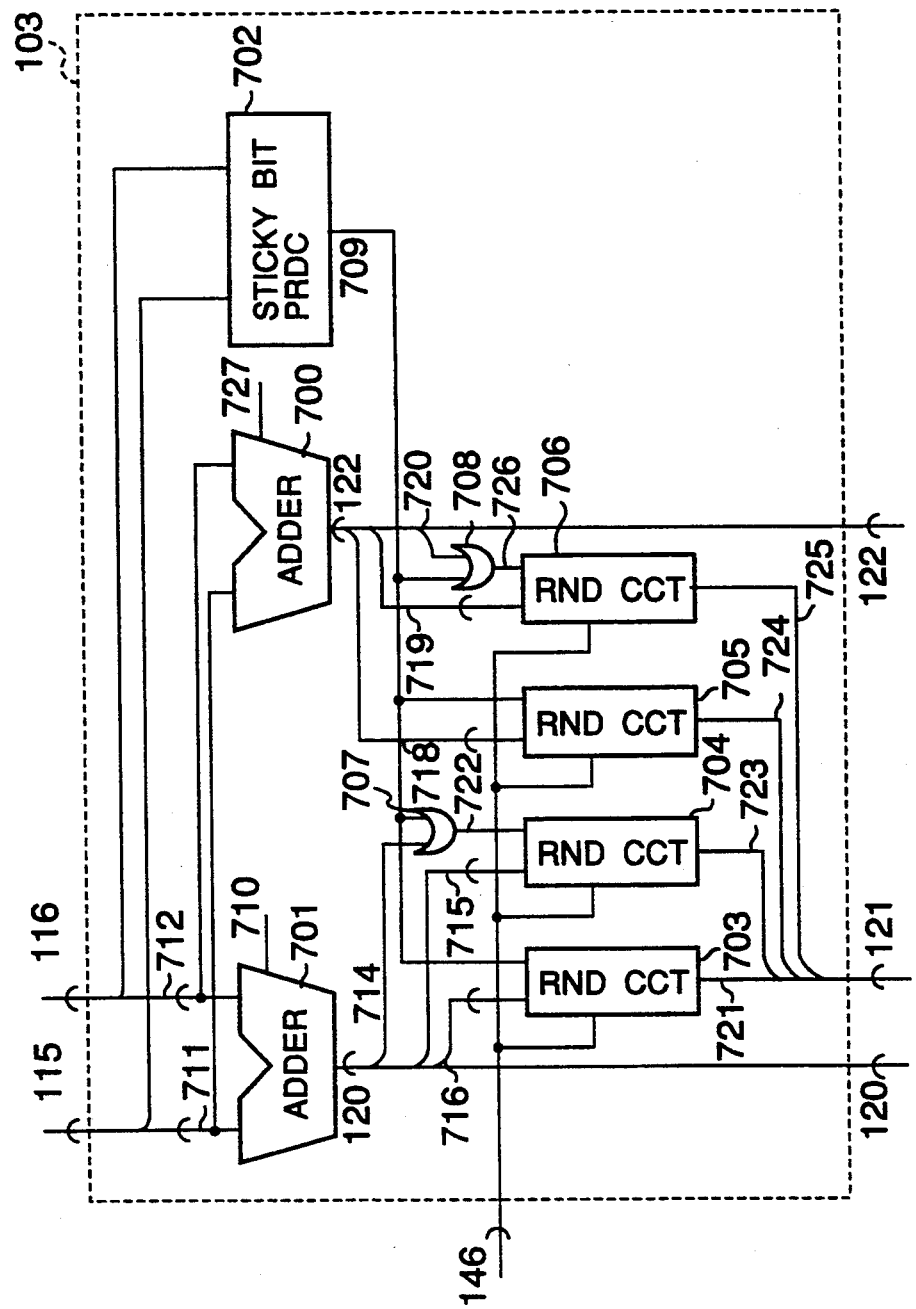
FIG. 7 is a block diagram of a rounding value calculation circuit which constitutes the multiplier of the present invention.

The rounding value calculation circuit 103 shown in FIG. 7 includes adders 700 and 701 by which the digit signals 711 and 712 of the outputs of the partial product adder 101, corresponding to the 54th digit~the 52nd digit as reckoned from the low-order digit of these outputs, are added assuming carries 710 and 727 from the 51st digit and below. This calculation circuit 103 also includes a sticky bit predictor 702 which predicts a sticky bit in case of adding the 51st and lower digits of the outputs of the partial product adder 101. Also included are rounding circuits 703~706.

Figure 8:
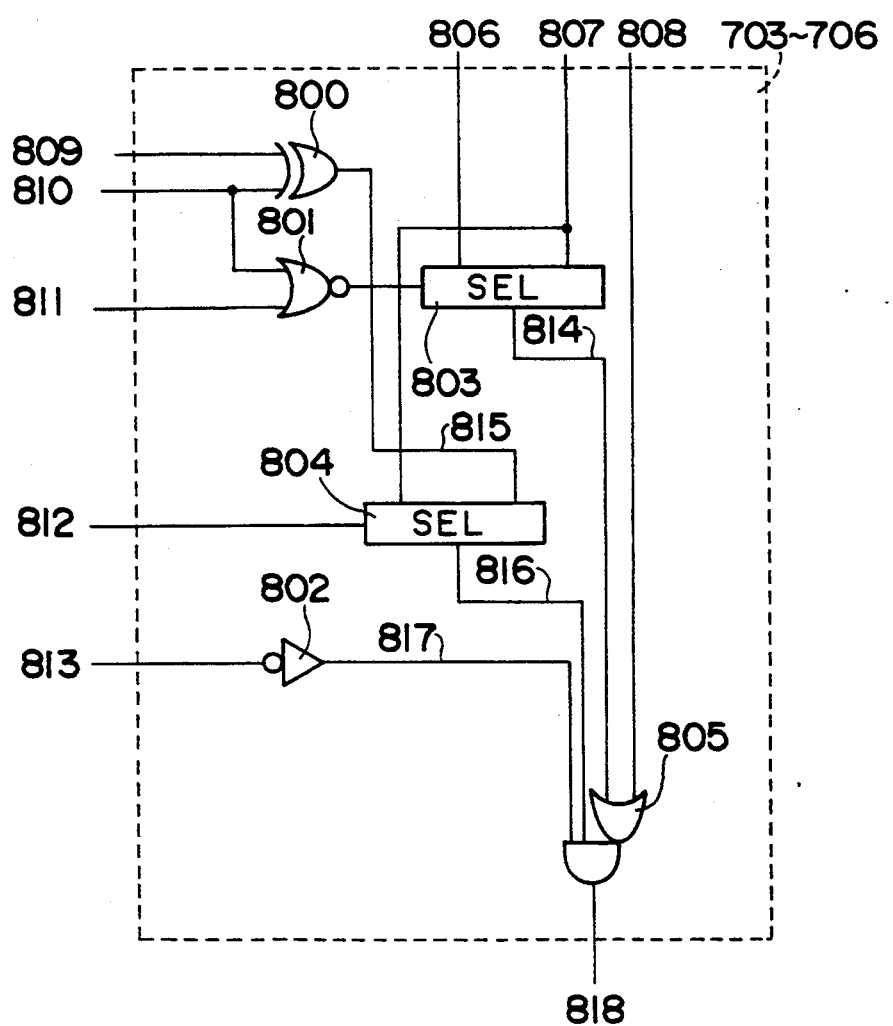
FIG. 8 is a block diagram for explaining the function of the rounding value calculation circuit.

The rounding circuits 703~706 execute the rounding processes in parallel or concurrently as to individual cases where both the required digits of the rounding and the positions thereof are assumed. Each of the rounding circuits 703~706 has a circuit arrangement as shown in FIG. 8, and it functions as tabulated in FIG. 9. The required bits of the rounding process are the least significant bit (LSB), a guard bit, the sticky bit, and a sign bit.

As indicated in FIG. 10, the above bits except the sign bit are determined with reference to the rounding position. The rounding position corresponds to the LSB, and the guard bit is one digit lower than the rounding position. The sticky bit signifies a bit whose value becomes "1" except when all the digits below the guard bit are "0's". The sticky bit predictor 702 predicts the sticky bit for the low-order digit thru the 51st digit, using prediction logic for the "all 0's" successions of the added result of the two numbers.

Figure 11:
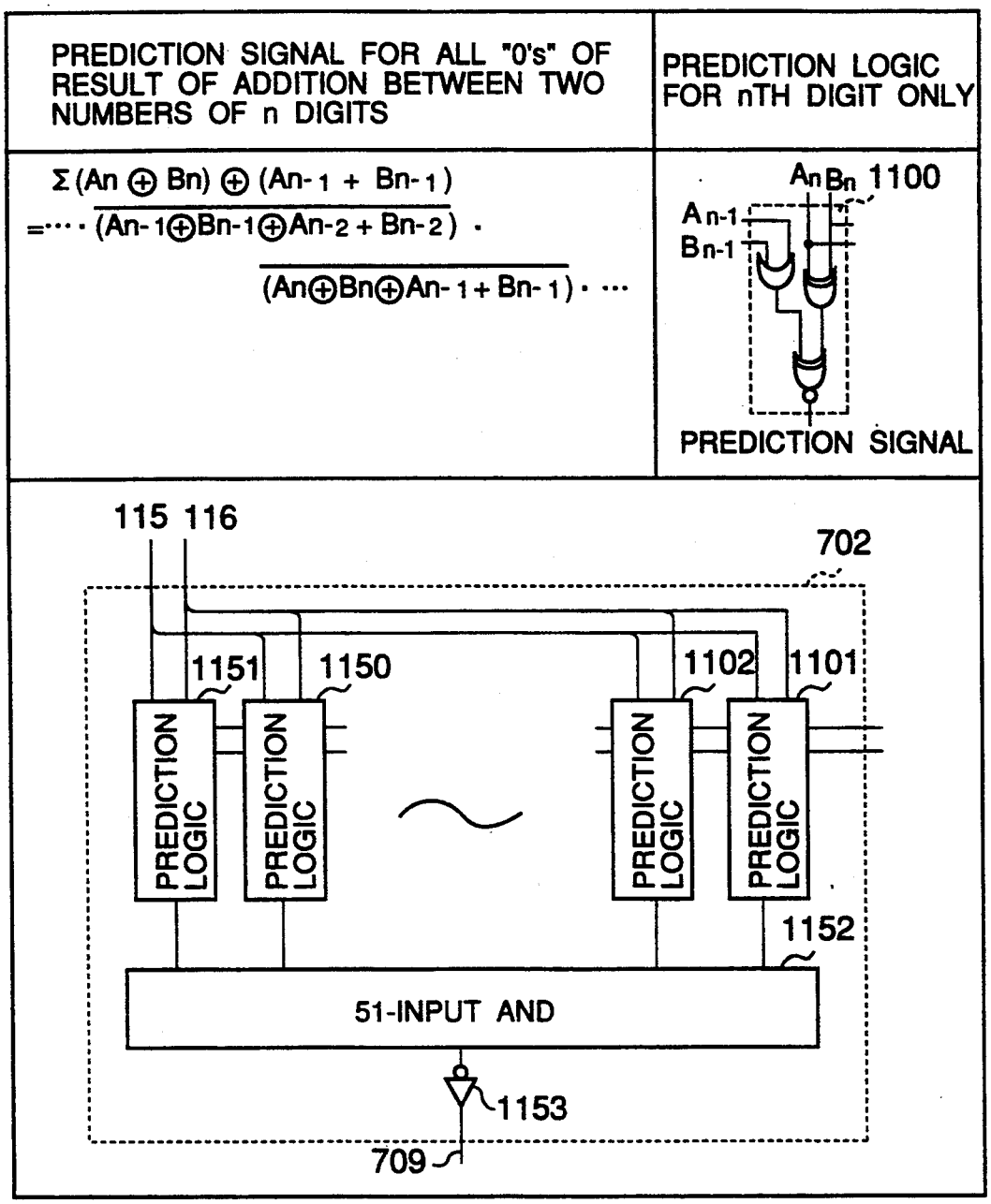
FIG. 11 is an explanatory diagram for the function of the rounding value calculation circuit.

The circuit arrangement of the predictor 702 is shown in FIG. 11. Prediction logic circuits 1101~1151 each corresponding to one digit deliver the prediction signals of the respective digits. A 51-input AND circuit 1152 takes the logical product of the digit prediction signals of the 51 digits on the basis of the prediction logic for the "all 0's" successions of the added result of the two numbers. An inverter 1153 inverts the output of the AND circuit 1152, thereby delivering the sticky bits 709.

Usually, the position of rounding is determined after the result of an intermediate product adder has settled. In contrast, according to this embodiment, the rounding position is assumed for high-speed processing without waiting for the result of the intermediate product adder. How to find the bits required for the rounding on that occasion, will be explained.

Figure 30:
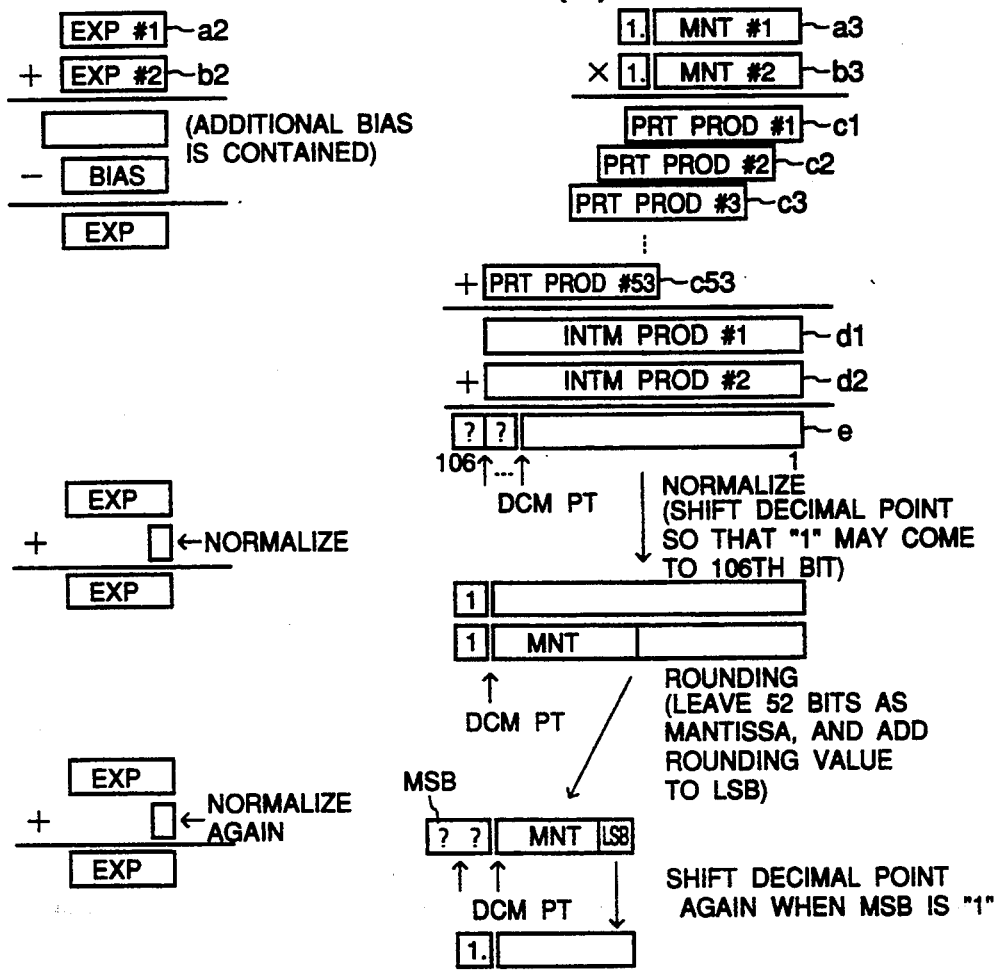
FIGS. 30(a), 30(b) and 30(c) are diagrams for explaining a conventional multiplication method.

As indicated in FIG. 30(c), the position of the decimal point of the output of the intermediate product adder (105 in FIG. 1) becomes the second digit as reckoned from the high-order digit. The rounding position is set at the 52nd decimal position in the rounding process. Since, however, the integer part above the decimal point needs to be one digit, the decimal point and the rounding position move depending upon the value of the high-order digit or MSD (most significant digit). The relations between the MSD and the rounding position are as listed in FIG. 10. When the MSD is "0", the rounding position becomes the 53rd digit as reckoned from the low-order digit or LSD (least significant digit), and when the MSD is "1", the rounding position becomes the 54th digit as reckoned from the LSD. Besides, the positions of the guard bit and the sticky bit in each of the cases are determined by the definitions of these bits. The LSB's and the guard bits in the respective cases are produced by the adders 700 and 701 shown in FIG. 7. The sticky bit 709 in the case where the MSD is "0", are produced by the sticky bit predictor 702. The sticky bits 722 and 726 in the case where the MSD is "1", are respectively obtained from the logical sum between the signal 709 and the low-order digit 714 of the output 120 of the adder 701 and from the logical sum between the signal 709 and the low-order digit 720 of the output 122 of the adder 700.

The adders 700 and 701 produce the two sorts of added results 122 and 120 with the carries 727 and 710 from the lower-order digits assumed and fixed to "0" and "1", respectively. Further, different rounding positions are assumed for the results 120 and 122 so as to form the bits required for the rounding. The bits obtained with the above method are of four groups which are based on the presence or absence of normalization (the difference of the rounding position) and the difference of the carry from the lower-order digits (the differences of the values of the required bits of the rounding).

Among the rounding circuits 703~706 which are supplied with the respective groups of bits, the circuit 703 calculates the rounding value in the case where both the normalization and the carry are existent, the circuit 704 does the same in the case where the normalization is not existent and where the carry is existent, the circuit 705 does the same in the case where the normalization is existent and where the carry is not existent, and the circuit 706 does the same in the case where neither the normalization nor the carry are existent.

Figure 12:
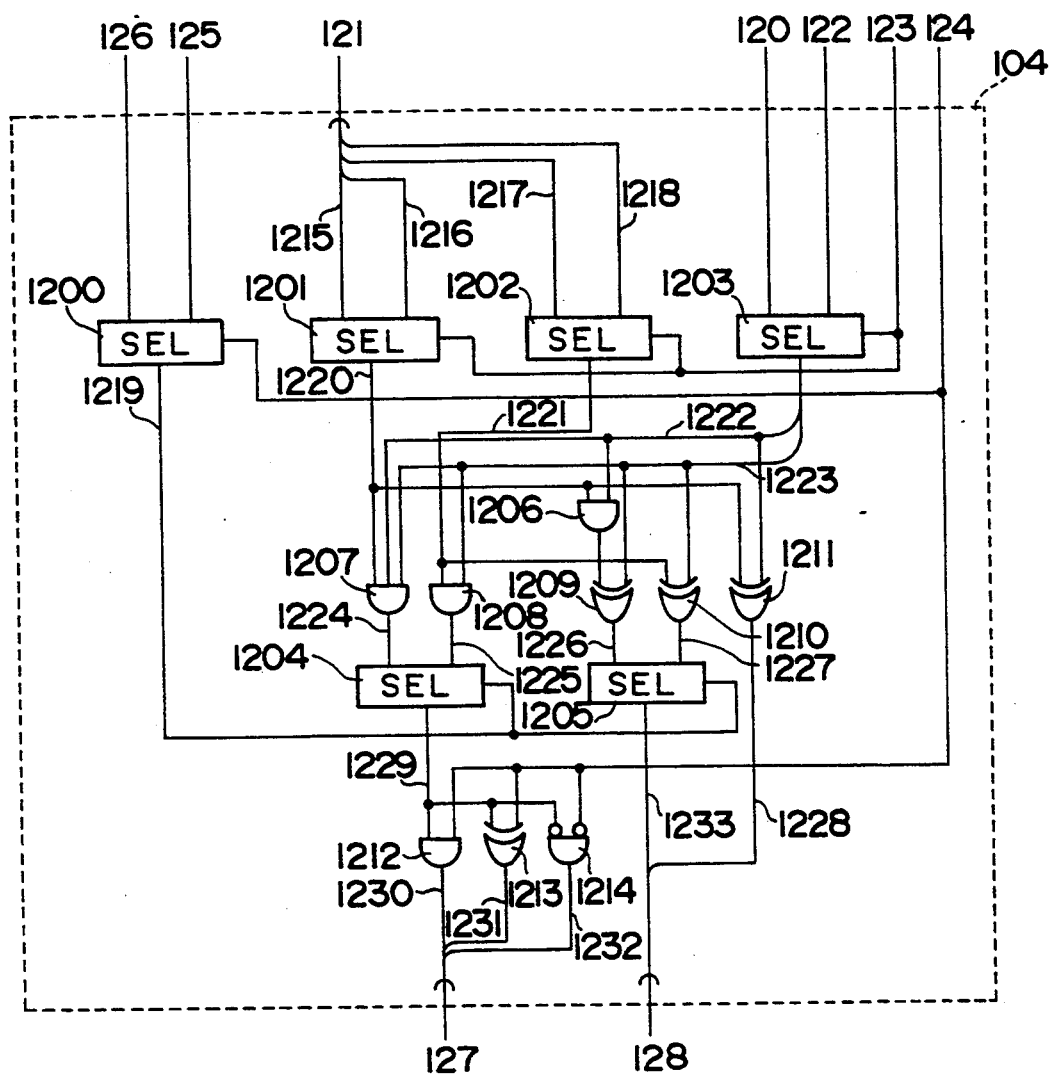
FIG. 12 is a block diagram of a condition determination circuit which constitutes the multiplier of the present invention.

As shown in FIG. 12, the condition determination circuit 104 includes selectors 1201, 1202 and 1203 by which either of the rounding values 1215 (724) or 1216 (721), either of the rounding values 1217 (725) or 1218 (723) and either of the added results 120 or 122, these rounding values and added results having been obtained under the assumed values of the output 123 of the carry look-ahead circuit 102, are respectively selected in accordance with the carry 123 from the lower-order digits having settled.

Also, the circuit 104 includes a selector 1200 which selects either of the MSD's 126 and 125 of the outputs of the intermediate product adder 105 as have been found under the assumed values of the output 124, in accordance with the carry 124 having settled, thereby forming a signal 1219 indicative of the rounding position.

Further, the circuit 104 includes selectors 1204 and 1205 by which the carry to the 55th digit and the values of the new 54th and 53rd digits based on the rounding process, having been generated from the outputs of the selectors 1201~1203, are selected in accordance with the presence or absence of the normalization having been settled by the selector 1200.

The signal 1229 of the carry based on the rounding having settled, and the signal 124 of the carry from the lower-order digits are used for generating the signal 127 for selecting any of the results 119, 118 and 117 of the intermediate product addition.

The signals and the numbers of bits to be selected by the individual selectors are respectively listed in FIG. 31 and FIG. 32.

Figure 13:
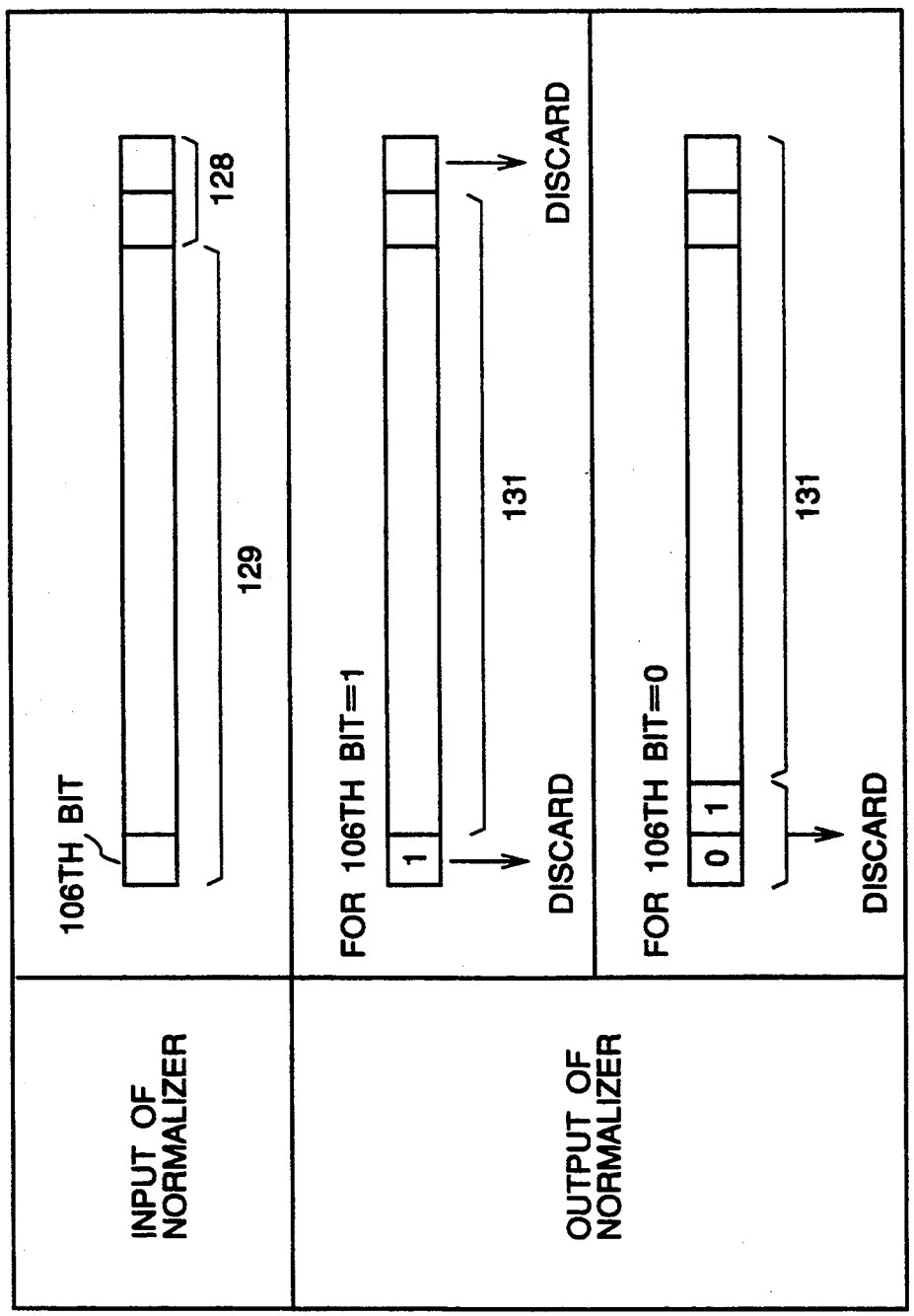
FIG. 13 is a diagram for explaining the function of a normalizer which constitutes the multiplier of the present invention.

The functions of the normalizer 107 are indicated in FIG. 13. The normalizer 107 receives the output 128 of the condition determination circuit 104 and the output 129 of the selector 106 selected from among the outputs of the intermediate product adder 105, as its input 130. It turns the integer part (above the decimal point) of the input 130 into one digit. Further, it discards the integer digit (to become one implicit bit), and it delivers only the resulting fraction part (below the decimal point) as its output 131. When the high-order digit 132 (the 106th bit) is "1", it is discarded, and the remaining digits are delivered as the mantissa part 131. On the other hand, when the high-order digit 132 (the 106th bit) is "0", the second lower-order bit is discarded, and the remaining digits are delivered as the mantissa part 131. The selector 110 selects the normalized exponent part by the use of the high-order digit 132.

As to the above operations, examples of concrete numerical values are indicated in FIG. 33 and will now be explained. Only the mantissas are shown in the figure because the exponents are not very significant. When the signals 111 and 112 are as exemplified in FIG. 33, the signals 113~120 and 122 become as shown in the figure. The signal 121 corresponds to the bundle of the output lines of the rounding circuits 703~706 (in FIG. 7), and these rounding circuits are operated in conformity with the signal 146, in other words, the signals of modes 810~813 (FIGS. 8 and 9). Herein, the mode "ROUND TO NEAREST" indicated in FIG. 9 is assumed. The signals of bits L, G and S which are input to the rounding circuits 703~706 on this occasion, and the signals 721, 722, 723 and 724 which are produced are indicated in FIG. 34. The signals 121, 123, 124, 125 and 126 obtained in this way are indicated in FIG. 35.

In FIG. 12, the signal 122 is selected by the selector 1203 because the signal 123=0, and the signal 125 is selected by the selector 1200 because the signal 124=1. In accordance with the signal 123=0 and the signal 125=1, the signal 725 of the rounding circuit 706 is selected by the selectors 1201, 1202, 1204 and 1205. Thus, a result shown in FIG. 36 is obtained. The signal 127 is the bundle of signals 1230, 1231 and 1232, and the signal 128 is the bundle of signals 1233 and 1228, so that the signals 127 and 128 become as indicated in FIG. 37(*a*).

Figure 37:
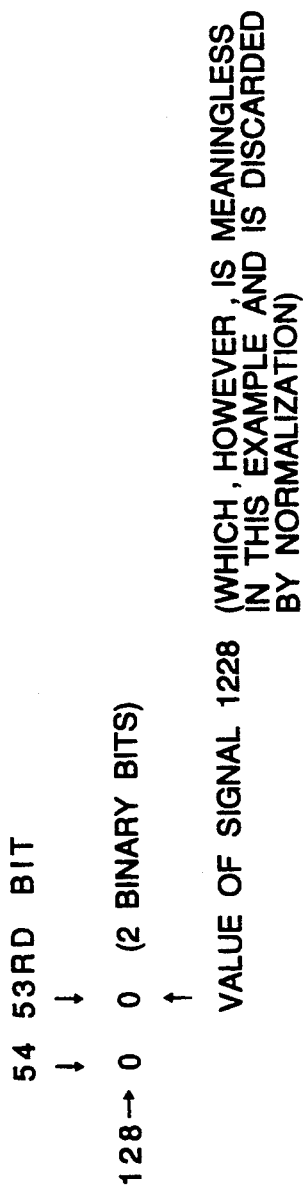
FIGS. 37(a), 37(b), 37(c) and 37(d) are diagrams for explaining concrete examples of signals in the present invention.

In FIG. 1, the signal 118 is selected by the selector 106 because the signal 127=010, and the output signal 129 of this selector is as shown in FIG. 37(*b*). The signal 130 has the signal 128 affixed to its low-order digit, and becomes as shown in FIG. 37(*c*). The signal 132 is the high-order digit of the signal 130, and the signal 132=1 holds. In this case, the signal 132 is shifted leftwards one bit, and hence, it becomes as shown in FIG. 37(*d*).

Figure 14:
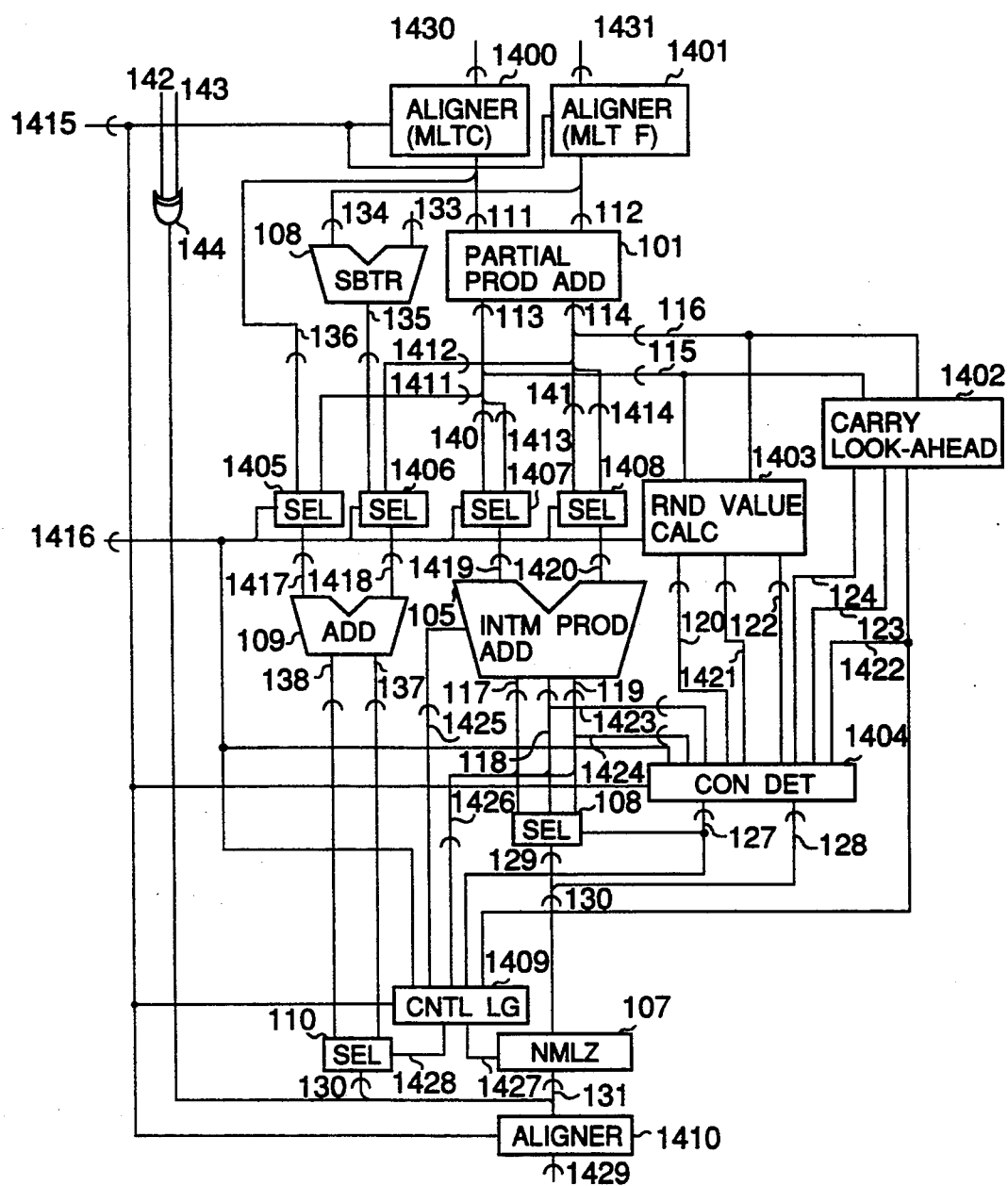
FIG. 14 is a block diagram illustrative of another embodiment of the multiplier according to the present invention.

FIG. 14 illustrates the second embodiment of the present invention. The same numerals are assigned to the same parts as in the embodiment shown in FIG. 1. This embodiment shown in FIG. 14 is such that the foregoing embodiment shown in FIG. 1 is additionally furnished with aligners 1400, 1401 and 1410 for the inputs and outputs of the whole multiplier as alignment means, a control logic circuit 1409 for the normalizer 107, and selectors 1405~1408 for the inputs of the intermediate product adder 105 and the second exponent input of the adder 109.

Besides, the rounding value calculation circuit 103, carry look-ahead circuit 102 and condition determination circuit 104 in FIG. 1 are partially altered into circuits 1403, 1402 and 1404, respectively.

The additional and alterative measures realize the functions of single-precision and integral multiplications in addition to the multiplication of the double-precision floating-point numbers. They will be explained individually.

In order to permit numbers in a different format to be handled similarly to the double-precision numbers, the aligners 1400 and 1401 change the format. The single-precision numbers are changed so as to have the same rounding position as that of the double-precision numbers. One implicit bit is affixed to a floating-point number in both the single-precision and double-precision cases, but it is not affixed in the case of an integer.

According to this embodiment, in the case of the integral multiplication, the adder 109 for the exponent parts is used at the stage of the intermediate product addition along with the intermediate product adder 105. The intermediate products 113 and 114 being the outputs of the partial product adder 101 are distributed and are input to the selectors 1405~1408, and any of the distributed inputs are selected by a signal 1416 which indicates the sort of a multiplication to-be-executed. According to this embodiment, in the case of the integral multiplication, the addition between the 12 higher-order digits 1411 and 1412 of the output intermediate products 113 and 114 is performed by the adder 109. In the embodiment shown in FIG. 1, the addition of "1" to one exponent as based on the normalization is assumed for the adder 109. Likewise, the addition of the 12 higher-order digits is an addition in which a carry 1425 from the intermediate product adder 105 is assumed. Therefore, the adder 109 left intact is shared.

The low-order position of the inputs 1419 and 1420 of the intermediate product adder 105 shifts or differs between in the case of the floating-point numbers and in the case of the integers. Therefore, the carry look-ahead circuit 1402 is altered as illustrated in FIG. 15.

Figure 15:
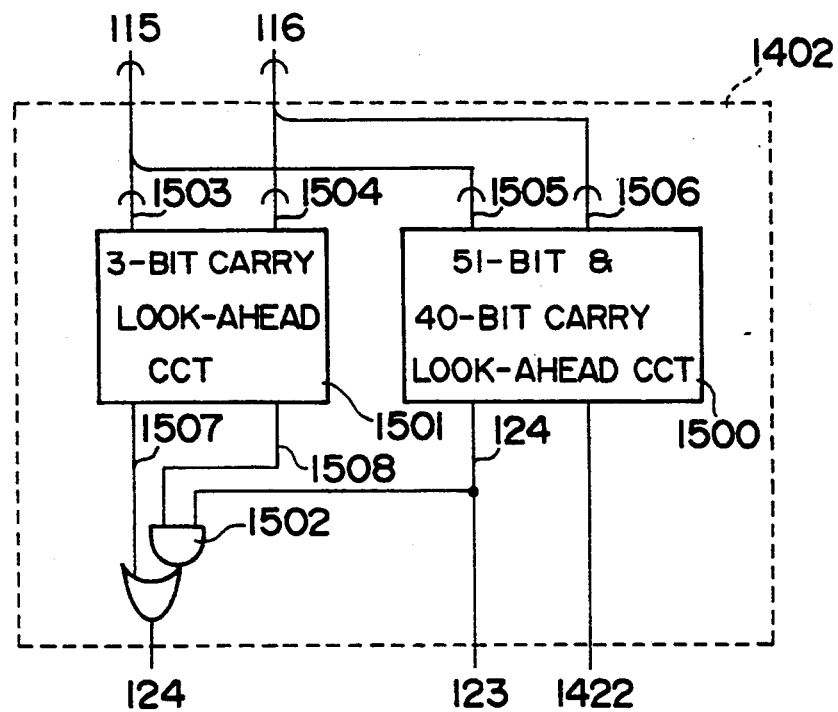
FIG. 15 is a block diagram of a carry look-ahead circuit which constitutes the multiplier of the present invention having an integral multiplication function.

The carry look-ahead circuit 1402 in FIG. 15 forms a carry look-ahead signal 1422 at the 40th digit as reckoned from the low-order position of the intermediate products 113 and 114 so as to be used for the integers, besides the signals 123 and 124 which are formed for the floating-point numbers.

Figure 16:
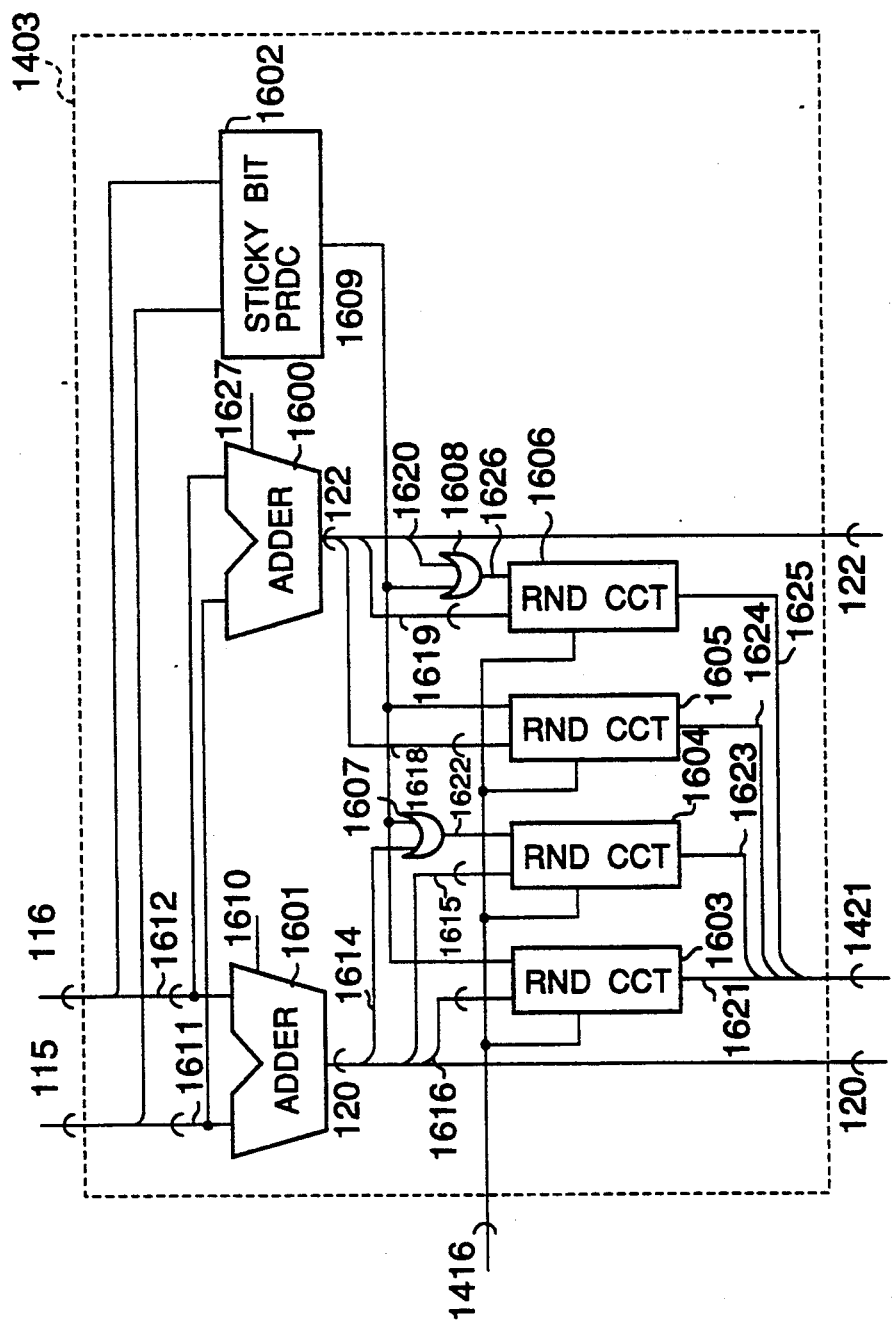
FIG. 16 is a block diagram of a rounding value calculation circuit which constitutes the multiplier having the integral multiplication function.

The rounding value calculation circuit 1403 is illustrated in FIG. 16. The rounding value calculation circuit 103 can be shared for the floating-point numbers of different precisions. Regarding the integral multiplication, the rounding circuits 703~706 constituting the rounding value calculation circuit 103 are partially altered. Each of the rounding circuits 1603~1606 are altered and the function tables thereof are respectively shown in FIG. 17 and FIG. 18. Since an inverter 802 in FIG. 8 is altered into a NOR gate 1702, the rounding value is forcibly set to "0" in the case of the multiplication of the integers.

Figure 19:
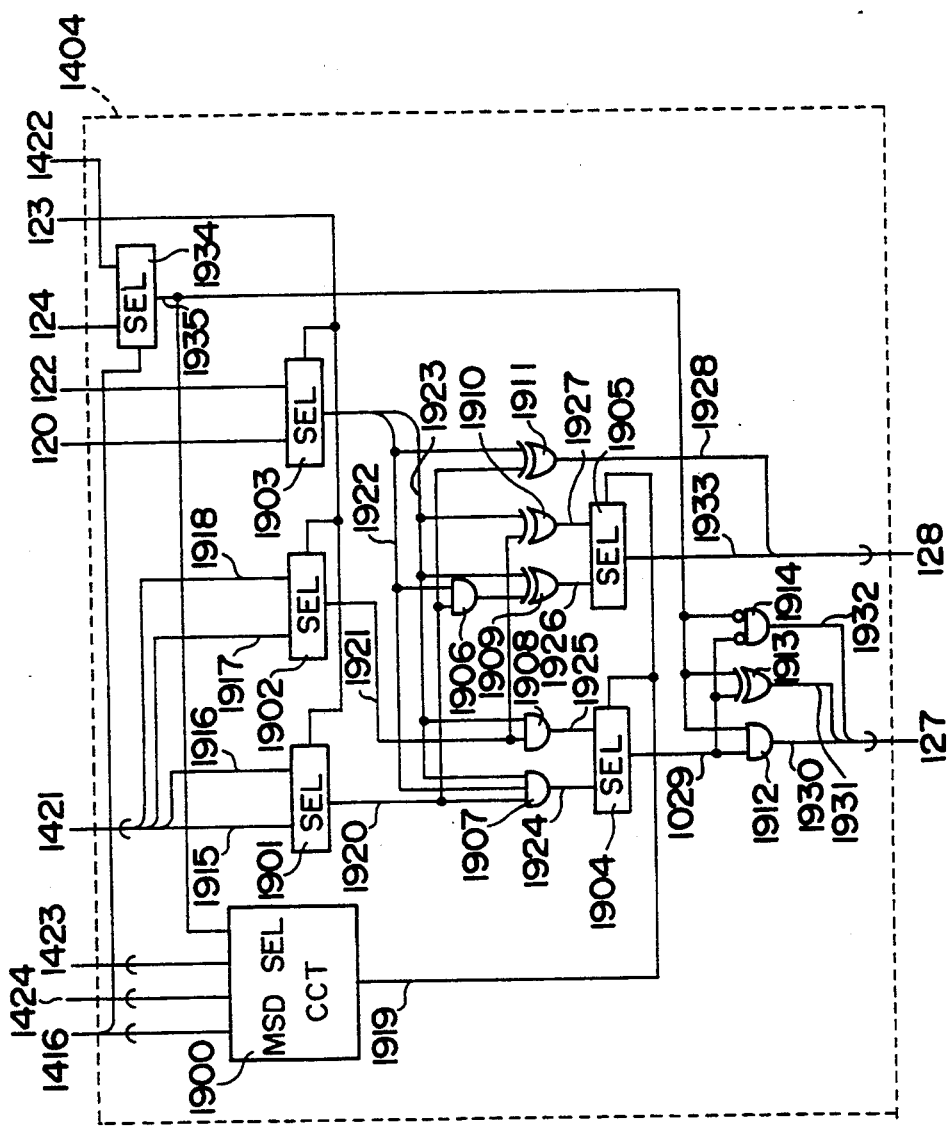
FIG. 19 is a block diagram of a condition determination circuit which constitutes the multiplier having the integral multiplication function.

The condition determination circuit 1404 is illustrated in FIG. 19. As to the floating-point numbers of the different precisions, the high-order digits or MSD's differ in the outputs of the intermediate product adder 105. Therefore, the condition determination circuit 1404 copes with the difference of the precisions in such a way that the condition determination circuit 104 is additionally furnished with an MSD selection circuit 1900.

Besides, the carries from the lower-order digits in the integral multiplication and the floating-point multiplication are different as indicated by the respective signals 1422 and 124. Therefore, a selector 1934 is disposed so as to select either of the carries and to form a carry signal 1935.

Owing to the additional components 1900 and 1934, the condition determination circuit 1404 can be used for both integers and floating-point numbers.

Figure 20:
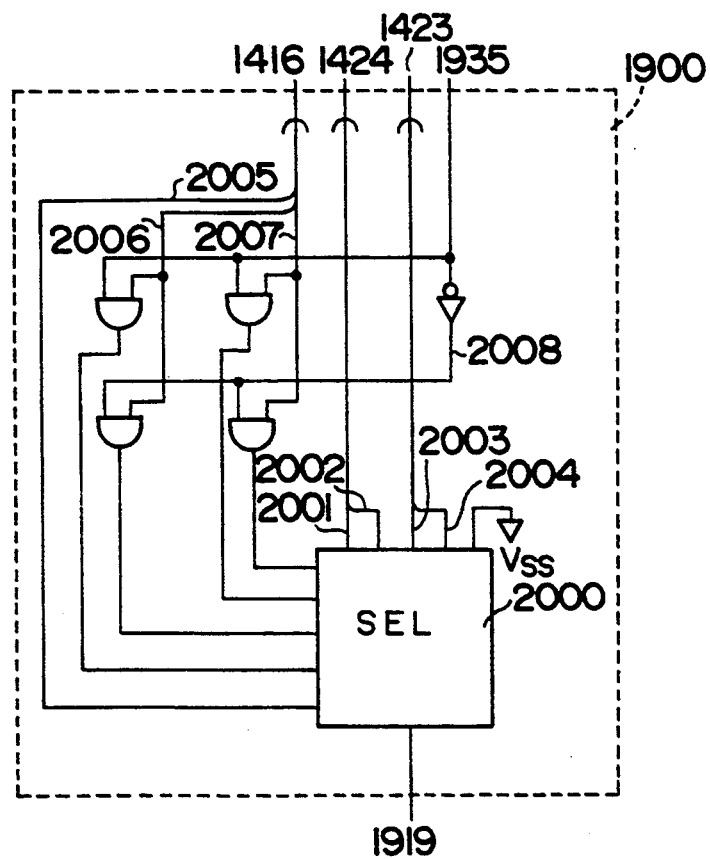
FIG. 20 is a block diagram for explaining the function of the condition determination circuit.

The circuit arrangement of the MSD selection circuit 1900 in FIG. 19 and the function table thereof are respectively shown in FIG. 20 and FIG. 21. The output 1919 of the MSD selection circuit 1900 is the high-order digit or MSD which is adapted to cope with both the precisions and the carry 1935. The MSD selection circuit 1900 selects either of the outputs 1424 or 1423 of the intermediate product adder 105 when processing floating-point numbers, while it delivers a constant when processing integers. The control circuit 1409 contains logic for controlling the normalizer 107 for the mantissa part, and logic for selecting either of the outputs of the adder 109 for the exponent part. The processes of the floating-point numbers at the separate precisions are coped with by selecting either of the high-order digits in accordance with the pertinent precision. Besides, the process of the integers is coped with in such a way that the mantissa part has its high-order digit fixed and is always subjected to the same normalization process, whereupon the normalized mantissa part is subjected to correction processing by the aligner 1410 at the succeeding stage. Regarding the exponent part, the carry 1425 from the intermediate product adder 105 is used as a select signal.

The circuit arrangement of the control logic circuit 1409 in FIG. 14 is illustrated in FIG. 22. Selectors 2200, 2201 and 2202 correspond to the three sorts of assumed conditions of the intermediate product addition. Each selector selects the high-order digit corresponding to the pertinent condition. The carry 1425 from the intermediate product adder 105 is a value obtained assuming the condition of an initial carry to this intermediate product adder. A selector 2203 selects the carry 1425 from the intermediate product adder 105 (as a carry signal 2204) in accordance with the carry 1422 found by the carry look-ahead circuit 1402.

In order to additionally execute the integral multiplication, the control logic circuit 1409 controls the mantissa part and the exponent part, using the carry signal 2204 and the high-order digits of the respective conditions. The function table of the circuit 1409 is illustrated in FIG. 23. A control signal 1427 for the mantissa part is set at the value of the high-order digit for the process of the floating-point numbers, while it is always fixed to "1" for the process of the integers. On the other hand, a control signal 1428 for the exponent part is set at the same value of the high-order digit as in the mantissa part, for the process of the floating-point numbers, while it is set at the value of the carry 1425 for the process of the integers.

The aligner 1410 in FIG. 14 brings its output 1429 into the format of the corresponding precision in the process of the floating-point numbers.

This aligner 1410 corrects the process of the normalizer 107 in the process of the integers. The correction process will be explained in more detail. The output 131 of the normalizer 107 in FIG. 14 and the output 139 of the selector 110 for the exponent part are supplied to the aligner 1410. The mantissa part 131 is input to the aligner 1410 in the state in which one implicit bit can be discarded when processing floating-point integers, the implicit bit is discarded, and the resulting mantissa part is delivered in conformity with the proper format. when processing integers, the normalized mantissa part 131 is corrected so as to maintain a bit corresponding to the implicit bit, and the corrected mantissa part is delivered in conformity with the proper format.

Figure 24:
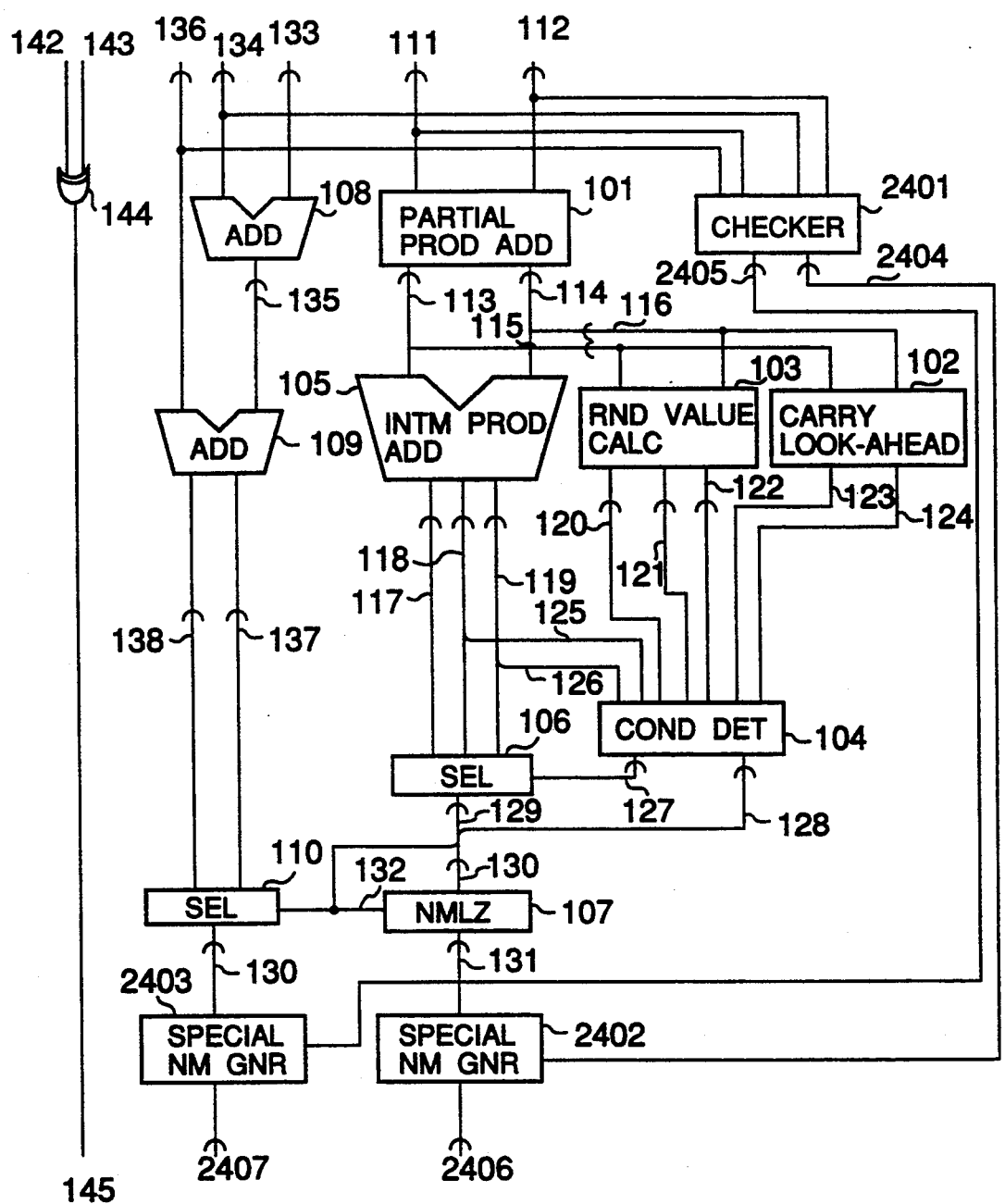
FIG. 24 is a block diagram illustrative of still another embodiment of the multiplier according to the present invention.

FIG. 24 illustrates the third embodiment of the present invention. A checker 2401 being detection means checks whether or not a multiplier factor and a multiplicand are special numbers. According to this embodiment, in the case of the special numbers, outputs 131 and 139 are masked in conformity with the multiplied results of the special numbers. More specifically, special number generators 2402 and 2403 mask their outputs 2406 and 2407 in accordance with the matrix of the multiplied results of the special numbers as shown in FIG. 25, on the basis of the outputs 2404 and 2405 of the checker 2401, respectively.

Figure 26:
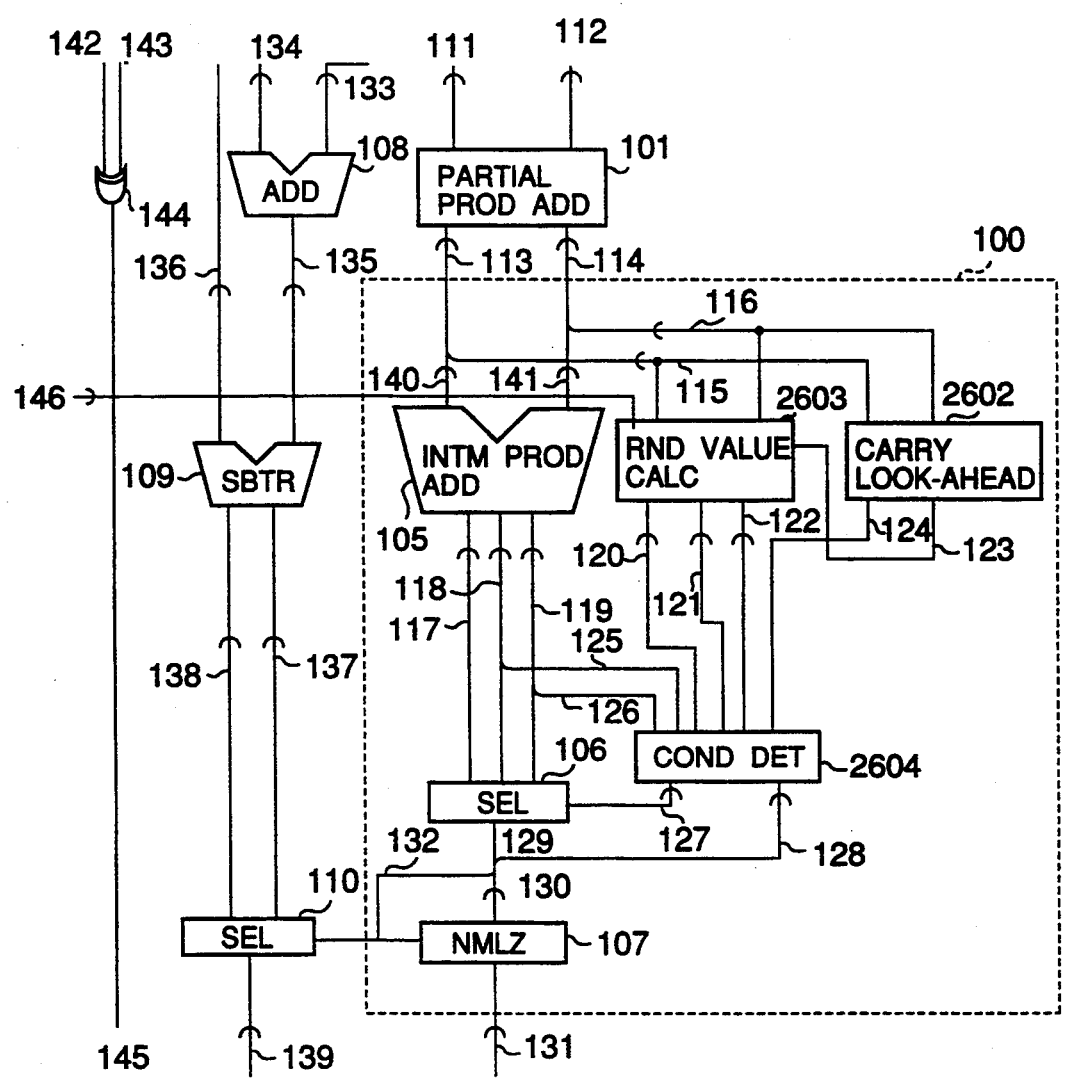
FIG. 26 is a block diagram illustrative of yet another embodiment of the multiplier according to the present invention.

As the fourth embodiment of the present invention, there is provided a multiplier in which the degree of parallelism between a rounding value calculation circuit and a condition determination circuit is lowered. The architecture of this embodiment is illustrated in FIG. 26. Although the architecture is founded on the embodiment shown in FIG. 1, it is also applicable to the embodiments shown in FIGS. 14 and 24.

Figure 27:
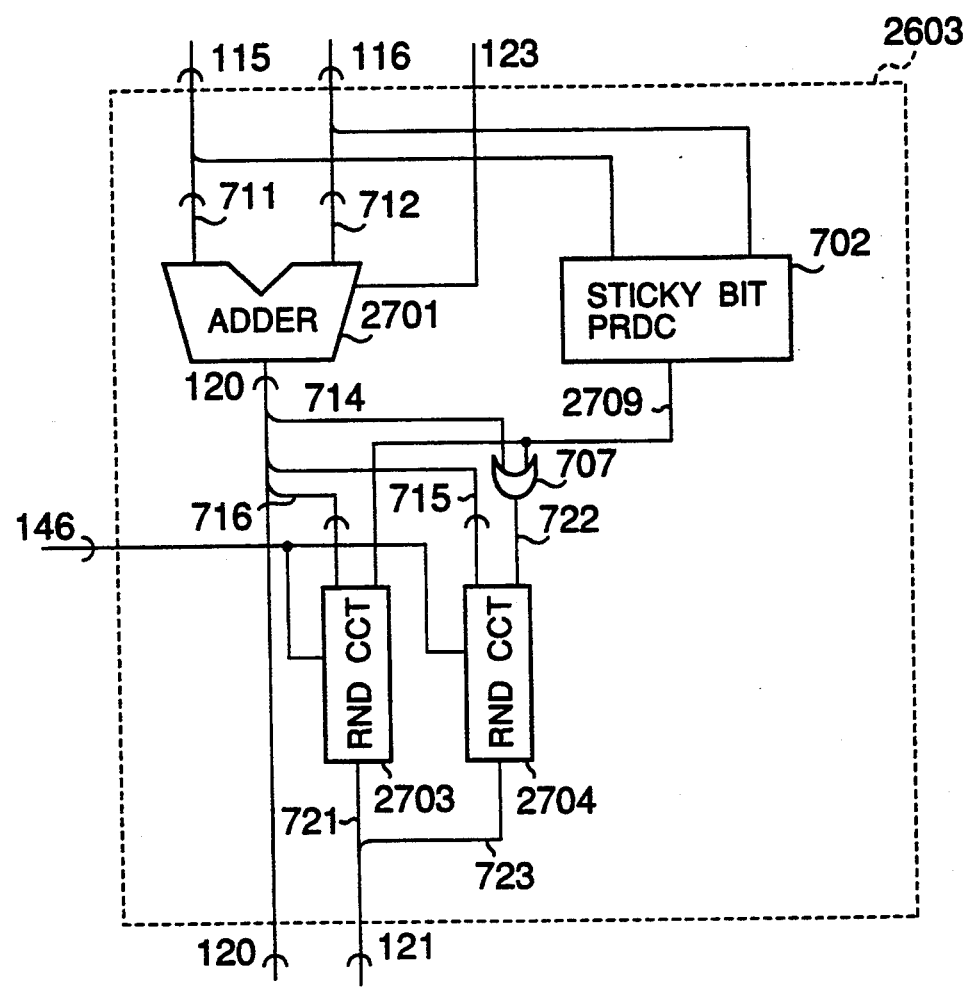
FIG. 27 is a block diagram of a rounding value calculation circuit which has a lowered degree of parallelism.

The rounding value calculation circuit 2603 in this embodiment is illustrated in FIG. 27. As compared with any other embodiment, this embodiment dispenses with one adder and two rounding circuits. Thus, only rounding positions are assumed, and rounding is performed after the required bits thereof have settled. An adder 2701 calculates the required bits 120 of the rounding, using the output 123 of a carry look-ahead circuit 2602 as an initial carry. Rounding circuits 2703 and 2704 deliver a rounding value 121 based on the assumed rounding position, using the required bits 120 of the rounding and the output 2709 of a sticky bit predictor 702.

Figure 28:
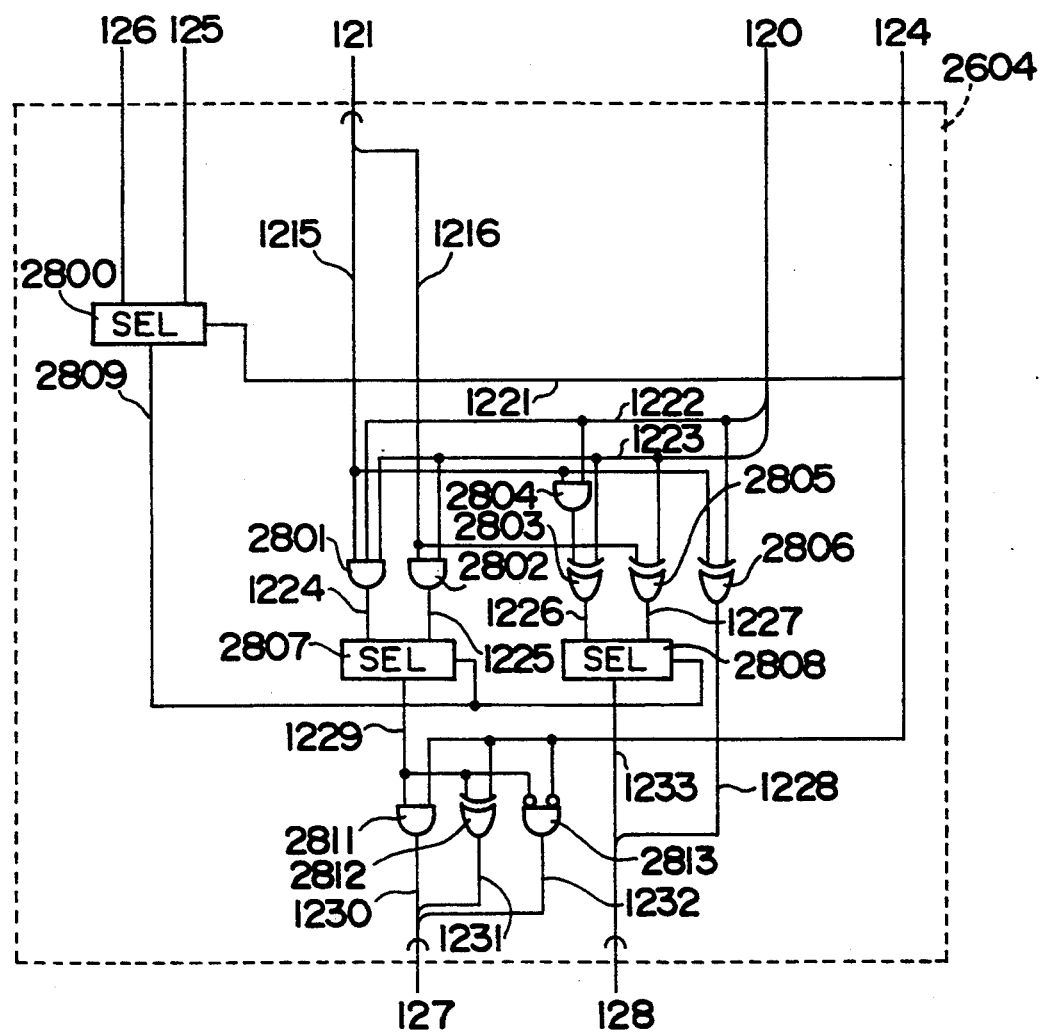
FIG. 28 is a block diagram of a condition determination circuit which has a lowered degree of parallelism.

The condition determination circuit 2604 in this embodiment is illustrated in FIG. 28. As to the two assumed rounding positions, carries to intermediate products based on the rounding and new low-order digits are produced by logic gates 2801~2806, and they are respectively settled on the basis of the information 2809 of the rounding position by selectors 2807 and 2808. A selector 2800 selects either of the high-order digits 125 or 126 of the outputs of an intermediate product adder 105 in accordance with a carry 124 from lower-order digits, thereby delivering the information 2809 of the rounding position. Logic gates 2811~2813 generate a signal 127 for selecting any of the outputs 117~119 of the intermediate product adder 105, from the carry 1229 based on the rounding and the carry 124 from the lower-order digits.

Figure 29:
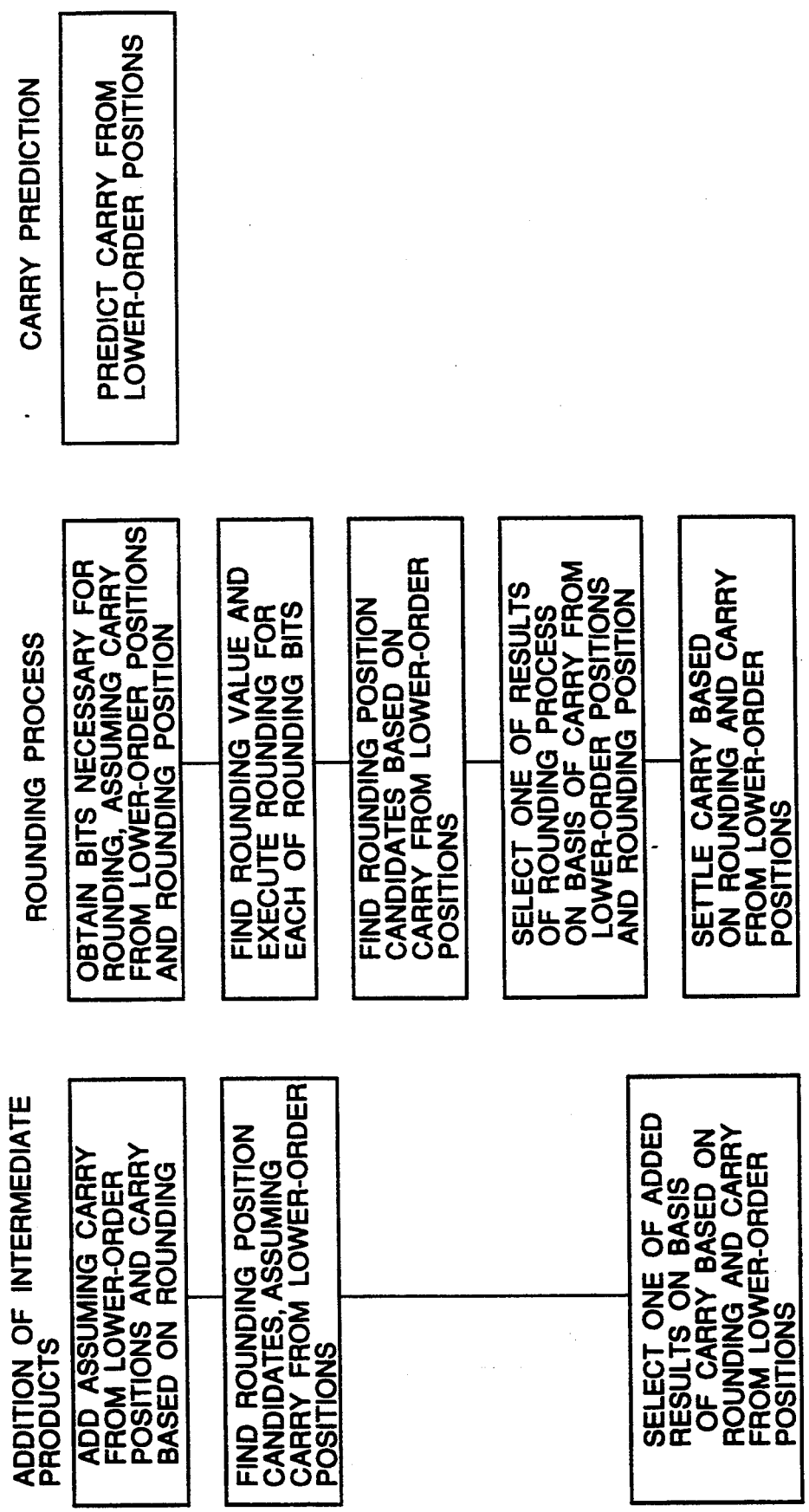
FIG. 29 is a flow diagram for explaining the multiplication method of the multiplier shown in FIG. 26.

FIG. 29 shows the flow chart of the multiplying method of the multiplier according to the present invention. In the multiplying method, an intermediate product addition, a rounding process and a carry prediction are performed in parallel or concurrently. The intermediate product addition is executed by an adder which has an appropriate input width for the bit width of a final product to-be-required. On that occasion, assuming a carry from unnecessary lower-order digits which are not input to the adder and a carry based on rounding, a plurality of added results are evaluated. Two information items indicative of rounding positions are obtained from the added result evaluated assuming the carry from the lower-order digits.

In the rounding process proceeding in parallel with the intermediate product addition, bits required for this process are obtained assuming the carry from the lower-order digits and the rounding positions. As to each set of bits obtained, a rounding value is calculated, and the rounding process is executed. Subsequently, the rounding position is determined from the information thereof on the basis of the result of the carry prediction for the carry from the lower-order digits. One of the results of the rounding processes is selected on the basis of the carry and the rounding position which have settled. Subsequently, one of the results of the intermediate product adder is selected on the basis of the carry based on the rounding and the carry from the lower-order digits.

According to one embodiment of the present invention, the multiplier includes the intermediate product adder and a rounding processor installed in parallel, and the rounding processes can be executed in parallel, so that a floating-point multiplication at high speed is realized.

According to another embodiment of the present invention, the multiplier includes input aligners, an output aligner, and an exponent part adder which can also be used for the intermediate product addition, so that it can be applied to the multiplications of floating-point numbers of different precisions and the multiplication of integers.

According to still another embodiment of the present invention, the multiplier includes a special number detector and special number generators, so that it can be applied to a multiplication containing special numbers, without altering the multiplier proper.

Now, an embodiment of the present invention concerning an adder will be described with reference to FIG. 38 thru FIGS. 43(a)~43(b). In the ensuing description, an arithmetic unit for floating-point numbers in the double-precision format of IEEE-754 (stipulated by the Institute of Electrical and Electronic Engineers) will be taken as an example. However, the present invention is not restricted to this particular arithmetic unit, but it is effectively applicable to an arithmetic unit which supports any other format (especially, a format requiring a comparatively complicated rounding process) or to an arithmetic unit which supports a plurality of such formats simultaneously.

Figure 38:
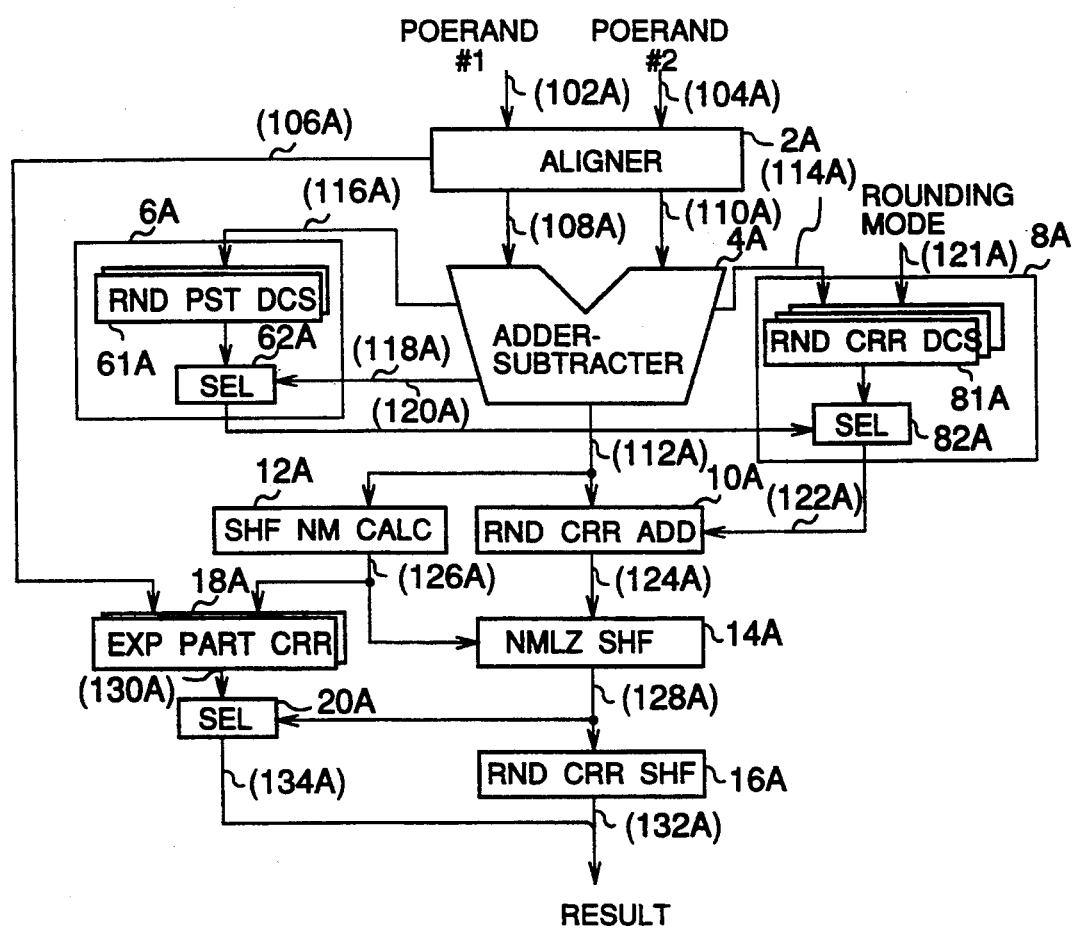
FIG. 38 is a block diagram illustrative of the schematic architecture of an adder embodying the present invention.

FIG. 38 is a block diagram showing the schematic architecture of the floating-point arithmetic unit of the present invention. As shown in the figure, this floating-point arithmetic unit comprises an aligner circuit 2A, an adder-subtracter circuit 4A, a rounding position determination circuit 6A, a rounding correction determination circuit 8A, a rounding correction adder circuit 10A, a normalizing shift-place-number calculation circuit 12A, a normalizing shift circuit 14A, a rounding correction shift circuit 16A, a circuit 18A for an exponent part correction attendant upon a normalizing shift, and a "2→1" selection circuit 20A of 11 bits.

Next, the operation of the floating-point arithmetic unit having the above architecture will be explained.

FIG. 39 and Table 1 indicate the details of the aligner circuit 2A. The aligner circuit 2A is supplied with two floating-point numbers to-be-added, namely, an operand #1 (102A) and an operand #2 (104A). This aligner circuit 2A delivers the greater one of the exponent parts of both the operands as an output (106A). At the same time, it shifts the mantissa part of the operand having the smaller exponent part toward the low-order position thereof by the absolute value of the difference between the exponent parts and delivers the shifted mantissa part b as an output (110A). On that occasion, all the bits of the mantissa part shifting out below the 54th decimal position at the shifting step are subjected to an OR (logical sum) operation, and the value of the OR operation is delivered to the 55th decimal position. On the other hand, the mantissa part of the operand having the greater exponent part is delivered as a mantissa part a without any change (as indicated at symbol 108A).

The standard IEEE-754 stipulates that, in processing floating-point numbers, an operation shall be executed assuming the number of digits of each mantissa part to be infinity, whereupon a rounding shall be executed to obtain a final result. However, when the sort of the operation is addition/subtraction, the same rounded result as in the case of assuming the infinite number of digits for each mantissa part is obtained even by executing the operation with the number of digits limited to the 55th decimal position as in this embodiment.

TABLE 1

| Relationships between Inputs and Outputs of Aligner circuit | | |
|---|---|---|
| Inputs | For $e_1 > e_2$ | For $e_2 \geq e_1$ |
| Intermediate exp. part | $e_1$ | $e_2$ |
| Mantissa part a | $1.f_1^{(1)}f_2^{(1)}\ldots f_{52}^{(1)}000$ | $1.f_1^{(2)}f_2^{(2)}\ldots f_{52}^{(2)}000$ |
| Mantissa part b | Obtained by shifting $1.f_1^{(2)}\ldots f_{52}^{(2)}$ toward the low-order digit by $(e_1 - e_2)$. However, $f_{55}^{(b)}$ is the OR of all bits shifting out below the 54th bit. | Obtained by shifting $1.f_1^{(1)}\ldots f_{52}^{(1)}$ toward the low-order digit by $(e_2 - e_1)$. However, $f_{55}^{(b)}$ is the OR of all bits shifting out below the 54th bit. |

Figure 40:
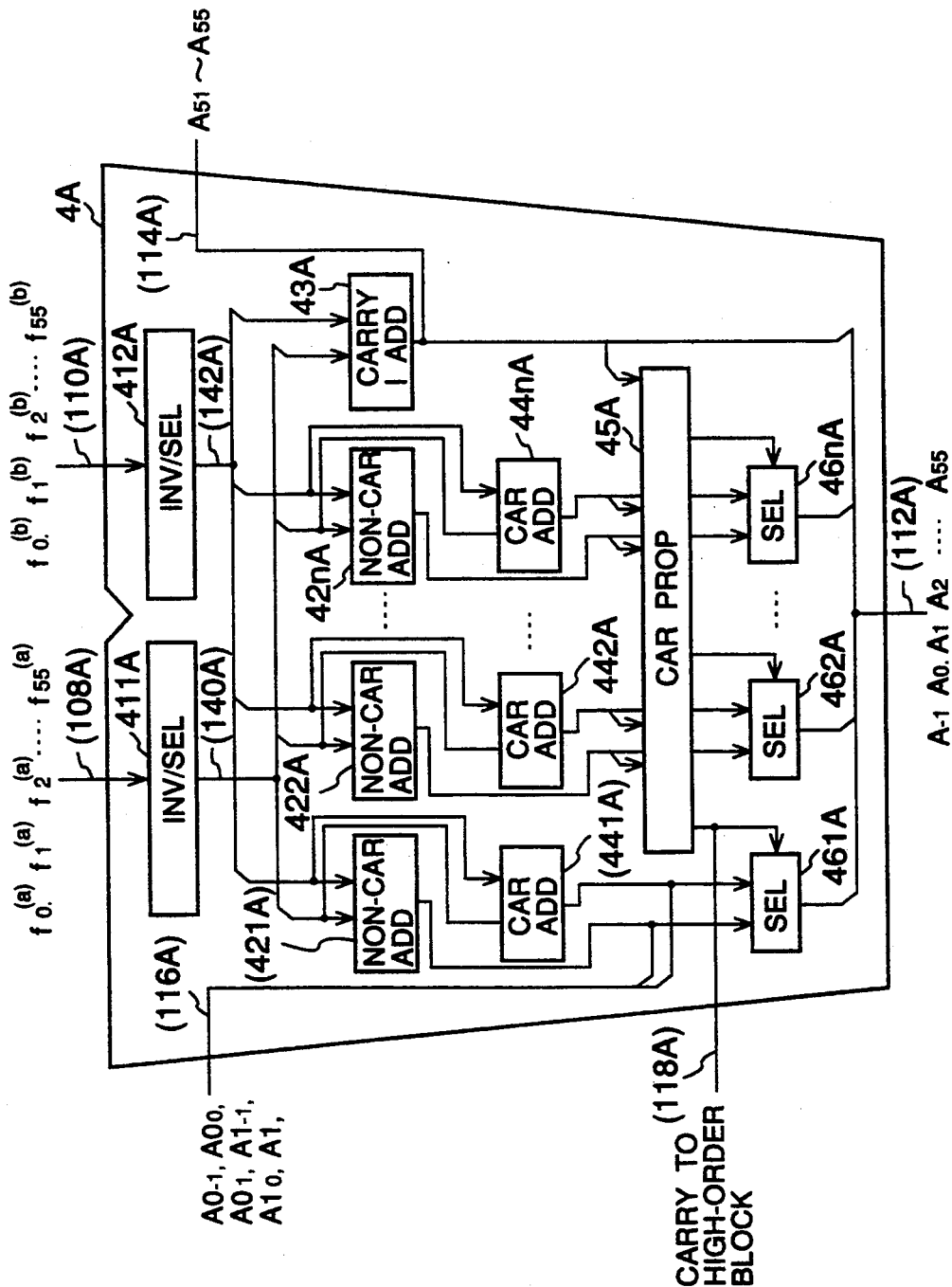
FIG. 40 is a detailed block diagram of an adder-subtracter circuit in the embodiment.

FIG. 40 is a detailed block diagram of the adder-subtracter circuit 4A. The adder-subtracter circuit 4A is supplied with the two mantissa parts 108A and 110A being the outputs of the aligner circuit 2A, and it performs the addition or subtraction between both the mantissa parts in accordance with the type of instruction to be executed (either an addition type instruction or a subtraction type instruction) and the signs of both the operands. In order to prevent the result of the operation from becoming a minus number, the operand of smaller absolute value is subtracted from the operand of greater absolute value in the case of the subtraction. If necessary, the sign of the result is inverted.

The two aligned mantissa parts are first input to inverter-selector circuits 411A and 412A. In executing the operation of the subtraction, the mantissa part corresponding to a subtrahend (the mantissa part of the operand having the smaller absolute value) is inverted, and both the mantissa parts are added with a carry input to the LSB (least significant bit) set at "1". Owing to such a method, a +1 addition at the step of obtaining a two's complement and the operation between the two operands can be performed by one time of addition. On the other hand, in executing the operation of the addition, the inverter-selector circuits 411A and 412A deliver the two mantissa parts directly without inverting them.

Each of the outputs of the inverter-selector circuits 411A and 412A is divided into (n+1) blocks. A carry input adder circuit 43A receives the low-order block or least significant block of the (n+1) blocks. It adds the bits of the low-order block by regarding a signal indicating if the subtraction is to be executed, as a carry input from lower-order digits, and it produces an added result and a carry to the adjoining higher-order block. Non-carrying adder circuits 421A~42nA in the number of R receive the respectively corresponding ones of the remaining n blocks. They execute additions, assuming that no carries have developed from the lower-order blocks, and they produce added results and carries to the higher-order blocks (carry generation signals). Likewise, carrying adder circuits 441A~44nA in the number of n receive the respectively corresponding ones of the n higher-order blocks, whereupon they execute additions, assuming that carries have developed from the lower-order blocks, and produce added results and carries to the higher-order blocks (carry propagation signals).

A carry propagation circuit 45A receives the carry generation signals and carry propagation signals from the n blocks except the high-order block or most significant block, and it delivers final carries directed to the n higher-order blocks. Selector circuits 461A~46nA select either of the respectively corresponding outputs of the non-carrying adder circuits 421A~42nA and those of the carrying adder circuits 441A~44nA on the basis of the inputs from the carry propagation circuit 45A. Owing to such a circuit arrangement, a time period required for carry propagation can be suppressed to be short, so that a high-speed addition can be realized.

The outputs of the selector circuits 461A~46nA of the n higher-order blocks and the output of the carry input adder circuit 43A of the low-order block are combined into the-operated result (112A) of the adder-subtracter circuit 4A. At the same time, 5 lower-order bits in the output of the carry input adder circuit 43A of the low-order block are output (114A) to a rounding correction decision circuit 81A included in the rounding correction determination circuit 8A, 3 higher-order bits in each of the outputs of the non-carrying adder circuit 421A and carrying adder circuit 441A of the high-order block are output (116A) to a rounding position decision circuit 61A included in the rounding position determination circuit 6A, and the carry signal to the high-order block among the outputs of the carry propagation circuit 45A is output (118A) to a selector circuit 62A for a rounding position decision output.

Figure 41:
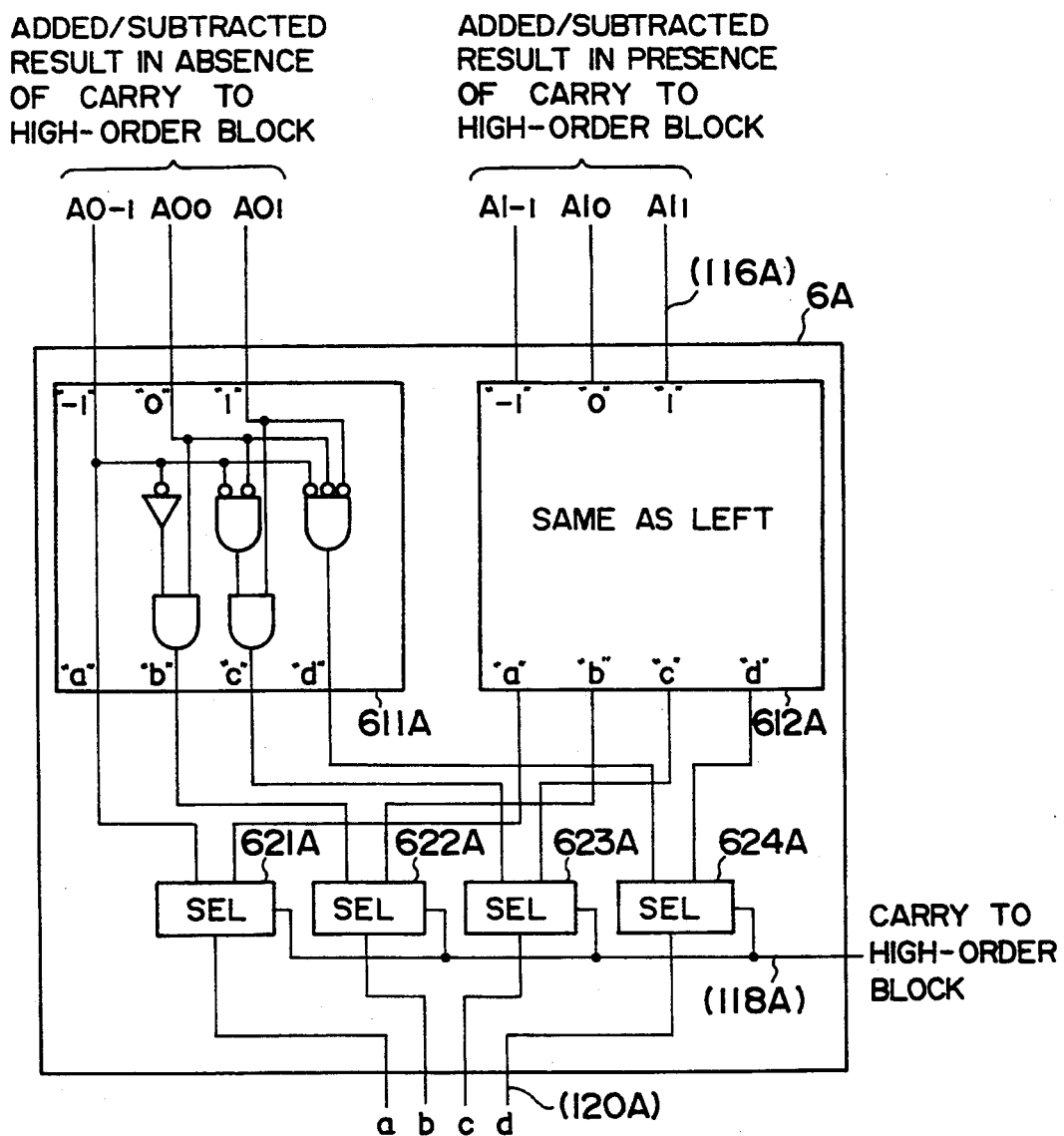
FIG. 41 is a detailed diagram of a rounding position determination circuit in the embodiment.

FIG. 41 is a detailed diagram of the rounding position determination circuit 6A. As candidates for a rounding position, four portions A, B, C and D listed in Table 2 below are possible. Rounding position decision circuits 611A and 612A decide the rounding position as to a case of assuming the absence of the carry to the high-order block and a case of assuming the presence thereof, respectively. Each of selector circuits 621A~624A selects either of the corresponding outputs of the two rounding position decision circuits 611A and 612A in accordance with the presence or absence of the carry to the high-order block. Owing to the above circuit arrangement, the rounding position can be determined at the same time that the operated result of the high-order block of the adder-subtracter circuit 4A is output.

TABLE 2

| | Relationships between Rounding position and Bits for rounding | | | | | | | | | |
|---|---|---|---|---|---|---|---|---|---|---|
| Rounding position | Added/Subtracted results (higher-order bits) | | | Outputs of Rounding position determination circuit | | | | Bits for Rounding correction decision | | |
| | $A_{-1}$ | $A_0$ | $A_1$ | a | b | c | d | L | G | S |
| A | 1 | * | * | 1 | 0 | 0 | 0 | $A_{51}$ | $A_{52}$ | $A_{53} + A_{54} + A_{55}$ |
| B | 0 | 1 | * | 0 | 1 | 0 | 0 | $A_{52}$ | $A_{53}$ | $A_{54} + A_{55}$ |
| C | 0 | 0 | 1 | 0 | 0 | 1 | 0 | $A_{53}$ | $A_{54}$ | $A_{55}$ |
| D | 0 | 0 | 0 | 0 | 0 | 0 | 1 | No carry based on rounding takes place. | | |

*: Irrespective of indications.

This embodiment is the arithmetic unit which executes the addition or subtraction between the floating-point numbers. Another example, however, may well be an arithmetic unit which simultaneously supports the type conversion instruction between, e.g., a floating-point number and an integer. In such an example, it might be required to perform rounding at a predetermined position without regard to the output of the adder-subtracter circuit 4A, only when a certain specified instruction is to be executed. Even in such a case, some modification to the circuit arrangement in FIG. 41 makes it possible to fix the output of the rounding position decision circuit 61A only in executing the instruction.

Figure 42:
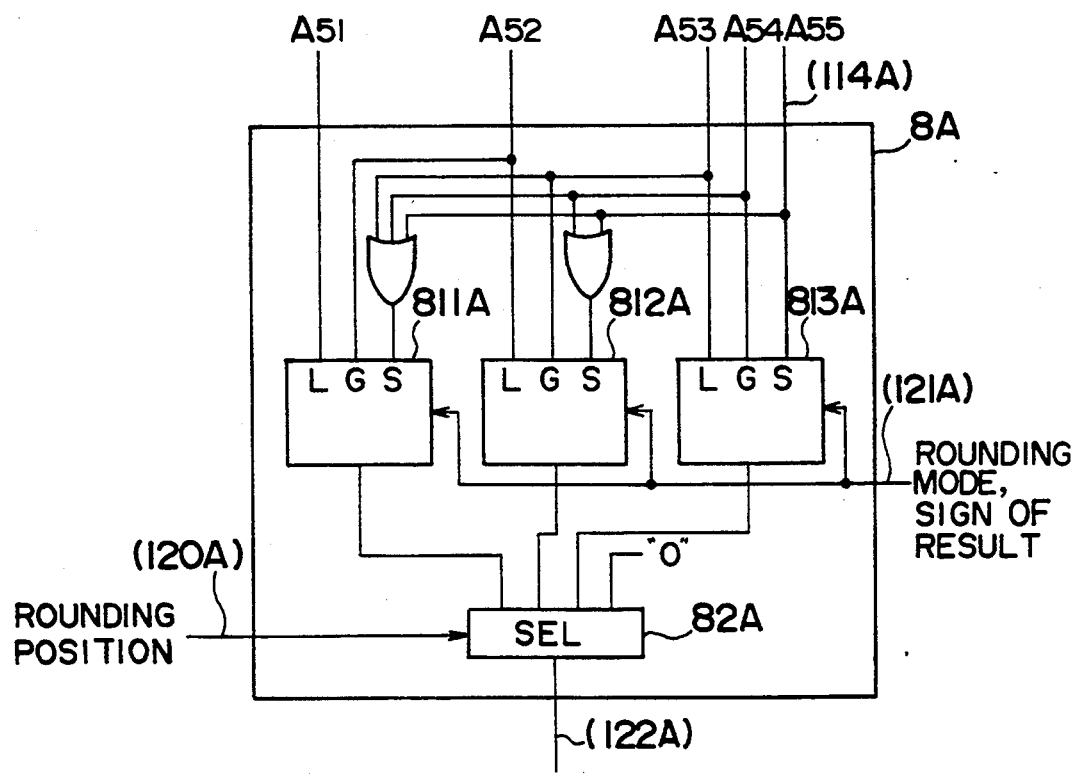
FIG. 42 is a detailed diagram of a rounding correction determination circuit in the embodiment.

FIG. 42 is a detailed diagram of the rounding correction determination circuit 8A. The relationships between the rounding position decided by the rounding position determination circuit 6A and the bits for use in the rounding correction decision are as listed in Table 2 before. Signals to be used for the rounding bits (L, G and S) differ depending upon the rounding positions (rounding position candidates). Therefore, a plurality of rounding correction decision circuits 811A~813A are necessitated in correspondence with the respective rounding positions. All the rounding correction decision circuits 811A~813A have the same circuit arrangements. As listed in Table 3, each of these circuits 811A~813A is supplied with the signals of the 3 rounding bits, the sign of a result and a predetermined rounding mode so as to decide if the carry based on the rounding develops. A selector circuit 82A selects and delivers any of the outputs of the rounding correction decision circuits 811A~813A or a logical value "0" in accordance with the output of the rounding position determination circuit 6A.

TABLE 3

Logic of Rounding correction decision circuits

| Rounding mode | Bits for rounding correction decision | | | Sign of Result | Rounding Correction (Round-up: 1) (Round-down: 0) |
|---|---|---|---|---|---|
| | L | G | S | | |
| Round to nearest | * | 0 | * | * | 0 |
| | 0 | 1 | 0 | * | 0 |
| | 1 | 1 | 0 | * | 1 |
| | * | 1 | 1 | * | 1 |
| Round toward zero | * | * | * | * | 0 |
| Round toward +∞ | * | * | * | — | 0 |
| | * | 0 | 0 | + | 0 |
| | * | 1 | * | + | 1 |
| | * | * | 1 | + | 1 |
| Round toward −∞ | * | 0 | 0 | — | 0 |
| | * | 1 | * | — | 1 |
| | * | * | 1 | — | 1 |
| | * | * | * | + | 0 |

*: Irrespective of indications.

The rounding correction adder circuit 10A is supplied with the operated result 112A of the adder-subtracter circuit 4A and the output 122A of the rounding correction determination circuit 8A. In the case where the carry is required on the basis of the rounding, the circuit 10A adds "1" to the bit L indicated in Table 2, and in the case of round-down, it delivers the operated result input directly without the addition.

The shift place number calculation circuit 12A is supplied with the operated result 112A of the adder-subtracter circuit 4A, and it seeks the position of "1" (preceding "1") appearing first as viewed from the high-order side and calculates the number of shift places required for normalization. The normalizing shift circuit 14A shifts the output mantissa part 124A of the rounding correction adder circuit 10A in accordance with the number of shift places 126A calculated by the shift place number calculation circuit 12A. Usually, the output 128A of the normalizing shift circuit 14A has a decimal point just on the right side (lower-order side) of the preceding "1". However, in a case where the position of the preceding "1" has moved at the +1 addition of the rounding correction adder circuit 10A, the output 128A has a decimal point on the right side of the second lower bit with respect to the preceding "1". The rounding correction shift circuit 16A shifts the output 128A of the normalizing shift circuit 14A one bit to the lower-order side in order that, in the case where the position of the preceding "1" has been moved by the +1 addition of the rounding correction adder circuit 10A, the decimal point may come just to the right side of the preceding "1". Herein, in the case of the movement of the position of the preceding "1", all the bits except the preceding "1" become "0's". It is therefore only the bit of the preceding "1" that needs to be actually shifted by the rounding correction shift circuit 16A. Especially in a case where the bit of the preceding "1" need not be output as in the form of the standard IEEE-754, the shift operation of the rounding correction shift circuit 16A may well be omitted.

The exponent part correction circuit 18A subjects the output exponent part 106A of the aligner circuit 2A to a correction which is necessitated by the normalizing shift. Besides, in the case where the rounding correction shift circuit 16A needs to perform the one-bit shift to the lower-order side, the exponent part 106A needs to be subjected to a correction of +1, and hence, the circuit 18A simultaneously calculates an exponent part subjected to the +1 correction. The selector circuit 20A selects and delivers either of the two exponent parts calculated by the exponent part correction circuit 18A, in accordance with whether or not the lower-order shift in the rounding correction shift circuit 16A is needed. Owing to such a contrivance, a time period required for the correction of the exponent part attributed to the shift operation of the rounding correction shift circuit 16A can substantially consist only of the processing time of the selector circuit 20A, so that high-speed processing is realized.

The output mantissa part 132A of the rounding correction shift circuit 16A and the output exponent part 134A of the selector circuit 20A are combined into the operated result of the adder in this embodiment.

Figure 43A:
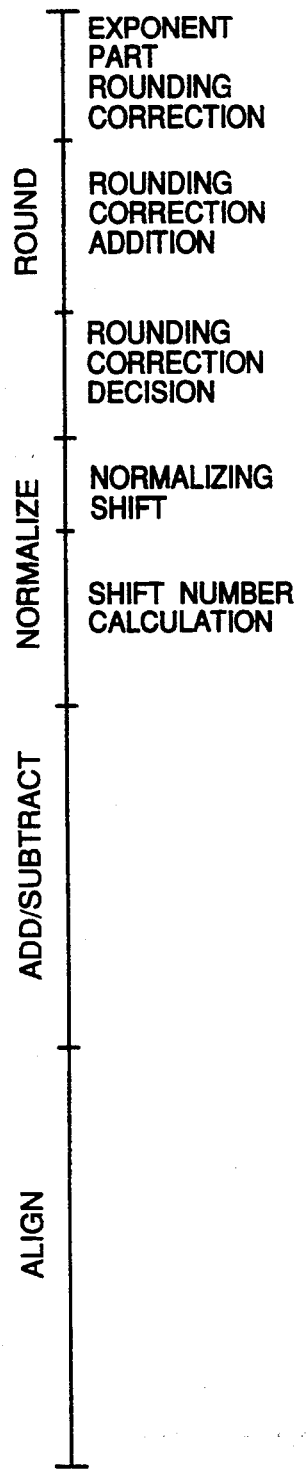
FIGS. 43(a) and 43(b) are diagrams for comparing the prior art and the present invention in terms of the processing time periods of adders.
Figure 43B:
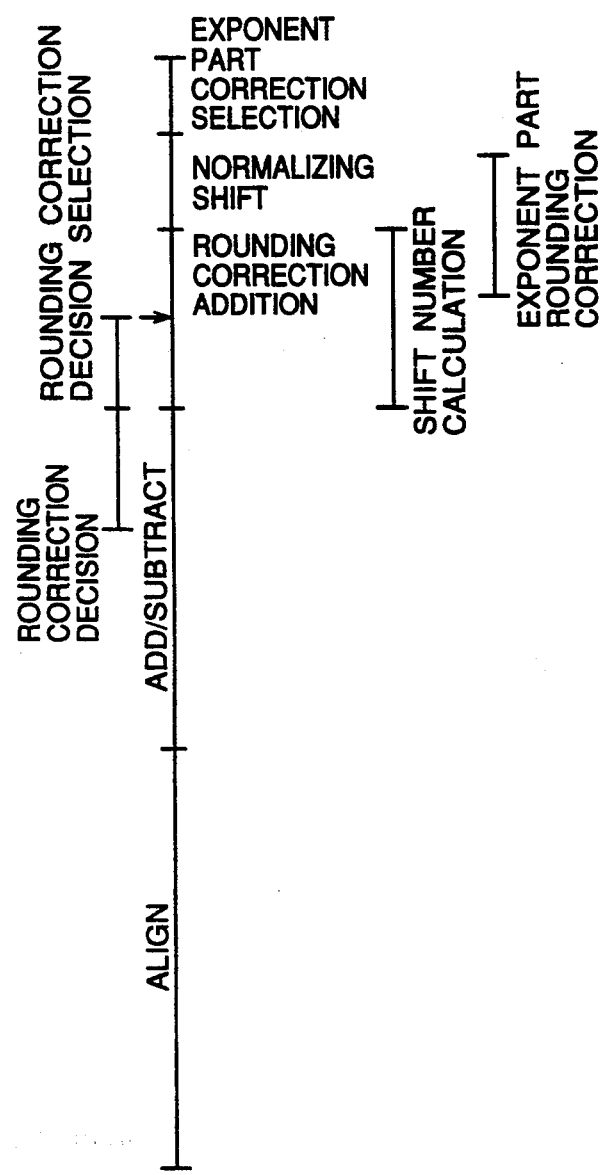
Figure 44:
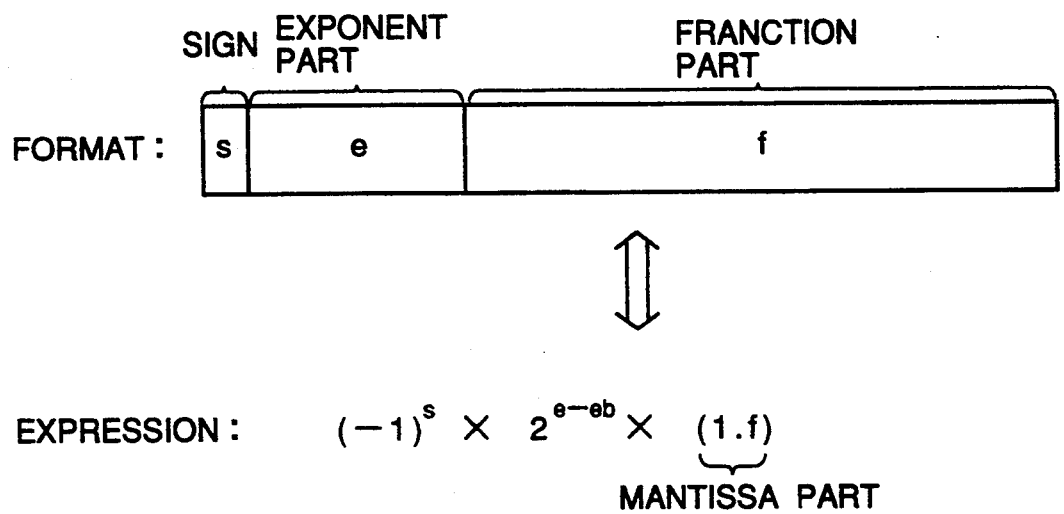
FIG. 44 is a diagram showing an example of a method of representing a floating-point number.
Figure 45:
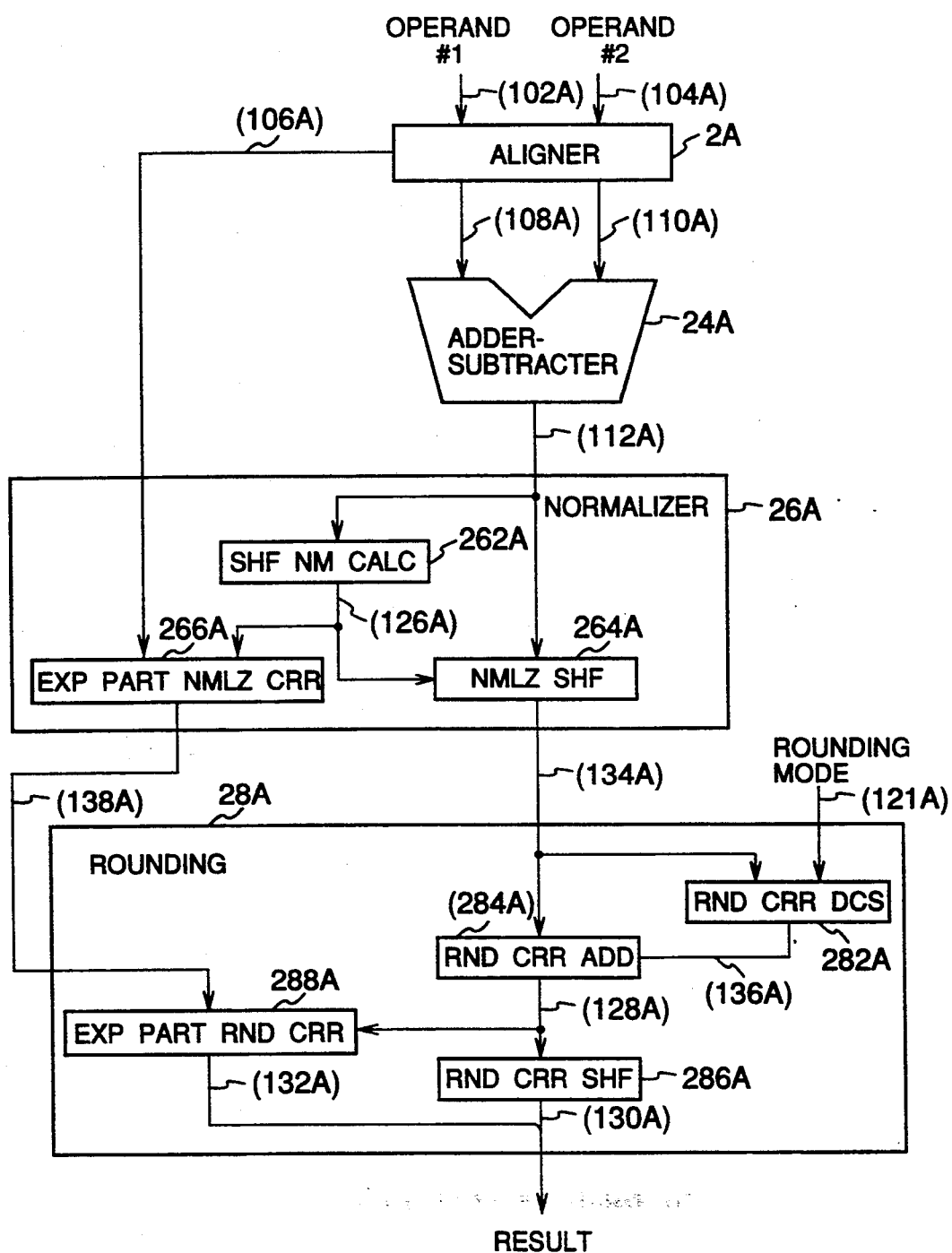
FIG. 45 is a block diagram showing the schematic architecture of an adder in the prior art.

As understood by comparing the processing time of the arithmetic unit of this embodiment (illustrated in FIG. 43(b)) with that of an arithmetic unit in the prior art (illustrated in FIG. 43(a)), this embodiment can shorten the processing time in correspondence with the shift place number calculation and the rounding correction decision and is very effective to operate floating-point numbers at high speed as a whole.

As described above in detail, according to the present invention, a normalizing process and a rounding process are executed in parallel or concurrently. Therefore, a processing time can be shortened as compared with that in the prior art, and the operation between floating-point numbers can be executed at an enhanced speed.

Now, embodiments of a division control method and a divider according to the present invention will be described with reference to FIGS. 46 thru 62.

Figure 62:
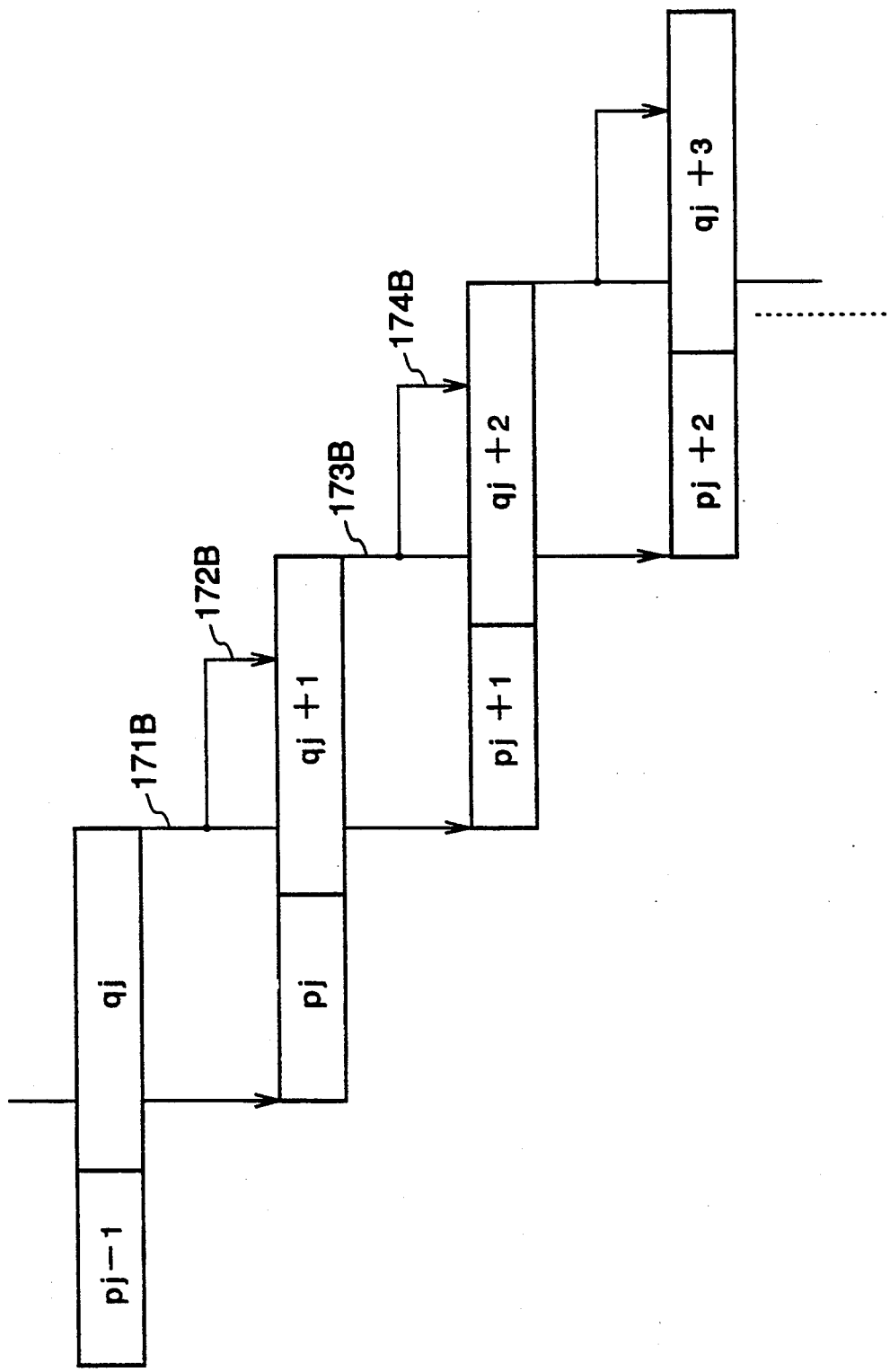
FIG. 62 is an explanatory diagram showing the operating principle of the divider which adopts the present invention.
Figure 63A:
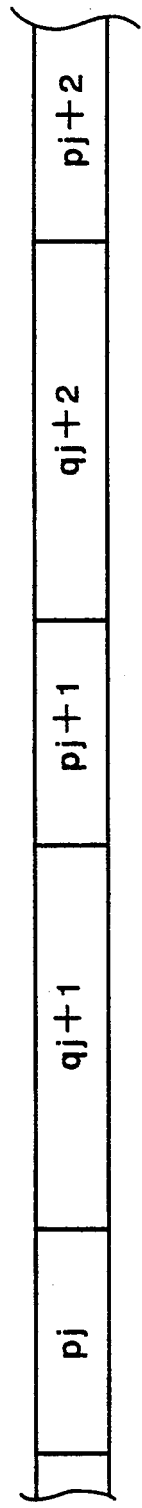
FIG. 63(a) and FIG. 63(b) are an explanatory diagrams showing the operating principle of a prior-art divider which executes the division algorithm.
Figure 63B:
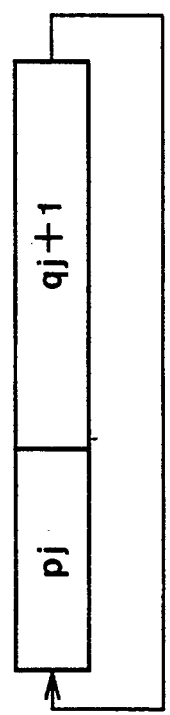
Figure 64:
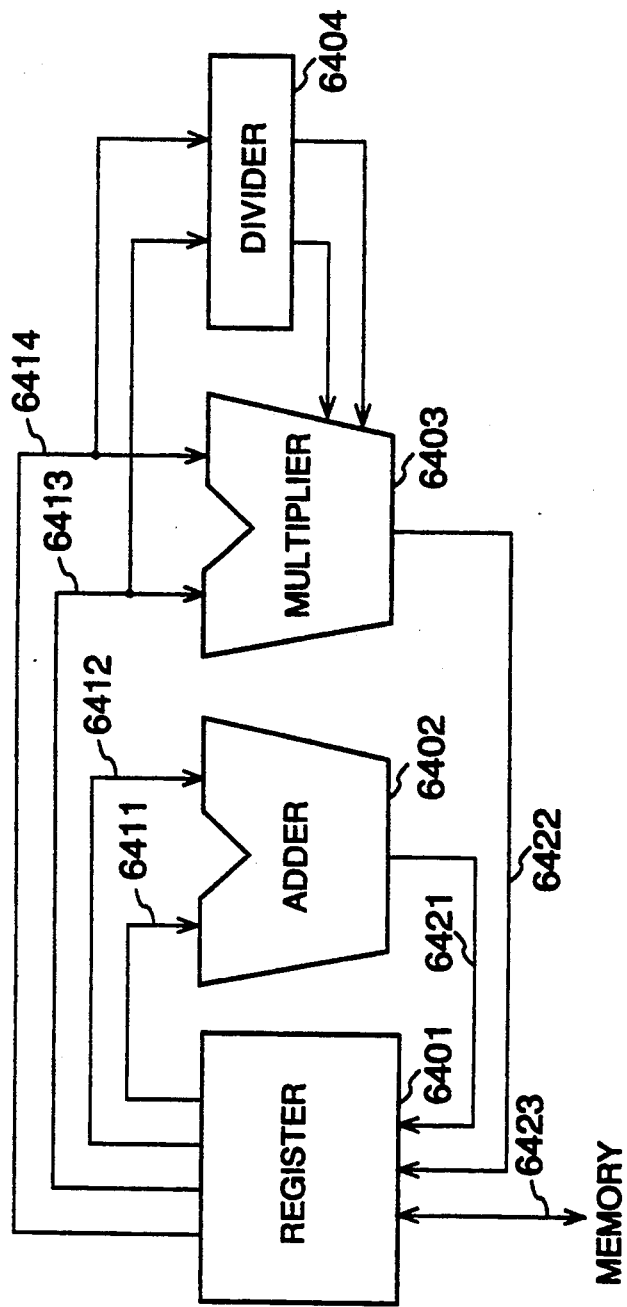
FIG. 64 is a diagram for explaining a floating-point arithmetic unit in the prior art.

First, the system of the present invention will be explained in conjunction with FIG. 62. In the present invention, the calculation of a partial remainder Pj and that of a quotient digit qj, the calculation of a partial remainder Pj+1 and that of a quotient digit qj+1, and the calculation of a partial remainder Pj+2 and that of a quotient digit qj+2 are simultaneously performed, respectively. A problem on this occasion is that, when the partial remainder Pj+1, for example, is to be calculated by the use of Eq. 9B mentioned before, the quotient digit qj+1 must have been obtained. As a measure according to the present invention, with note taken of the fact that the quotient digit qj+1 can have only the five values of −2 to +2 as indicated by Eqs. 8, the five values of the quotient digit qj+1 are assumed, and the calculation of the partial remainder Pj+1 is executed in parallel with a calculation for settling the quotient digit qj+1. These calculations are performed by higher-order partial remainder calculation circuits 10B, 11B, 12B, 13B and 14B shown in FIG. 46. The calculation circuits 10B~14B correspond to the assumed values of the quotient digit qj+1, respectively. At a time point 173B indicated in FIG. 62, the quotient digit qj+1 is settled, and hence, one of the five values of the partial remainder Pj+1 is selected. The selection is effected by a selector 15B shown in FIG. 46.

The calculation of the quotient digit qj+2 may be started after the partial remainder Pj+1 has been selected or determined. In this embodiment, however, the five sorts of calculations of the quotient digit qj+2 are started in correspondence with the five values of the partial remainder Pj+1 before the determination of this partial remainder Pj+1 in order to attain a higher operating speed. These calculations are performed by previous comparison circuits 30B, 31B, 32B, 33B and 34B shown in FIG. 46. The comparators 30B~34B correspond respectively to the assumed values of the quotient digit qj+1, and the comparisons of Eqs. 8 are made up to the intermediate parts thereof in these comparators. The subsequent parts of the comparisons are made by a quotient digit calculation circuit 50B shown in FIG. 46. One of the calculated values of the quotient digit qj+2 is selected in accordance with the value of the quotient digit qj+1 at a time point later than the determination of this quotient digit qj+1, that is, at a time point 174B in this embodiment. The selection here may well be done at the final stage of the calculation of the quotient digit qj+2, but it is done midway of the calculation as indicated by the symbol 174B in FIG. 62 (likewise, at 172B concerning the quotient digit qj+1). The selections at the time points 172B and 174B are done by a selector 35B shown in FIG. 46. The selections at this position have been determined after comparing and studying the amounts of hardware.

Figure 46:
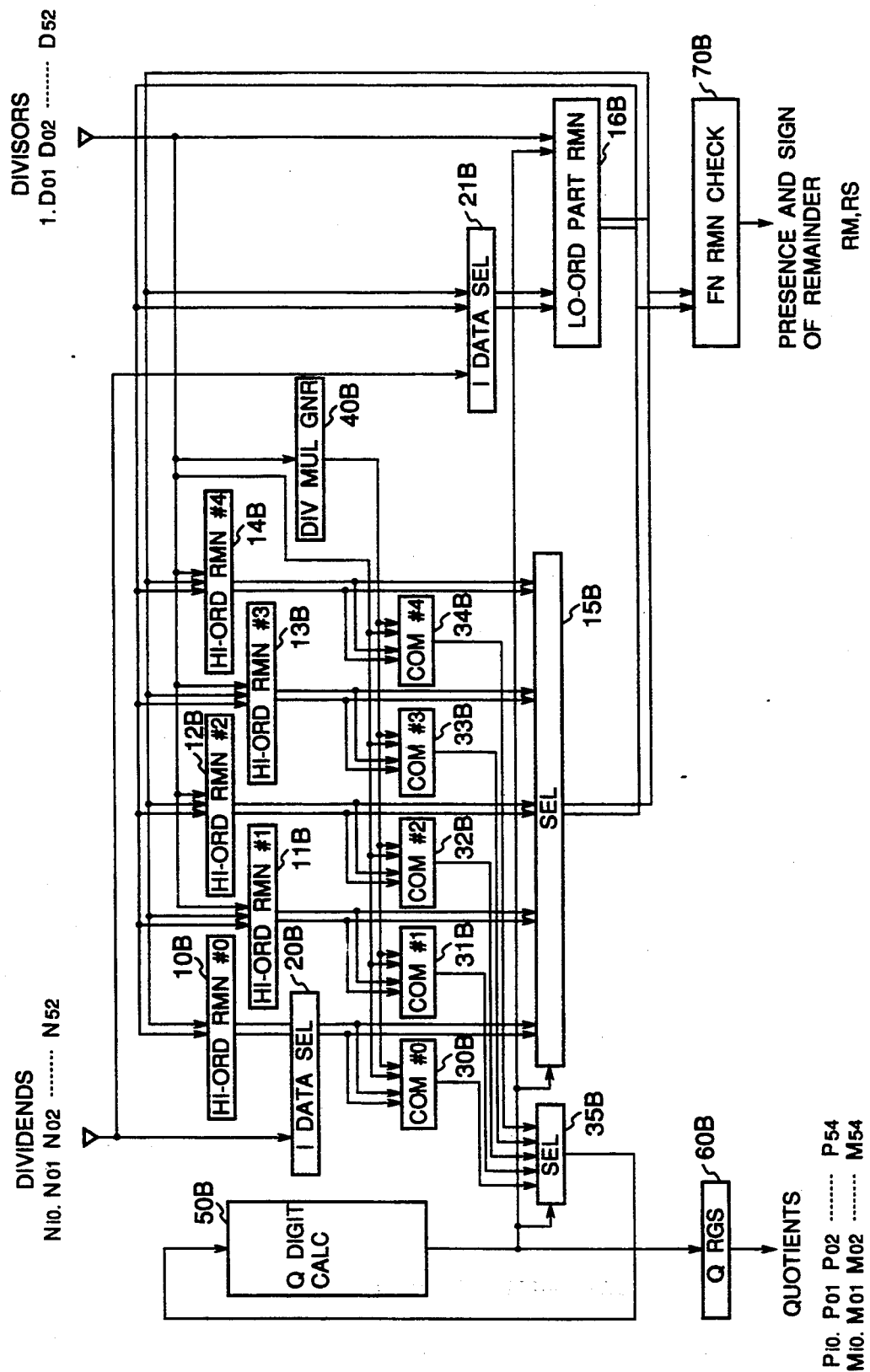
FIG. 46 is a block diagram illustrative of an embodiment of a divider in which the present invention is applied to a quaternary SRT division algorithm (SRT: Sweeney, Robertson and Tocher)

FIG. 46 is a block diagram showing the architecture of one embodiment of the divider in which the present invention is applied to the quaternary SRT division algorithm mentioned before.

The divider of this embodiment is supplied with a dividend Ni0.N01N02 ... N52 which is at least 0 (zero) and less than 2, and a divisor 1.D01D02 ... D52 which is at least 1 (one) and less than 2. It delivers plus and minus quotients Pi0.P01P02 ... P54 and Mi0.M01M02 ... M54, and the presence RM and sign RS of a remainder. The higher-order-partial-remainder previous-calculation circuits 10B, 11B, 12B, 13B and 14B (means for calculating the partial remainder values, which correspond to all the possible quotient digit values, previously or beforehand in parallel with the calculation of the quotient digit) are carry save adders which calculate the 11 higher-order bits of the partial remainder values for the quotient digit values of 0, +1, +2, −1 and −2 before the calculation of the quotient digit, respectively. A lower-order-partial-remainder calculation circuit 16B is a carry save adder which calculates the 43 lower-order bits of the partial remainder after the calculation of the quotient digit. An input data selector 20B (for selecting either of the dividend and the output of the partial-remainder precedent calculation circuit 10B which has the assumed quotient digit value of 0 (zero)) selects either a value with the 8 higher-order bits of the dividend shifted 2 bits toward the low-order position thereof or the output value of the higher-order-partial-remainder precedent calculation circuit 10B. An input data selector 21B selects either a value with the 45 lower-order bits of the dividend shifted 2 bits toward the low-order position thereof or the 41 lower-order bits of the partial remainder.

The precedent comparison circuits 30B, 31B, 32B, 33B and 34B (means for calculating the values of the next quotient digit from the divisor and the precedently-calculated values of the partial remainder, precedently or beforehand in parallel with the calculation of the pertinent or current quotient digit) compare values obtained in such a way that the 8 higher-order bits of the partial remainder values for the quotient digit values of 0, +1, +2, −1 and −2 are shifted 2 bits toward the high-order position thereof, with the 8 higher-order bits of the multiples of the divisor, and then calculate the precedent comparison values before the settlement or determination of the pertinent quotient digit, respectively. A divisor multiple generator circuit 40B calculates those multiples of the divisor which are 1.5 times larger than the divisor and which are required for the precedent comparison circuits 30B, 31B, 32B, 33B and 34B. The higher-order partial-remainder selector 15B (which functions as means for selecting one of the precedently-calculated values of the partial remainder corresponding to the calculated or settled quotient digit, as means for saving the selected partial remainder, and as means for transferring the selected partial remainder to the respective aforementioned calculation means in order to use it for the calculations of the next n bits) selects a correct value from among the precedently-calculated values of the higher-order partial remainder after the calculation or settlement of the pertinent quotient digit. The comparison value selector 35B (which functions as means for selecting one of the precedently-calculated values of the next quotient digit corresponding to the calculated quotient digit, as means for saving the selected quotient digit, and as means for transferring the selected quotient digit to the respective aforementioned calculation means in order to use it for the calculations of the next n bits) selects a correct value from among the precedent comparison values after the calculation or settlement of the pertinent quotient digit. The quotient digit calculation circuit 50B (means for calculating the quotient digit of n bits) calculates the quotient digit by the use of the selected precedent comparison value and delivers a select signal corresponding to this quotient digit. A quotient register 60B stores the calculated quotient digit therein. A final remainder checker 70B detects the presence RM and sign RS of the partial remainder after all the bits of the quotient have been calculated.

Next, the operations of the individual circuits in the quotient digit calculation will be explained.

The input data selector 20B selects the value with the 8 higher-order bits Ni0.N01N02 ... N07 of the dividend shifted 2 bits toward the low-order position thereof. The selected value is directly supplied to the higher-order partial remainder selector 15B, while it is shifted 2 bits toward the high-order position and then supplied to the precedent comparison circuit 30B. The precedent comparison circuits 30B, 31B, 32B, 33B and 34B calculate the precedent comparison values between the dividend Ni0.N01N02N03N04 and those multiples of the divisor 1.D01D02D03D04 which are respectively one time, −1.5 times, −0.5 time, +0.5 time and +1.5 times larger. The input data selector 21B selects the value with the 45 lower-order bits N08N09 ... N52 of the dividend shifted 2 bits toward the low-order position, and delivers the selected value to the lower-order-partial-remainder calculation circuit 16B. Here, the quotient digit calculation circuit 50B is controlled so as to produce the select signal corresponding to the quotient digit value of 0 (zero). In accordance with the control, the higher-order partial remainder selector 15B selects the value of the input data selector 20B, and the comparison value selector 35B selects the value of the precedent comparison circuit 30B. Besides, the lower-order-partial-remainder calculation circuit 16B adds 0 (zero) and the value of the input data selector 21B. When the value of the higher-order partial remainder selector 15B is combined with that of the lower-order-partial-remainder calculation circuit 16B, the result becomes the value with the dividend Ni0.N01N02 ... N52 shifted 2 bits toward the low-order position.

The quotient digit calculation circuit 50B is supplied with the precedent comparison values between the dividend and the divisor, and it calculates the first quotient digit. The higher-order-partial-remainder precedent calculation circuits 10B, 11B, 12B, 13B and 14B are supplied with the values of the 11 decimal bits of the partial remainder values shifted 2 bits toward the high-order position, and those 11B~14B of them are also supplied with the high-order bit of the divisor. Thus, the respective circuits 10B~14B calculate the 11 higher-order bits of the partial remainder values, assuming the values 0, +1, +2, −1 and −2 for the quotient digit. The input data selector 20B selects the value of the higher-order-partial-remainder precedent calculation circuit 10B. The input data selector 21B selects the value with the 41 lower-order bits of the partial remainder shifted 2 bits toward the high-order position. The respective precedent comparison circuits 30B, 31B, 32B, 33B and 34B compare the values obtained in such a way that the 8 higher-order bits of the outputs of the higher-order-partial-remainder precedent calculation circuits 10B, 11B, 12B, 13B and 14B are shifted 2 bits toward the high-order position, with the 8 higher-order bits of the multiples of the divisor, thereby to calculate the precedent comparison values. The quotient digit calculation circuit 50B calculates the quotient digit, and delivers the select signal corresponding to this quotient digit. In accordance with the select signal, the higher-order partial remainder selector 15B selects the value corresponding to the quotient digit from among the output values of the higher-order-partial-remainder precedent calculation circuits 10B~14B. Also in accordance with the select signal, the comparison value selector 35B selects the value corresponding to the quotient digit from among the output values of the precedent comparison circuits 30B~34B. Besides, the lower-order-partial-remainder calculation circuit 16B calculates the 43 lower-order bits of the partial remainder in such a way that a subtraction is executed between the output value of the input data selector 21B and a value obtained through the multiplication of the divisor by the quotient digit. Incidentally, since the quotient digits calculated by the quotient digit calculation circuit 50B bear signs, the plus quotient digits and the minus quotient digits are separately stored in the quotient register 60B.

When the above calculations are iterated 27 times, the plus quotients Pi0.P01P02 . . . P54 and the minus quotients Mi0.M01M02 . . . M54 are obtained in the quotient register 60B. Further, final remainders PSi1PSi0.PS01PS02 . . . PS52 and PRi1PRi0.PR01PR02 . . . PR51 in a carry save form are evaluated from the output of the higher-order partial-remainder selector 15B and the calculated result of the lower-order-partial-remainder calculation circuit 16B. The final remainder checker 70B detects the presence RM and sign RS of the final remainder.

Next, embodiments of the individual circuits constituting the divider shown in FIG. 46 will be explained in more detail.

Figure 47:
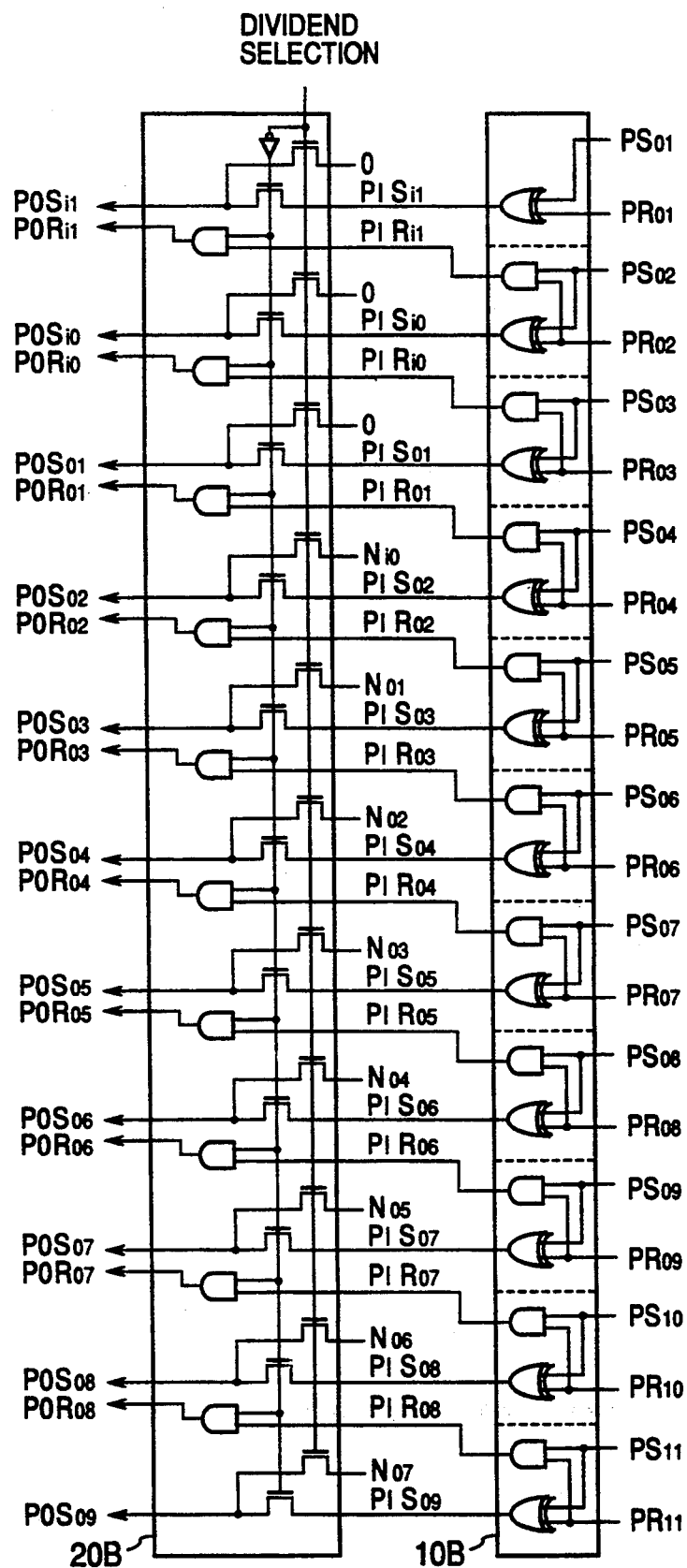
FIG. 47 is a logic diagram of a higher-order-remainder previous calculation circuit (10B) and an input data selector (20B) which are included in the embodiment.

FIG. 47 is a logic diagram showing the higher-order-partial-remainder precedent calculation circuit 10B and the input data selector 20B. The higher-order-partial-remainder precedent calculation circuit 10B executes the carry save addition between values with the partial-remainders PSi1PSi0.PS01PS02 . . . PS12 and PRi1PRi0.PR01PR02 . . . PR11 of the carry save form shifted 2 bits toward the high-order position thereof. Thus, it calculates the partial remainders PISi1PISi0.PIS01 . . . PIS09 and PIRi1PIRi0.PIR01 . . . PIR08 in the case where the quotient digit is 0 (zero). The input data selector 20B selects either the partial remainder PISi1PISi0.PIS01 . . . PIS09 or a value 00.0Ni0N01 . . . N07 with the dividend shifted 2 bits toward the low-order position thereof, and it selects either the partial remainder PIRi1PIRi0.PIR01 . . . PIR08 or "0".

Figure 48:
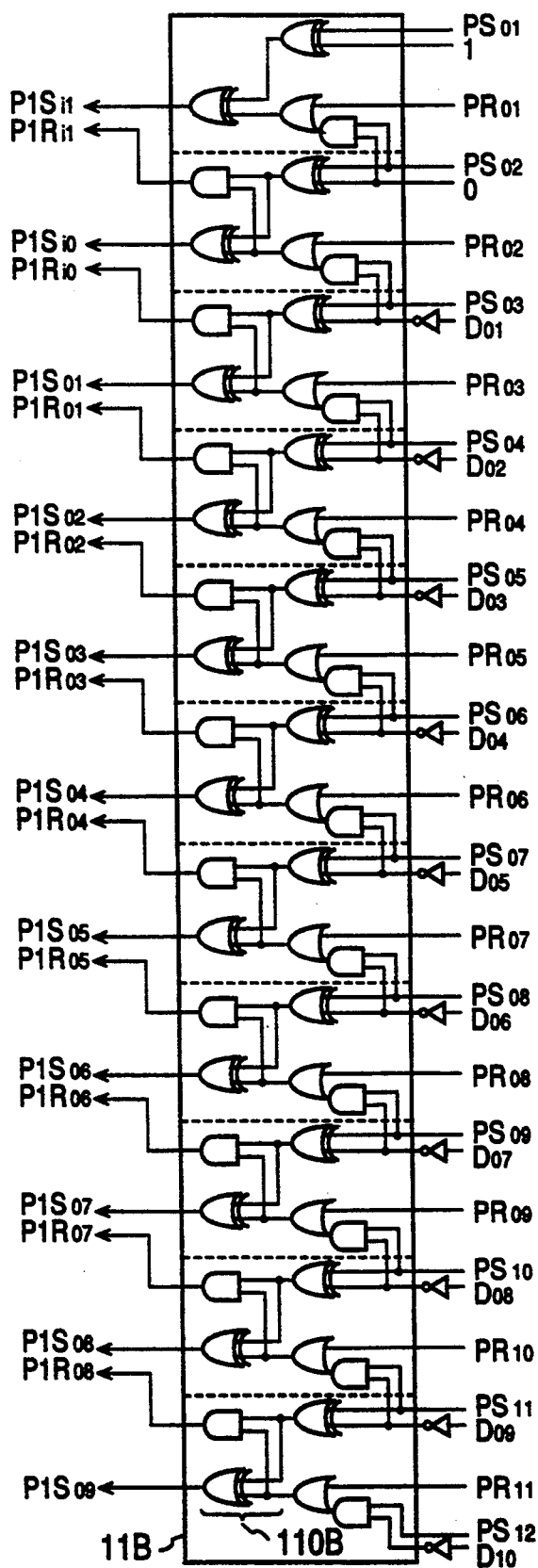
FIG. 48 is a logic diagram of a higher-order-remainder previous-calculation circuit (11B)

FIG. 48 is a logic diagram of the higher-order-partial-remainder precedent calculation circuit 11B. This precedent calculation circuit 11B executes the carry save addition among the values with the partial remainders PSi1PSi0.PS01PS02 . . . PS12 and PRi1PRi0.PR01PR02 . . . PR11 of the carry save form shifted 2 bits toward the high-order position thereof, and a value with the divisor 1.D01D02 . . . D10 inverted by inverters. Thus, it calculates the partial remainders P1Si1P1Si0.P1S01 . . . P1S09 and P1Ri1P1Ri0.P1R01 . . . P1R08 in the case where the quotient digit is +1. Symbol 110B in the figure denotes a circuit which delivers a value produced through the half addition between a sum and a carry signal.

Figure 49:
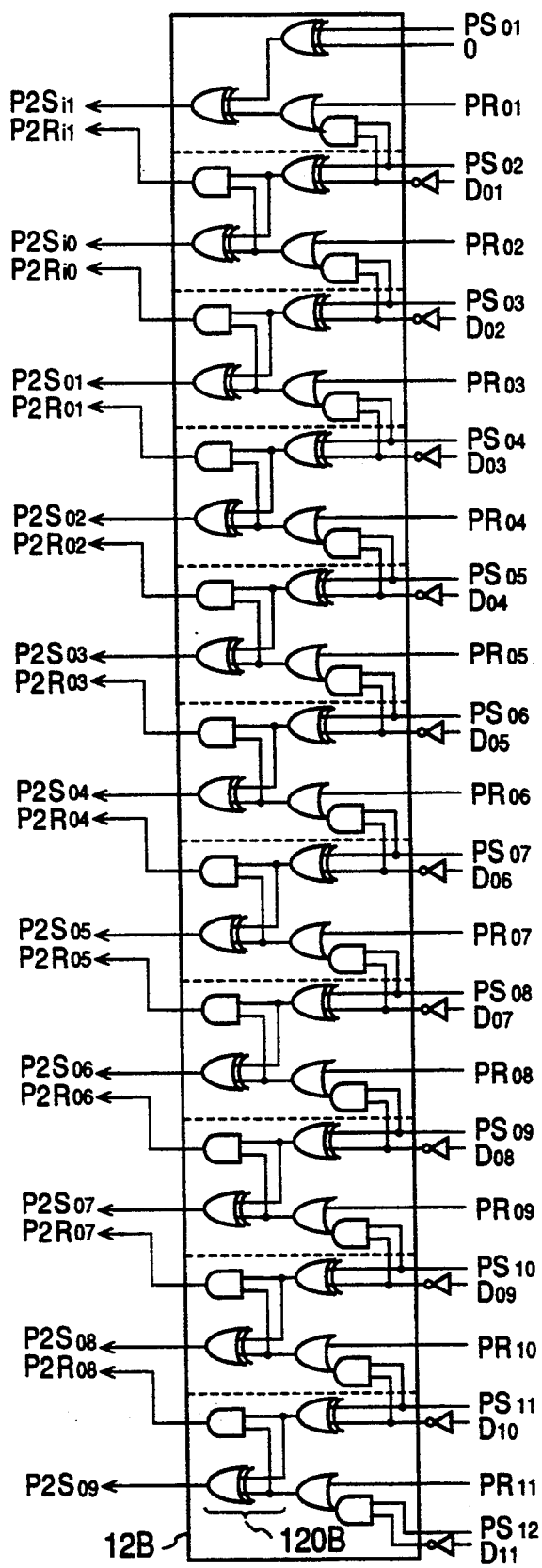
FIG. 49 is a logic diagram of a higher-order-remainder previous calculation circuit (12B)

FIG. 49 is a logic diagram of the higher-order-partial-remainder precedent calculation circuit 12B. This precedent calculation circuit 12B executes the carry save addition among the values with the partial remainders PSi1PSi0.PS01PS02 . . . PS12 and PRi1PRi0.PR01PR02 . . . PR11 of the carry save form shifted 2 bits toward the high-order position thereof, and a value with the divisor 1.D01D02 . . . D11 shifted one bit toward the high-order position thereof and then inverted by inverters. Thus, it calculates the partial remainders P2Si1P2Si0.P2S01 . . . P2S09 and P2Ri1P2Ri0.P2R01 . . . P2R08 in the case where the quotient digit is +2. Symbol 120B in the figure denotes a circuit which delivers a value produced through the half addition between a sum and a carry signal.

Figure 50:
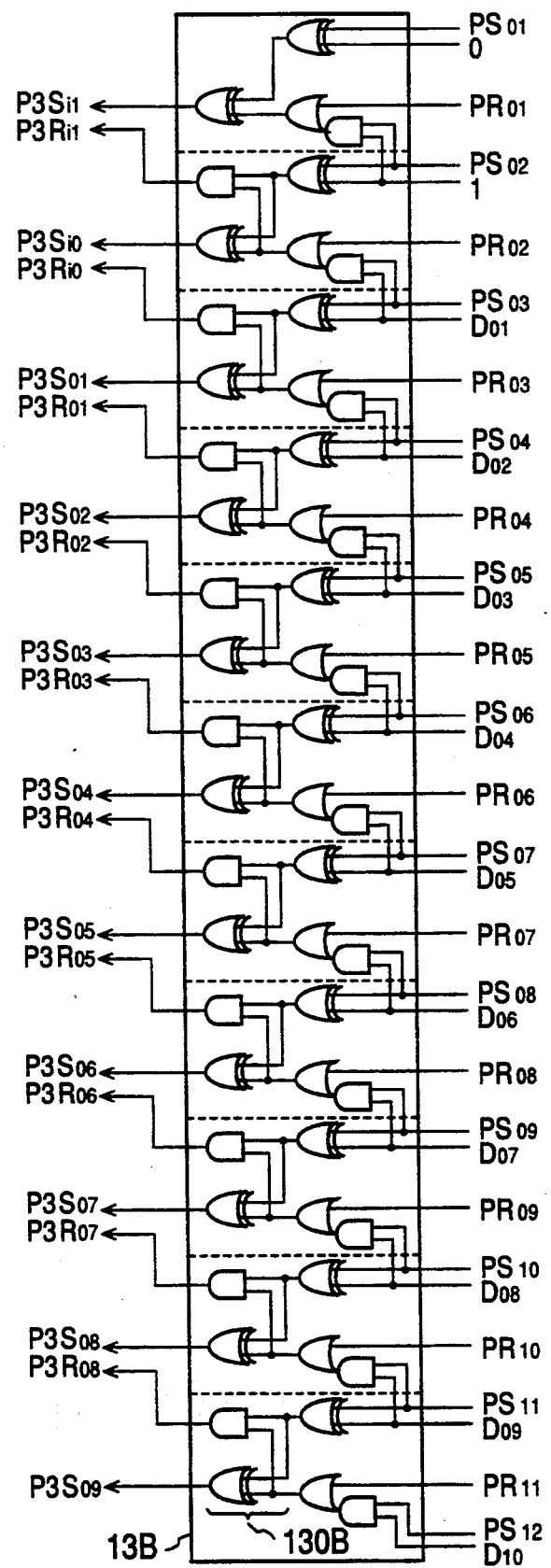
FIG. 50 is a logic diagram of a higher-order-remainder previous calculation circuit (13B)

FIG. 50 is a logic diagram of the higher-order-partial-remainder precedent calculation circuit 13B. This precedent calculation circuit 13B executes the carry save addition among the values with the partial remainders PSi1PSi0.PS01PS02 . . . PS12 and PRi1PRi0.PR01PR02 . . . PR11 of the carry save form shifted 2 bits toward the high-order position thereof, and the divisor 1.D01D02 . . . D10. Thus, it calculates the partial remainders P3Si1P3Si0.P3S01 . . . P3S09 and P3Ri1P3Ri0.P3R01 . . . P3R08 in the case where the quotient digit is −1. Symbol 130B in the figure denotes a circuit which delivers a value produced through the half addition between a sum and a carry signal.

Figure 51:
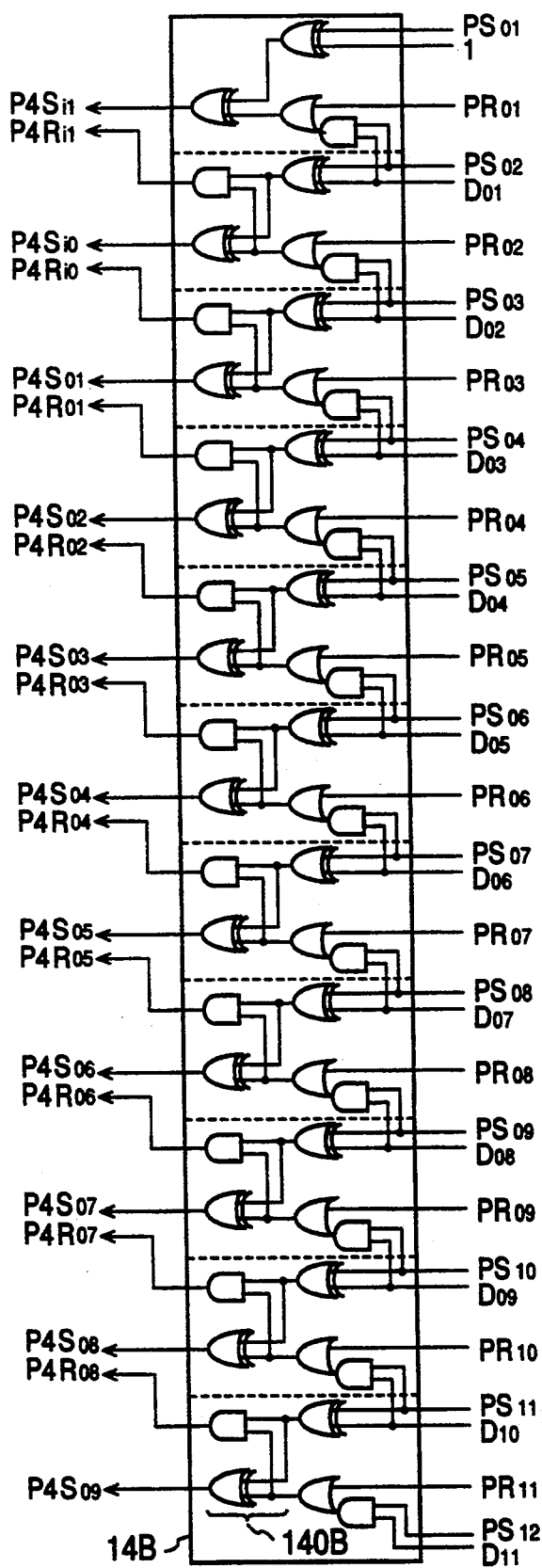
FIG. 51 is a logic diagram of a higher-order-remainder previous calculation circuit (14B)

Symbol 140B in FIG. 51 also denotes a circuit which delivers a value produced through the half addition between a sum and a carry signal.

FIG. 51 is a logic diagram of the higher-order-partial-remainder precedent calculation circuit 14B. This precedent calculation circuit 14B executes the carry save addition among the values with the partial remainders PSi1PSi0.PS01PS02 . . . PS12 and PRi1PRi0.PR01PR02 . . . PR11 of the carry save form shifted 2 bits toward the high-order position thereof, and a value with the divisor 1.D01D02 . . . D10 shifted one bit toward the high-order position thereof. Thus, it calculates the partial remainders P4Si1P4Si0.P4S01 . . . P4S09 and P4Ri1P4Ri0.P4R01 . . . P4R08 in the case where the quotient digit is −2.

Figure 52:
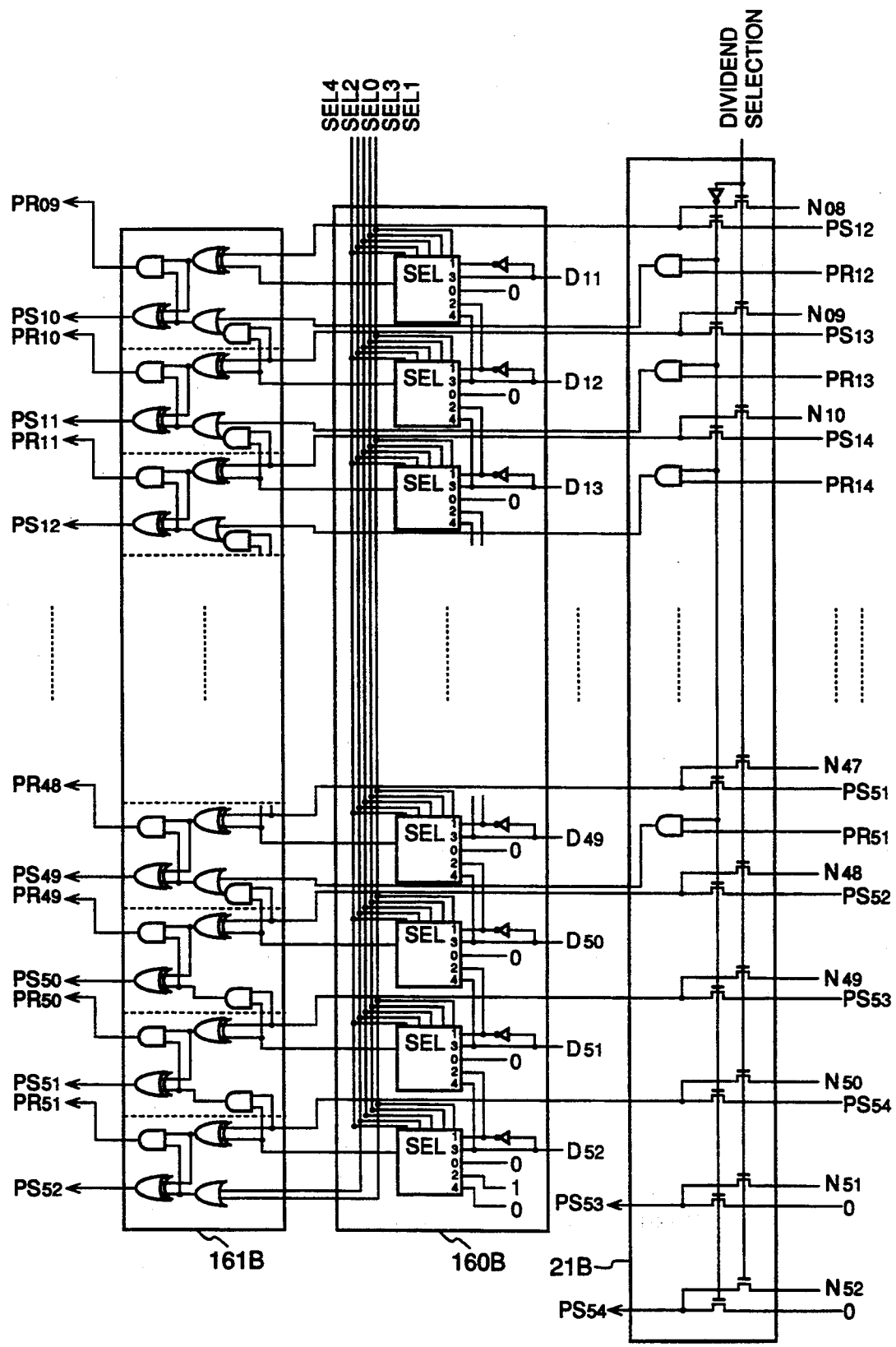
FIG. 52 is a logic diagram of an input data selector (21B) and a lower-order-remainder calculation circuit (16B)

FIG. 52 is a logic diagram showing the input data selector 21B and the lower-order-partial-remainder calculation circuit 16B. The input data selector 21B selects either a value with the outputs PS53 and PS54 of this input data selector 21B affixed to the partial remainder PS12 . . . PS52 and then shifted 2 bits toward the high-order position or a value with the dividend N08 .

... N52 shifted 2 bits toward the low-order position, and it selects either a value with the partial remainder PR12 ... PR51 shifted 2 bits toward the high-order position or "0".

The lower-order-partial-remainder calculation circuit 16B is configured of a multiplier circuit 160B for the multiplication between the quotient and the divisor, and a carry save adder 161B. The multiplier circuit 160B includes 5-input selectors and inverters. The input #0 of each of the selectors is supplied with "0", the inputs #3 and #1 thereof are respectively supplied with the corresponding bit of the divisor and its inverted value, and the inputs #4 and #2 thereof are respectively supplied with the bit of the divisor adjacent and below the aforementioned corresponding bit and its inverted value. Each of the 5-input selectors selects one of the five input data in accordance with a select signal SEL0, SEL1, SEL2, SEL3 or SEL4. The carry save adder 161B adds the outputs of the input data selector 21B and those of the multiplier circuit 160B, thereby to calculate the partial remainders PS10 ... PS52 and PR09 ... PR51. When the select signal SEL0 is "1", the outputs of the input data selector 21B and "0" are added up When the select signal SEL1 is "1", the outputs of the input data selector 21B and the inverted value of the divisor are added up. On this occasion, "1" which is a complement for subtraction is added at the low-order position or LSB (least significant bit) of the adder 161B. When the select signal SEL2 is "1", the outputs of the input data selector 21B and the value with the divisor shifted one bit toward the high-order position and then inverted are added up On this occasion, "1" which is the complement for subtraction is added at the low-order position of the adder 161B. When the select signal SEL3 is "1", the outputs of the input data selector 21B and the divisor are added up. When the select signal SEL4 is "1", the outputs of the input data selector 21B and the value with the divisor shifted one bit toward the high-order position are added up.

Figure 53:
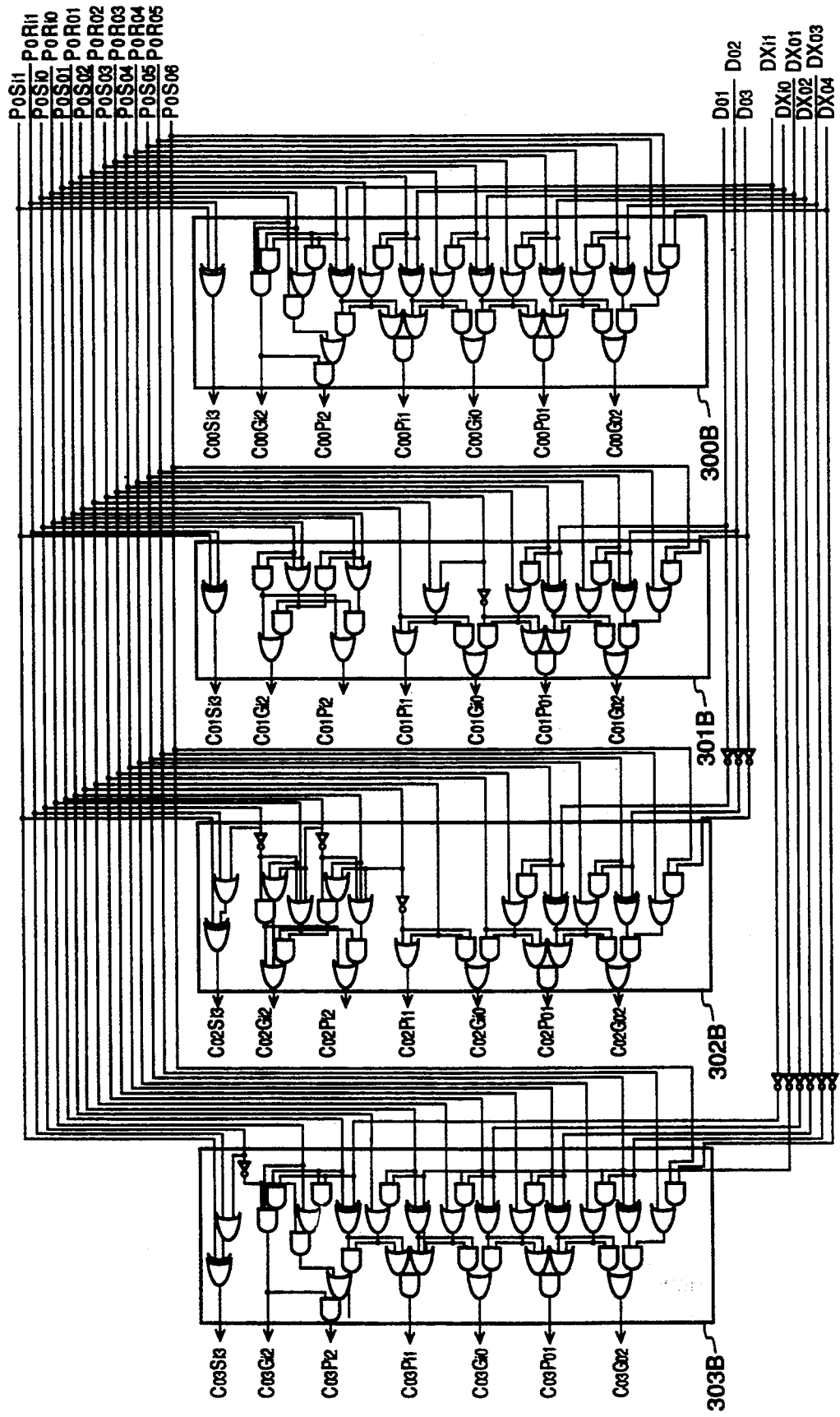
FIG. 53 is a logic diagram of a previous operation comparator (30B)

FIG. 53 is a logic diagram of the precedent comparison circuit 30B. This precedent comparison circuit 30B is configured of a comparator 300B for the comparisons with the multiple of the divisor being −1.5 times as large as the divisor, a comparator 301B for the comparisons with the multiple of the divisor being −0.5 time, a comparator 302B for the comparisons with the multiple of the divisor being +0.5 time, and a comparator 303B for the comparisons with the multiple of the divisor being +1.5 times. Each of the comparators 300B∼303B executes the 3-input addition among the partial remainders and the inverted value of the multiple of the divisor for the comparisons with the partial remainders, and it delivers intermediate data for deciding magnitudes on the basis of the sign of the high-order position thereof.

More specifically, the comparator 300B executes the 3-input addition among values with the partial remainders shifted 2 bits toward the high-order position thereof; P0Si1P0Si0P0S01P0S02.P0S03P0S04P0S05P0S06 and P0Ri1P0Ri0P0R01P0R02.P0R03P0R04P0R05, and the +1.5 times-value of the divisor; DXi1DXi0.DX01DX02DX03DX04. Thus, it produces the sum C00Si3 of the inputs at the high-order position, and bits for calculating carries to the high-order position; C00Gi2, C00Pi2, C00Pi1, C00Gi0, C00P01 and C00G02.

Besides, the comparator 301B executes the 3-input addition among the values with the partial remainders shifted 2 bits toward the high-order position thereof, and the +0.5 time-value of the divisor; 0.1D01D02D03. Thus, it produces the sum C01Si3 of the inputs at the high-order position, and bits for calculating carries to the high-order position; C01Gi2, C01Pi2, C01Pi1, C01Gi0, C01P01 and C01G02.

Further, the comparator 302B executes the 3-input addition among the values with the partial remainders shifted 2 bits toward the high-order position thereof, and the inverted value of the +0.5 time-value 0.1D01D02D03 of the divisor. Thus, it produces the sum C02Si3 of the inputs at the high-order position, and bits for calculating carries to the high-order position; C02Gi2, C02Pi2, C02Pi1, C02Gi0, C02P01 and C02G02.

Still further, the comparator 303B executes the 3-input addition among the values with the partial remainders shifted 2 bits toward the high-order position thereof, and the inverted value of the +1.5 time-value DXi1DXi0.DX01DX02DX03DX04 of the divisor. Thus, it produces the sum C03Si3 of the inputs at the high-order position, and bits for calculating carries to the high-order position; C03Gi2, C03Pi2, C03Pi1, C03Gi0, C03P01 and C03G02.

Each of the precedent comparison circuits 31B, 32B, 33B and 34B has the same logical structure as that of the precedent comparison circuit 30B shown in FIG. 53, and it merely differs in the names of the signals of the partial remainders and the names of the output signals. More specifically, for the precedent comparison circuit 31B, the initial two letters of the partial remainders and the output signals in FIG. 53 change into "P1" and "C1", respectively. For the precedent comparison circuit 32B, the initial two letters of the partial remainders and the output signals in FIG. 53 change into "P2" and "C2", respectively. For the precedent comparison circuit 33B, the initial two letters of the partial remainders and the output signals in FIG. 53 change into "P3" and "C3", respectively. For the precedent comparison circuit 34B, the initial two letters of the partial remainders and the output signals in FIG. 53 change into "P4" and "C4", respectively.

Figure 54:
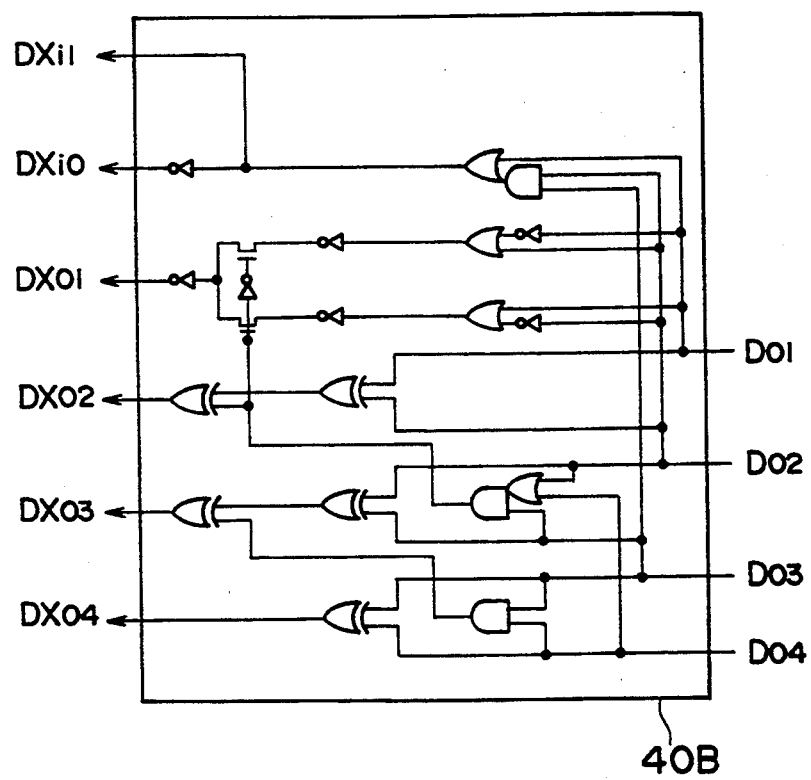
FIG. 54 is a logic-diagram of a divisor multiple generator circuit (40B)

FIG. 54 is a logic diagram of the divisor multiple generator circuit 40B which generates the 1.5-times values of the divisor. This generator circuit 40B is supplied with the 4 higher-order bits of the fraction part of the divisor, and it delivers the added result DXi1DXi0.DX01DX02DX03DX04 between values 1.D01D02D03D04 and 0.0D01D02D03.

Figure 55:
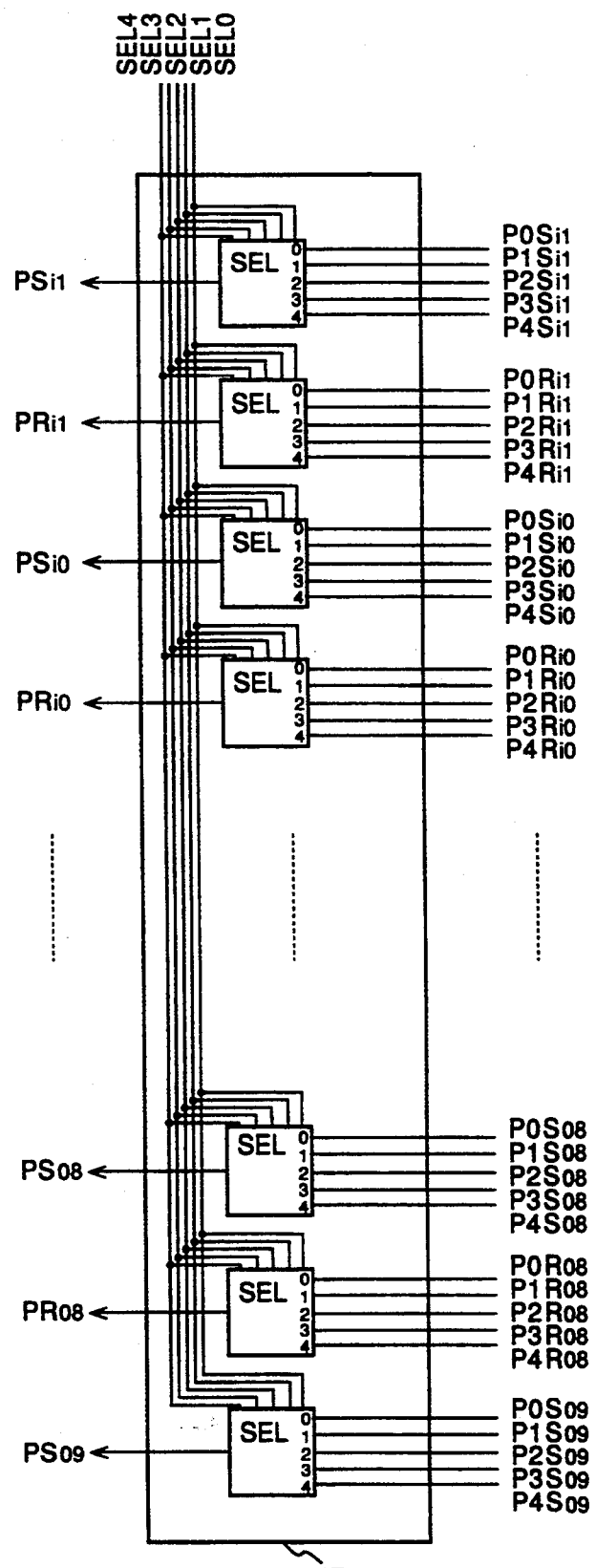
FIG. 55 is a logic diagram of a higher-order remainder selector (15B)

FIG. 55 is a logic diagram of the higher-order partial-remainder selector 15B. This selector 15B selects one of the five precedently-calculated partial remainder values entering each of 5-input selectors, in accordance with the select signal SEL0, SEL1, SEL2, SEL3 or SEL4. When the signal SEL0 is "1", the selector 15B selects the values P0Si1P0Si0.P0S01 ... P0S09 and P0Ri1P-0Ri0.P0R01 ... P0R08. Besides, when the signal SEL1 is "1", the selector 15B selects the values P1Si1P-1Si0.P1S01 ... P1S09 and P1Ri1P1Ri0.P1R01 ... P1R08. Further, when the signal SEL2 is "1", the selector 15B selects the values P2Si1P2Si0.P2S01 ... P2S09 and P2Ri1P2Ri0.P2R01 ... P2R08. Still further, when the signal SEL3 is "1", the selector 15B selects the values P3Si1P3Si0.P3S01 ... P3S09 and P3Ri1P-3Ri0.P3R01 ... P3R08. Yet further, when the signal SEL4 is "1", the selector 15B selects the values P4Si1P-4Si0.P4S01 ... P4S09 and P4Ri1P4Ri0.P4R01 ... P4R08.

Figure 56:
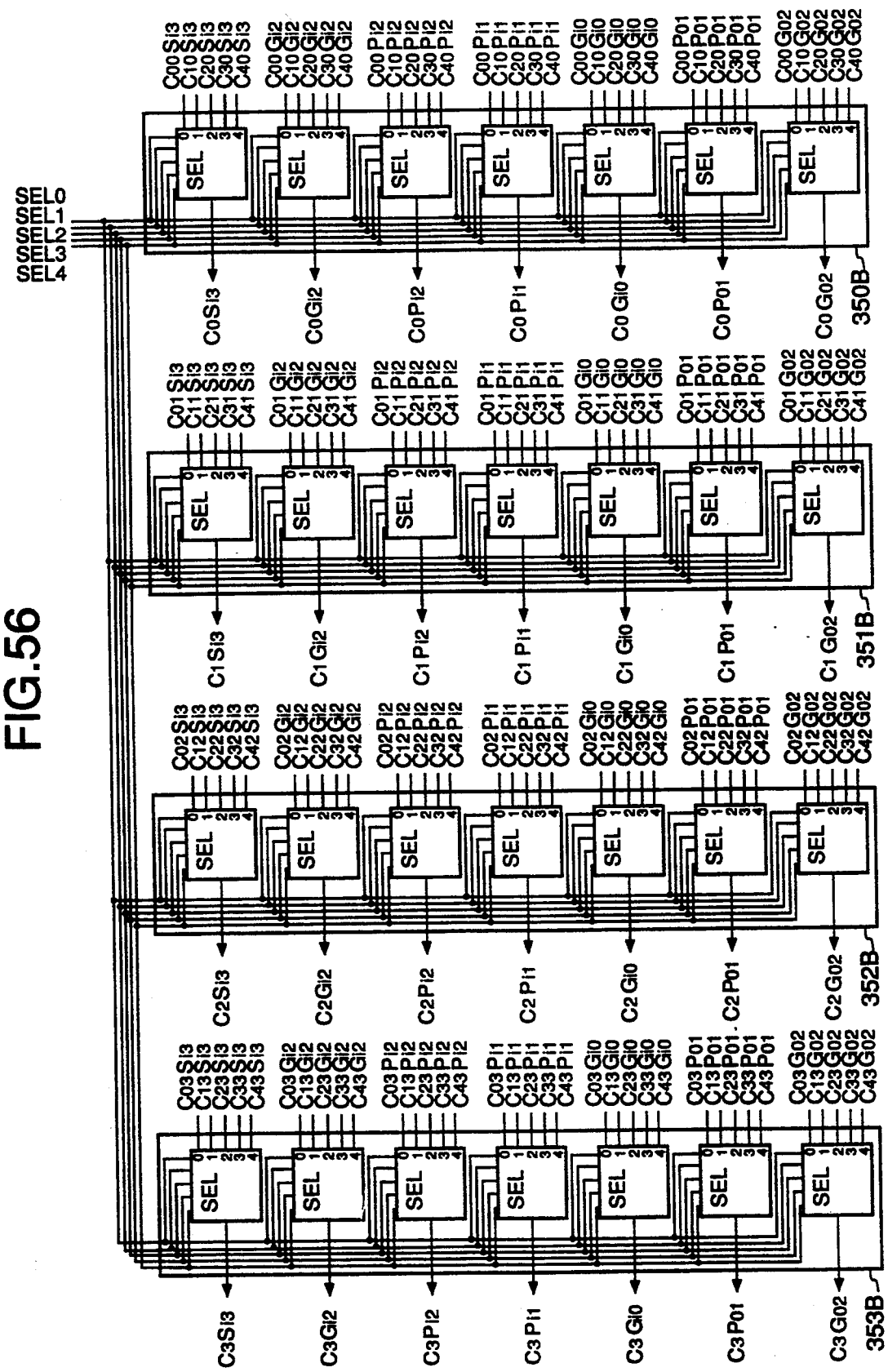
FIG. 56 is a logic diagram of a compared value selector (35B)

FIG. 56 is a logic diagram of the comparison value selector 35B. This comparison value selector 35B includes selectors 350B, 351B, 352B and 353B. The selector 350B selects data produced midway of the comparisons between the precedently-calculated values of the partial remainders and the −1.5-times value of the divisor. Likewise, the selectors 351B, 352B and 353B select data produced midway of the comparisons between the precedently-calculated values of the partial remainders and the −0.5-time value, +0.5-time value and +1.5-times value of the divisor, respectively. In the cases where the select signals SEL0, SEL1, SEL2, SEL3 and SEL4 become "1's", the data produced midway of the comparisons as bear initial letters C0, C1, C2, C3 and C4 are respectively selected.

Figure 57:
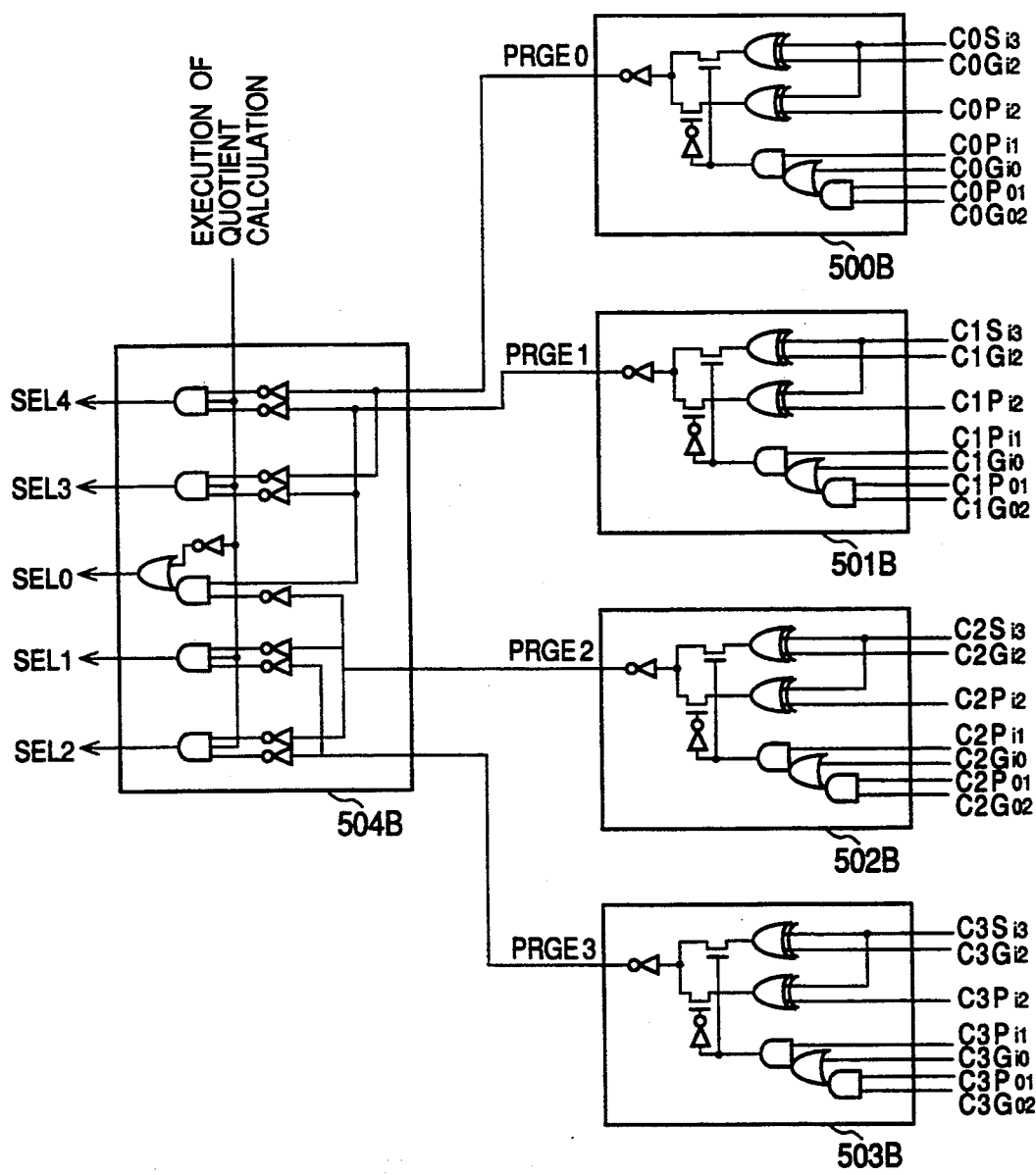
FIG. 57 is a logic diagram of a quotient digit calculation circuit (50B)

FIG. 57 is a logic diagram of the quotient digit calculation circuit 50B. This calculation circuit 50B is configured of magnitude decision circuits 500B, 501B, 502B and 503B, and a select signal generator circuit 504B. The magnitude decision circuits 500B, 501B, 502B and 503B are respectively supplied with the data produced midway of the comparisons between the values with the partial remainders shifted 2 bits toward the high-order position and the −1.5-times value, −0.5-time value, +0.5-time value and +1.5-times value of the divisor. Then, the respective decision circuits 500B~503B deliver signals PRGE0, PRGE1, PRGE2 and PRGE3 which become "1's" on condition that the shifted values of the partial remainders are greater than or equal to the corresponding multiples of the divisor. The select signal generator circuit 504B generates the select signals SEL0~SEL4 (or asserts any of these select signals) in accordance with the signals PRGE0~PRGE3 while the quotient calculation is being executed. More specifically, in case of PRGE0=0 and PRGE1=0, the quotient digit is found to be −2, and only the select signal SEL4 is set at "1". Besides, in case of PRGE0=1 and PRGE1=0, the quotient digit is found to be −1, and only the select signal SEL3 is set at "1". Further, in case of PRGE1=1 and PRGE2=0, the quotient digit is found to be 0 (zero), and only the select signal SEL0 is set at "1". Still further, in case of PRGE2=1 and PRGE3=0, the quotient digit is found to be +1, and only the select signal SEL1 is set at "1". Yet further, in case of PRGE2=1 and PRGE3=1, the quotient digit is found to be +2, and only the select signal SEL2 is set at "1". When the quotient calculation is not under execution, only the select signal SEL0 is set at "1". At the beginning of the quotient calculation, the partial remainder selector 15B, and the comparison value selector 35B select the dividend, and data produced midway of the comparison between the dividend and the divisor, respectively. Also, the lower-order-partial-remainder calculation circuit 16B calculates a value with the dividend shifted 2 bits toward the low-order position thereof.

Figure 58:
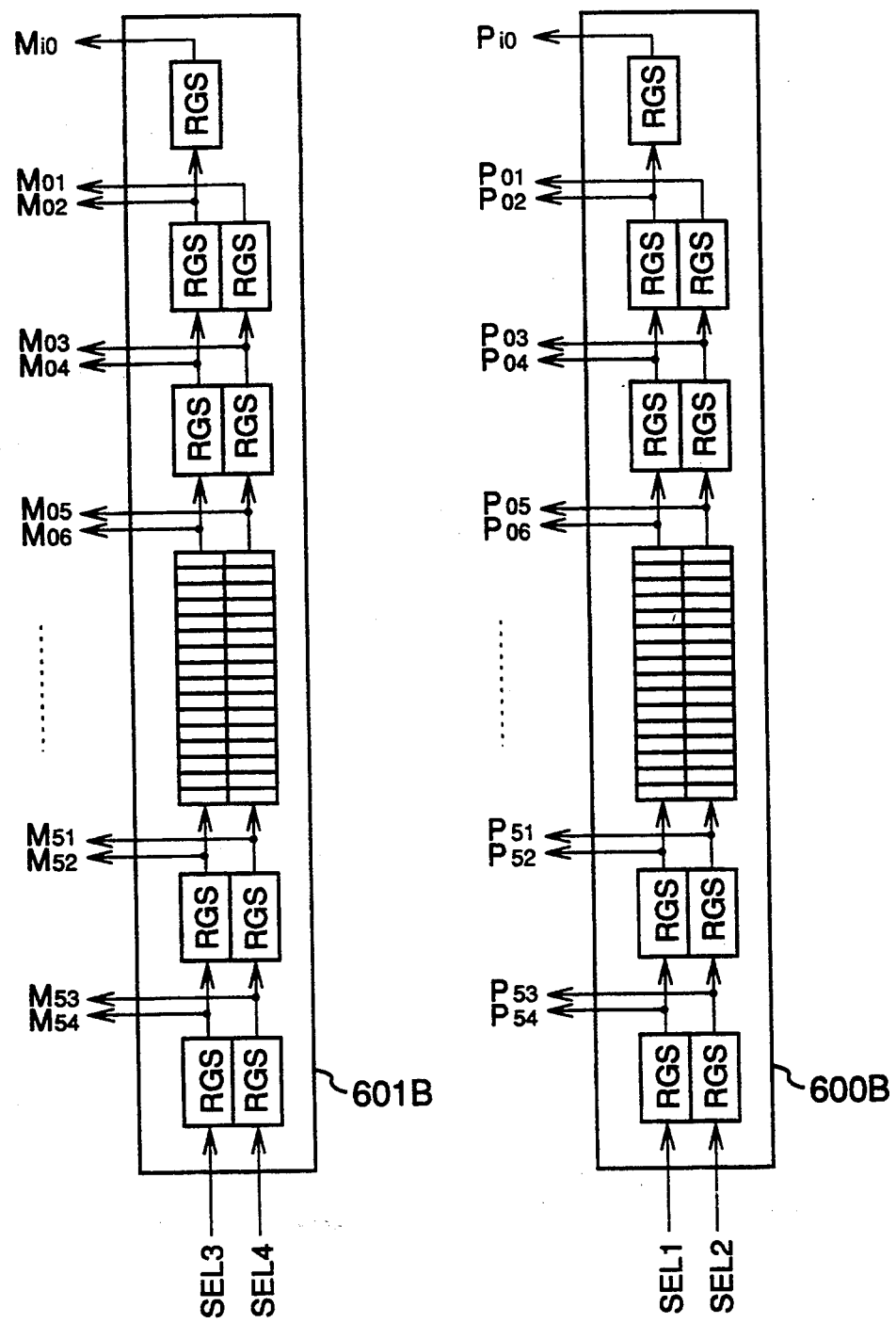
FIG. 58 is a block diagram showing an example of the construction of a quotient register (60B)

FIG. 58 is a block diagram showing an example of the construction of the quotient register 60B. Since the quotient digit becomes any of the values −2, −1, 0, +1 and +2, the absolute values of plus values and minus values are respectively stored in separate registers 600B and 601B. The register 600B receives the select signals SEL2 and SEL1, and it shifts data stored before, every 2 bits toward the high-order position thereof. The inputs of the register 600B for the quotient digit values of −2, −1, 0, +1 and +2 become "00", "00", "00", "01" and "10", respectively. The plus quotient Pi0.P01P02 . . . P54 is obtained by iterating the quotient digit calculations 28 times. On the other hand, the register 601B receives the select signals SEL4 and SEL3, and it shifts data stored before, every 2 bits toward the high-order position thereof. The inputs of the register 601B for the quotient digit values of −2, −1, 0, +1 and +2 become "10", "01", "00", "00" and "00", respectively The minus quotient Mi0.M01M02 . . . M54 is obtained by iterating the quotient digit calculations 28 times. The quotient becomes at least 0 (zero) and less than 2 because of the conditions that the dividend is at least 0 (zero) and less than 2 and that the divisor is at least 1 (one) and less than 2. Accordingly, the integer part of the quotient suffices with 1 (one) bit.

Figure 59:
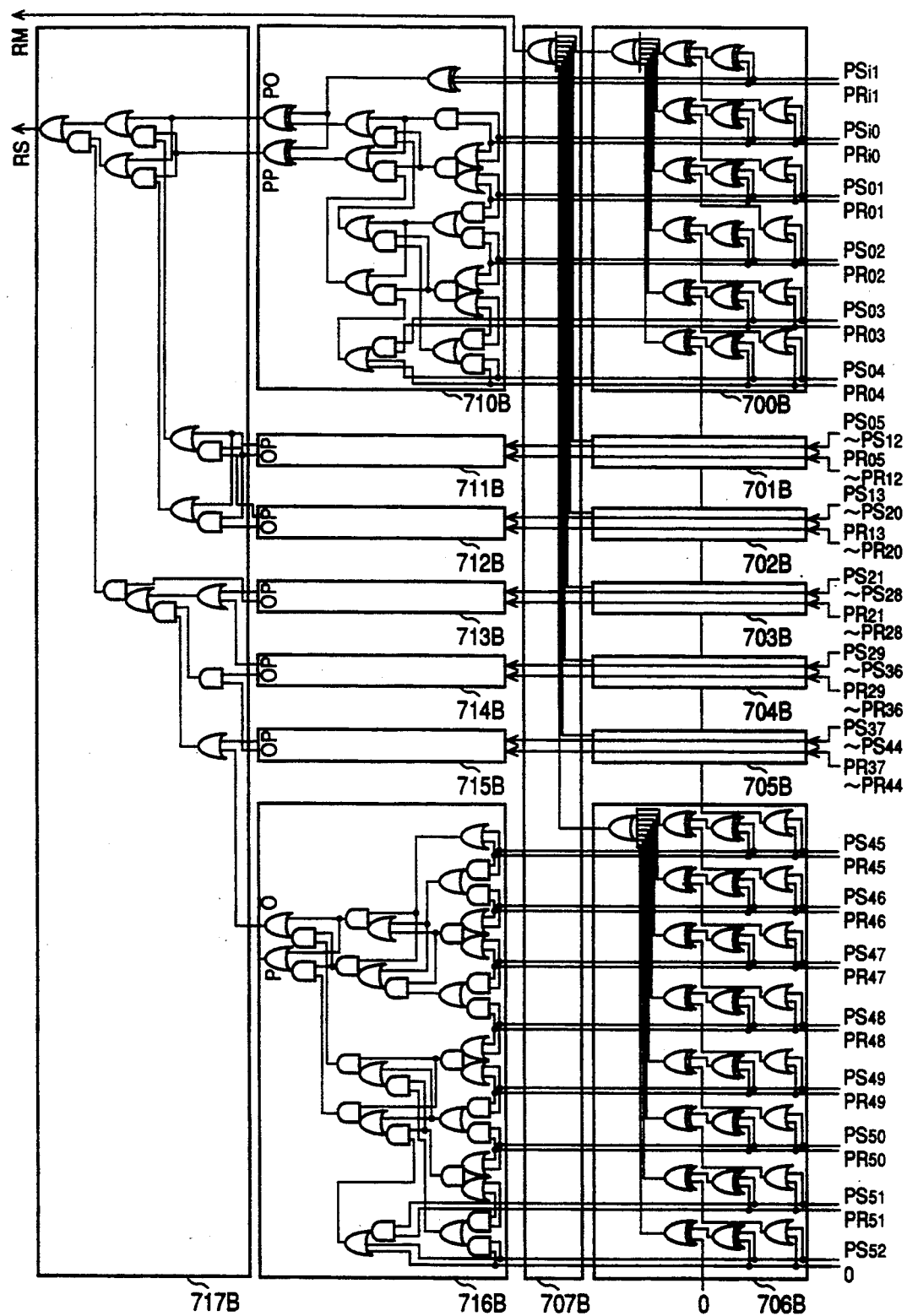
FIG. 59 is a logic diagram of a final remainder checker (70B)

FIG. 59 is a logic diagram of the final remainder checker 70B. This checker 70B is configured of remainder presence detector circuits 700B~707B, and remainder sign detector circuits 710B~717B. The 6 higher-order bits of the partial remainders are input to the detector circuits 700B and 710B, while the succeeding bits are input to the detector circuits 701B~706B and 711B~716B in 8-bit unit. Each of the detector circuits 701B~705B has the same logic as that of the detector circuit 706B, while each of the detector circuits 711B~715B has the same logic as that of the detector circuit 716B. The detector circuits 700B~706B detect the presence or absence of the remainder for the respective fields thereof without executing the carry propagation additions of the partial remainders of the carry save form. The input detector circuit 707B takes and delivers the sum RM of the detection signals of the detector circuits 700B~706B. In the presence of the remainder, the sum RM=1 holds. The detector circuit 710B produces a signal PG indicating that the sign is plus in the nonexistence of carries from the lower-order positions, and a signal PP indicating that the sign is plus in the existence of the carries from the lower-order positions. The detector circuits 711B~716B detect carries G to the higher-order positions in the nonexistence of carries from the lower-order positions and carries P to the higher-order positions in the existence of the carries from the lower-order positions every 8 bits. Using the detection signals of the detector circuits 710B~716B, the detector circuit 717B produces or asserts the signal RS which signifies that the final remainder is plus.

Figure 60:
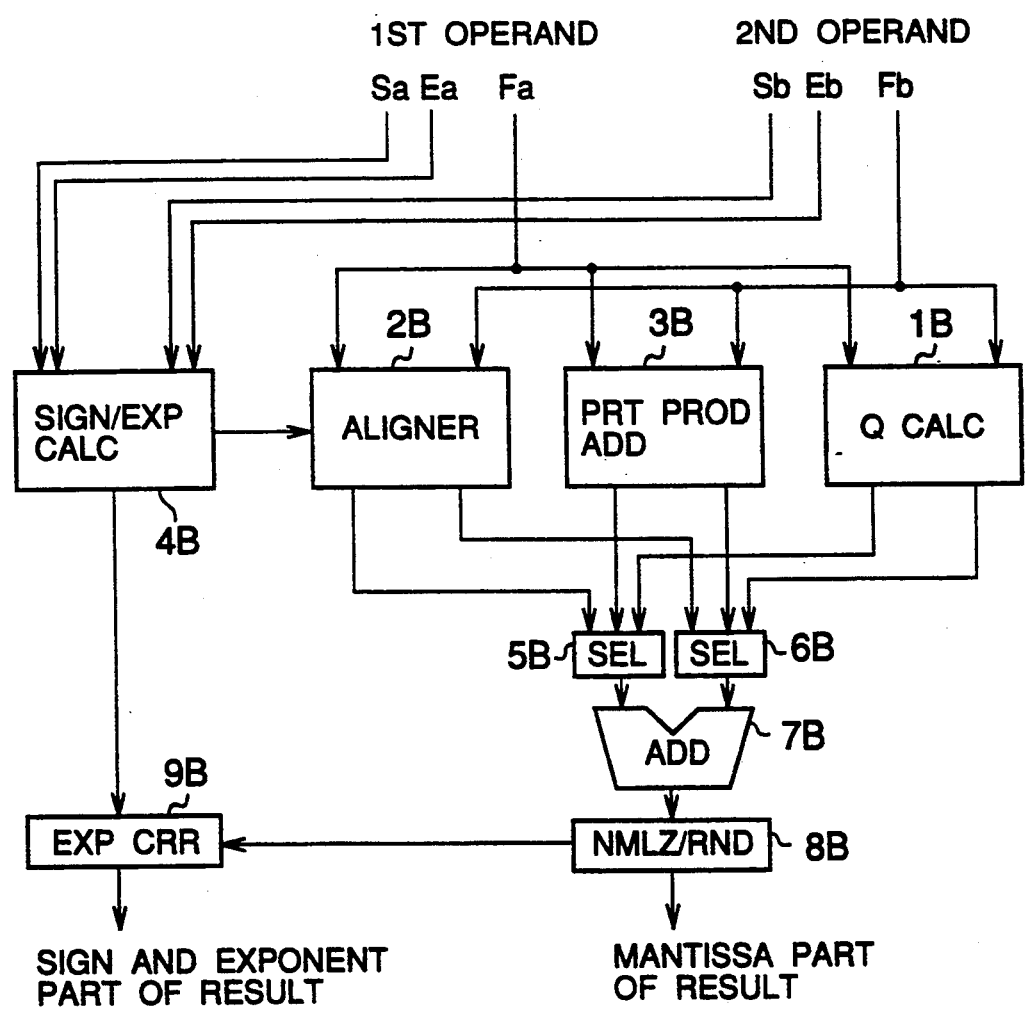
FIG. 60 is a block diagram showing an example of the architecture of a floating-point arithmetic unit which is furnished with the divider of the present invention.

FIG. 60 is a block diagram showing an example of the architecture of a floating-point arithmetic unit which is furnished with the divider of the present invention. A floating-point division is executed by the divider (or quotient calculator) 1B. An aligner 2B is for a floating-point addition, and a partial product adder 3B is for a floating-point multiplication. Selectors 5B and 6B select data which are to be input to an adder 7B. The intermediate values of the operation are added by the adder 7B, and the resulting sum is normalized and rounded by a processor (or normalizing/rounding unit) 8B. The sign and exponent parts of the final result of the operation are calculated by a processor (or sign/exponent calculator) 4B, and are normalized and rounded. If necessary, the exponent part is corrected by a processor (or exponent corrector) 9B. In executing the floating-point division, plus and minus quotients and the presence and sign of a remainder are first calculated in the divider 1B. In a case where the remainder is 0 (zero) or plus, the two's complements of the plus and minus quotients are added by the adder 7B. On the other hand, in a case where the remainder is minus, the one's complements of the plus and minus quotients are added by the adder 7B. In consequence of the addition, the quotient of the final result having an integer part of 1 (one) bit and a fraction part of 54 bits is obtained together with the remainder of 1 (one) bit. After the normalizing and rounding processes by the processor 8B, the execution of the division is ended.

The foregoing embodiment concerning the divider is a high-radix divider characterized in that the output of the partial remainder selector (15B) is connected to all the partial-remainder precedent calculation circuits (10B~14B), that the input data selector (20B) selects either the dividend or the output signal of the partial-remainder precedent calculation circuit (10B) for which "0" is assumed as the quotient digit, that the output of the input data selector (20B) is connected to the precedent quotient calculation circuit (30B) for which "0" is assumed as the quotient digit, that the partial remainder selector (15B) selects the correct value from among the output signal of the input data selector (20B), and the output signals of the partial-remainder precedent calculation circuits (11B~14B) for which the values other than "0" are assumed as the quotient digits, that the input data selector (20B) selects the dividend before the calculation of the quotient digits, that the partial remainder selector (15B) and the precedently-calculated quotient value selector (35B) select the respective values calculated assuming "0" as the quotient digit, before the calculation of the quotient digits, that the input data selector (20B) selects the partial remainder during the calculation of the quotient digits, and that the partial remainder selector (15B) and the precedently-calculated quotient value selector (35B) select the respective values calculated assuming the quotient digits.

Figure 61:
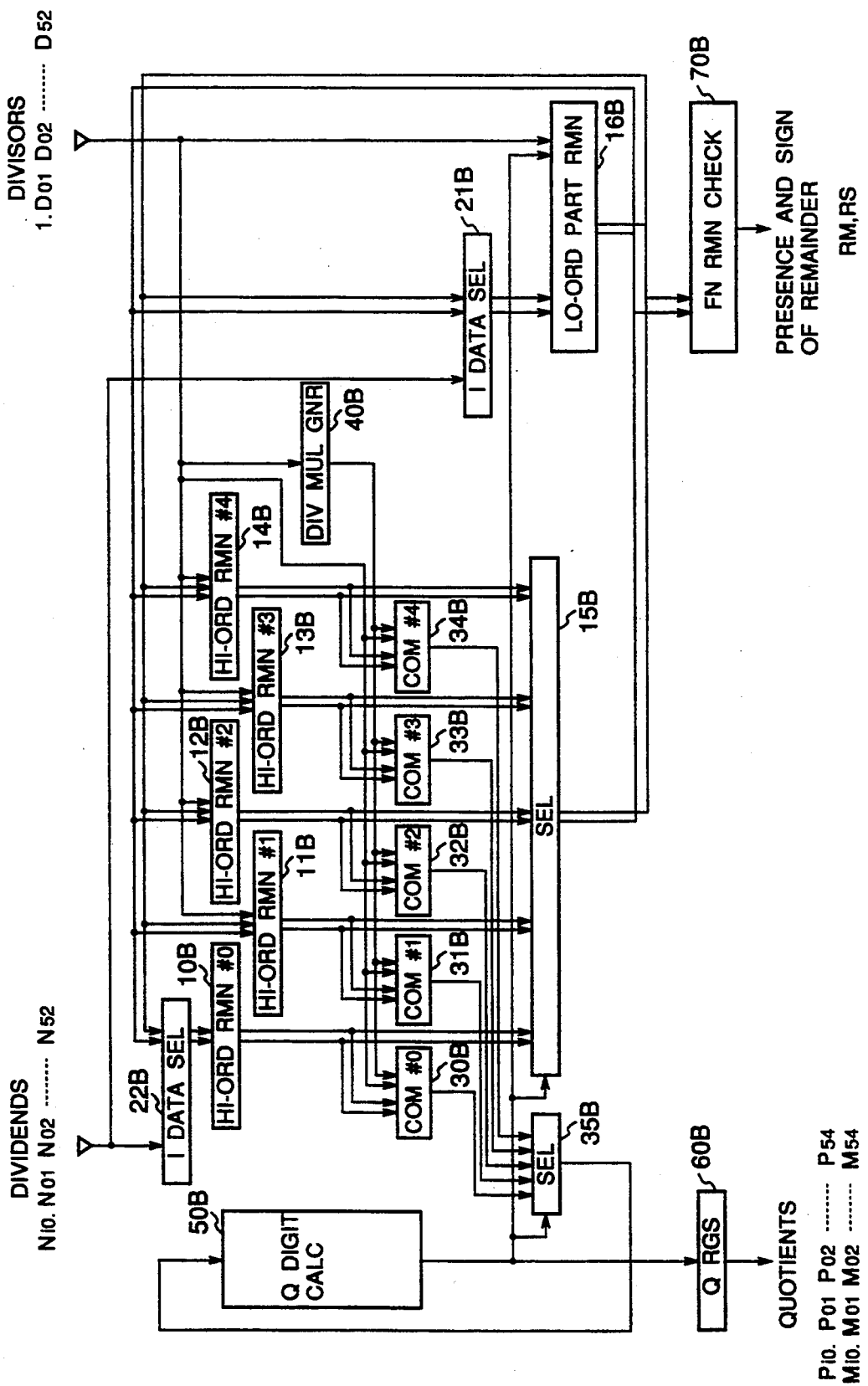
FIG. 61 is a block diagram illustrative of the architecture of another embodiment of the divider in which the present invention is applied to the quaternary SRT division algorithm.

Next, an embodiment which differs from the above embodiment in only the connection position of the input data selector (20B in FIG. 46) is illustrated in FIG. 61. This embodiment in FIG. 61 is characterized in that the output of the input data selector (22B) is connected to only the partial-remainder precedent calculation circuit (10B) for which "0" is assumed as the quotient digit, that the output of the partial remainder selector (15B) is connected to the partial-remainder precedent calculation circuits (11B~14B) for which the values other than "0" are assumed as the quotient digits, that the input data selector (22B) selects the dividend before the calculation of the quotient digits, that the partial remainder selector (15B) and the precedently-calculated quotient value selector (35B) select the respective values calculated assuming "0" as the quotient digit, before the calculation of the quotient digits, that the input data selector (22B) selects the partial remainder during the calculation of the quotient digits, and that the partial remainder selector (15B) and the precedently-calculated quotient value selector (35B) select the respective values calculated assuming the quotient digits.

According to the present invention, a processing time period for one time of iterative calculation for a quotient, the calculation expending the longest time in a floating-point division, can be shortened. Concretely, the calculation of the quotient and those of partial remainders, which have heretofore been processed serially, are mostly executed in parallel or concurrently, and the speed of the iterative calculations for the quotient can be nearly doubled. Accordingly, the efficiency of the division is enhanced.

What is claimed is:

1. An arithmetic unit which operates as a multiplier which obtains partial products between a multiplier factor and a multiplicand and then adds up the obtained partial products, thereby evaluating a final product, said multiplier comprising:

an intermediate product adder which adds said two intermediate products as to high-order digits thereof above a predetermined digit thereof, assuming a plurality of possible values of carries from lower-order digits thereof below said predetermined digit and a plurality of possible rounding values in said rounding process, thereby obtaining a plurality of added results in correspondence with the assumed values;

normalization means for executing a normalizing process in which a mantissa part of a result obtained by adding said obtained partial products is shifted so that a high-order digit having developed anew in said result will come to a predetermined position, and in which an exponent part of said result is corrected in accordance with the number of shift places in the shift of said mantissa part;

rounding means for executing a rounding process in which, on condition that said mantissa part of a result obtained from said intermediate product adder exceeds a predetermined number of digits, the number of digits of said mantissa part is reduced in conformity with a rounding mode designated beforehand, said rounding means executing at least part of said rounding process by the use of said numerical values not yet subjected to said normalizing process, in parallel with the execution of said intermediate product adder, said rounding means including a rounding value calculation circuit which calculates rounding information from said two intermediate products in parallel with the addition of said intermediate products;

a carry look-ahead circuit which generates carry information on said carries from said two intermediate products in parallel with said addition of said intermediate products; and a selector circuit which selects one of said added results of said intermediate product adder on the basis of outputs of said rounding value calculation circuit and said carry look-ahead circuit.

2. In a floating-point arithmetic unit having:

an aligner which accepts two floating-point operands, which finds an absolute value of a difference between exponent parts of both the operands, and which aligns mantissa parts of both the operands in such a way that the mantissa part of the operand having the smaller exponent part is shifted toward a low-order position thereof in correspondence with the found absolute value;

addition/subtraction means for executing either of an addition and a subtraction between the aligned mantissa parts of both the operands;

normalization means for executing a normalizing process in which a mantissa part of a result obtained by the execution of the addition/subtraction means is shifted so that a high-order digit having developed anew in the result will come to a predetermined position, and in which an exponent part of the result is corrected in accordance with the number of shift places in the shift of the mantissa part; and rounding means for executing a rounding process in which, on condition that the mantissa part of the result exceeds a predetermined number of digits, the number of digits of the mantissa part is reduced in conformity with a rounding mode designated beforehand;

a floating-point arithmetic unit comprising:

rounding correction decision means for detecting with said mantissa parts not yet subjected to said normalizing process, if a correction for adding +1 to said mantissa part of said result is required in said rounding process, in each of three cases where said mantissa part of said result is shifted one bit toward a low-order position thereof in said normalizing process, where said mantissa part is shifted zero bit toward a high-order position thereof and where said mantissa part is shifted one bit toward said high-order position thereof;

rounding position decision means for deciding with said mantissa parts not yet subjected to said normalizing process, if the shift of said mantissa part in said normalizing process falls under any of said three cases; and selection means for selecting either of validating one of said three cases in said rounding correction decision means or invalidating all of said three cases, on the basis of a decided result of said rounding position decision means;

thereby executing said normalizing process and said rounding process in parallel.

3. In a floating-point operation method as performed by a data processing apparatus having:

means for accepting two floating-point operands, finding an absolute value of a difference between exponent parts of both the operands, and aligning mantissa parts of both the operands in such a way that the mantissa part of the operand having the smaller exponent part is shifted toward a low-order position thereof in correspondence with the found absolute value;

addition/subtraction means for executing either of an addition and a subtraction between the aligned mantissa parts of both the operands;

normalization means for shifting a mantissa part of a result obtained by the execution of the addition/subtraction means, so that a high-order digit having developed anew in the result will come to a predetermined position, and correcting an exponent part of the result in accordance with the number of shift places in the shift of the mantissa part; and rounding means for reducing the number of digits of the mantissa part in conformity with a rounding mode designated beforehand, on condition that the mantissa part of the result exceeds a predetermined number of digits;

a floating-point operation method performed by said data processing apparatus, comprising the steps of:

a rounding correction decision step of deciding with said mantissa parts not yet subjected to said normalization step, if a correction for adding +1 to said mantissa part of said result is required at said rounding step, in each of three supposed cases where said mantissa part of said result is shifted one bit toward a low-order position thereof at said normalization step, where said mantissa part is shifted zero bit toward a high-order position thereof and where said mantissa part is shifted one bit toward said high-order position thereof;

a rounding position decision step of deciding with said mantissa parts not yet subjected to said normalization step, if the shift of said mantissa part at said normalization step falls under any of said three supposed cases; and a selection step of selecting either validating one of said three supposed cases at said rounding correction decision step or invalidating all of said three cases, on the basis of a decided result of said rounding position decision step, thereby executing said normalization step and said rounding step in parallel.

4. A data processing apparatus comprising:

an adder for adding partial products of a plurality of operands to obtain addition results;

a carry look-ahead circuit responsive to said addition results from said adder for determining if there are any carries from a lower-order bit of said addition results;

a rounding correction value calculating circuit responsive to said addition results from said adder and operating concurrently with said carry look-ahead circuit for producing a rounding correction value for each of a plurality of shift amounts from a lower-order bit of said addition results;

an intermediate product adder responsive to said addition results from said adder and operating concurrently with said carry look-ahead circuit for producing a plurality of addition results of intermediate products;

a condition determining circuit for producing a selection condition for the addition results of intermediate products, produced by said intermediate product adder, in accordance with the presence or absence of carries and the number of carries determined by said carry look-ahead circuit and a rounding correction value produced by said rounding correction value calculating circuit;

a selector circuit coupled to said intermediate product adder for selecting one intermediate product addition result from said plurality of addition results of intermediate products in response to said selection condition produced by said condition determining circuit; and a normalizing circuit for normalizing an intermediate product addition result selected by said selector circuit.

5. An arithmetic unit as defined in claim 4, further comprising an aligner which accepts sort information on floating-point numbers being said two numerical values, and which processes digit places of the different sorts of floating-point numbers for the respective sorts.

6. An arithmetic unit as defined in claim 4, further comprising an aligner which accepts information indicating if said two numerical values are integers, and which processes digit places of said two numerical values.

7. An arithmetic unit as defined in claim 4, further comprising:

detection means for detecting that said two numerical values are in any of combinations of predetermined numbers; and a special number generator which delivers a number corresponding to the detected combination.

8. A data processing apparatus according to claim 4, wherein operates to add partial products of two operands to obtain an addition result.

9. A data processing apparatus according to claim 4, wherein the plurality of addition results produced by said intermediate product adder includes a SUM, a SUM+1 and a SUM+2 of intermediate products from said addition results.

10. A data processing apparatus, comprising:
an adder for adding a plurality of operands to obtain an addition result;
rounding correction determining means for producing and holding a rounding correction value for rounding up or rounding down for each of a plurality of shifting amounts from a lower-order bit of the addition result obtained by said adder;
rounding position determining means for calculating a shift amount from an upper-order bit of the addition result obtained by said adder;
selector means for selecting a rounding correction value held by said rounding correction determining means in correspondence with the shift amount calculated by said rounding position determining means;
rounding adding means for adding said addition result obtained by said adder and the rounding correction value selected by the selector means to produce a rounded addition result; and
normalizing means for normalizing said rounded addition result.

11. A data processing apparatus according to claim 10, wherein said normalizing means comprises:
shift-place number calculating means responsive to the addition result obtained by said adder for calculating a number of shift places for normalization, said shift-place number calculating means operating in parallel with said rounding adding means; and
normalization shifting means for normalizing said rounded addition result in accordance with a number of shift places calculated by said shift-place number calculating means.

12. A method as performed by a data processing apparatus, comprising the steps of:
(a) adding a plurality of operands to obtain an addition result;
(b) producing and holding a rounding correction value for rounding up or rounding down for each of a plurality of shifting amounts from a lower-order bit of the addition result obtained by step (a);
(c) calculating a shift amount from an upper-order bit of the addition result obtained by step (a);
(d) selecting a rounding correction value produced in step (b) in correspondence with the shift amount calculated in step (c);
(e) adding said addition result obtained by step (a) and the rounding correction value selected in step (d) to produce a rounded addition result; and
(f) normalizing said rounded addition result.

13. A method as performed by a data processing apparatus according to claim 12, wherein said normalizing step (f) comprises the sub-steps of:
(f1) calculating a number of shift places for normalization in parallel with the operation in step (e) and in response to the addition result obtained in step (a); and
(f2) normalizing said rounded addition result in accordance with a number of shift places calculated in step (f1).

14. A method as performed by data processing apparatus, comprising the steps of:

(a) adding partial products of a plurality of operands to obtain addition results;
(b) determining if there are any carries from a lower-order bit of said addition results produced in step (a);
(c) producing a rounding correction value for each of a plurality of shift amounts from a lower-order bit of said addition results produced in step (a) concurrently with the operation in step (b);
(d) producing a plurality of addition results of intermediate products from the addition results produced in step (a);
(e) producing a selection condition for the addition results of intermediate products, produced in step (d), in accordance with the presence or absence of carries and the number of carries and the number of carries determined in step (b) and a rounding correction value produced in step (c);
(f) selecting one intermediate product addition result from said plurality of addition results of intermediate products in response to said selection condition produced in step (e); and
(g) normalizing the intermediate product addition result selected in step (f).

15. A data processing apparatus, comprising:
an adder for adding a plurality of operands to obtain an addition result;
rounding correction determining means for producing and holding a rounding correction value for rounding up or rounding down for each of a plurality of shifting amounts from a lower-order bit of the addition result obtained by said adder, including decision means for deciding if a correction for adding +1 to a mantissa part of said addition result is required for a rounding process, in each of three cases where said mantissa part of said addition result is shifted one bit toward a low-order position thereof, where said mantissa part is shifted zero bit toward a high-order position thereof and where said mantissa part is shifted one bit toward said high-order thereof;
rounding position determining means for calculating a shift amount from an upper-order bit of the addition result obtained by said adder;
selector means for selecting a rounding correction value held by said rounding correction determining means in correspondence with the shift amount calculated by said rounding position determining means;
rounding adding means for adding said addition result obtained by said adder and the rounding correction value selected by the selector means to produce a rounded addition result; and
normalizing means for normalizing said rounded addition result.

16. A data processing apparatus according to claim 15, wherein said normalizing means comprises:
shift-place number calculating means responsive to the addition result obtained by said adder for calculating a number of shift places for normalization, said shift-place number calculating means operating in parallel with said rounding adding means; and
normalization shifting means for normalizing said rounded addition result in accordance with a number of shift places calculated by said shift-place number calculating means.

* * * * *